US012223456B1

(12) United States Patent
Manohar et al.

(10) Patent No.: US 12,223,456 B1
(45) Date of Patent: Feb. 11, 2025

(54) SYSTEM AND METHOD FOR ARTIFICIAL-INTELLIGENCE (AI) DRIVEN AUTONOMIC APPLICATION MANAGEMENT FRAMEWORK IN A PLURALITY OF ENVIRONMENTS

(71) Applicant: Swaayata Inc, Aldie, VA (US)

(72) Inventors: Sharanya Manohar, Mumbai (IN); Ashraf Aslam Khan, Mumbai (IN); Abhishek Mahesh Tiwari, Mumbai (IN); Ajay Solanki, Mumbai (IN); Ramesh Subrahmaniam, Aldie, VA (US)

(73) Assignee: Swaayata Inc, Aldie, VA (US)

( * ) Notice: Subject to any disclaimer, the term of this patent is extended or adjusted under 35 U.S.C. 154(b) by 0 days.

(21) Appl. No.: 18/654,080

(22) Filed: May 3, 2024

(51) Int. Cl.
  *G06Q 10/06* (2023.01)
  *G06F 40/30* (2020.01)
  *G06Q 10/0639* (2023.01)

(52) U.S. Cl.
  CPC ....... *G06Q 10/06393* (2013.01); *G06F 40/30* (2020.01)

(58) Field of Classification Search
  CPC .................................................... G06Q 10/06
  USPC ....................................................... 705/7.39
  See application file for complete search history.

(56) References Cited

U.S. PATENT DOCUMENTS

| 9,515,952 | B2 | 12/2016 | Thomas |
| 2017/0201569 | A1 | 7/2017 | Fu et al. |
| 2018/0123909 | A1* | 5/2018 | Venkitapathi ........... H04L 43/08 |
| 2018/0165723 | A1* | 6/2018 | Wright .................... G06F 40/30 |
| 2019/0079744 | A1 | 3/2019 | Bosch et al. |
| 2019/0253558 | A1* | 8/2019 | Haukioja ................ G10L 15/22 |
| 2020/0145337 | A1 | 5/2020 | Keating et al. |
| 2020/0167258 | A1 | 5/2020 | Chattopadhyay et al. |
| 2021/0014303 | A1* | 1/2021 | Guim Bernat ...... H04L 41/5051 |
| 2021/0075707 | A1* | 3/2021 | Kumar .................. H04L 43/067 |
| 2021/0119935 | A1 | 4/2021 | Metsch et al. |
| 2021/0294818 | A1* | 9/2021 | Savalle .............. H04L 41/5009 |
| 2022/0124009 | A1 | 4/2022 | Metsch et al. |

* cited by examiner

Primary Examiner — Nga B Nguyen

(74) Attorney, Agent, or Firm — Jason C. Cameron

(57) ABSTRACT

A computer-implemented method for automatically managing applications in environments using AI driven autonomic application management framework is disclosed. The computer-implemented method includes obtaining items of data from electronic devices associated with users, and databases; determining semantics and structure of natural language texts associated with the service level agreements (SLAs) based on analysis of natural language texts, using a first AI model; extracting service level objectives (SLOs) and associated metrics corresponding to services specified in SLAs; obtaining first real-time data including actual performance levels, and service level indictors, of the services, from monitoring platforms; determining whether actual performance levels of services, are compliant with expected performance levels; automatically updating the SLOs and associated metrics based on deviations of actual performance levels of the services from expected performance levels; and generating insights associated with actions, to be applied to corresponding services, to be performed to automatically manage the applications.

20 Claims, 27 Drawing Sheets

500

SYSTEM AND METHOD FOR ARTIFICIAL-INTELLIGENCE (AI) DRIVEN AUTONOMIC APPLICATION MANAGEMENT FRAMEWORK IN A PLURALITY OF ENVIRONMENTS

TECHNICAL FIELD

Embodiments of the present disclosure generally relate to artificial intelligence (AI) based systems and more particularly to a system and a method for artificial intelligence (AI) driven autonomic application management framework in a plurality of environments.

BACKGROUND

Typically, enterprises depend on advanced digital infrastructures to efficiently oversee their operations and reach desired goals. Gaining immediate understanding of these operations across different aspects like time (e.g., monthly, quarterly, yearly), expenses, and productivity requires a deep understanding of a system. Generally, these operations are guided by rules and automated intelligence integrated into a digital framework, functioning within a spectrum from responsive to partially prescriptive methodologies.

Reaching a state of fully proactive automation, where human involvement is solely reserved for addressing genuinely innovative challenges, represents a lofty aspiration. The enterprises often operate within the constraints of Service Level Agreements (SLAs) defining contractual obligations binding a provider of a system to an entity utilizing its services. These agreements delineate anticipated system performance, metrics for assessment (SLOs), and repercussions for unmet expectations. Service Level Objectives (SLOs), underpinned by diverse metrics, are quantified and communicated as Service Level Indicators (SLIs), which serve as benchmarks for system monitoring and intervention. Present-day innovation is centered on automating the complete lifecycle of SLOs and metrics, aiming for unprecedented levels of proactivity and intelligence. This pursuit epitomizes a significant and pertinent advancement within the contemporary digital sphere.

Generally, software orchestration frameworks manage infrastructure components. However, software orchestration frameworks often fall short when it comes to managing application-specific events such as scaling requirements or replication needs. This limitation becomes evident in the context of cloud-native applications, which demand a straightforward autonomic framework for dynamic, large-scale management. While existing orchestration frameworks offer infrastructure management application programming interfaces (APIs), tools for automating infrastructure provisioning, and the ability to react to system events, there is room for improvement. Learning the syntax for expressing infrastructure provisioning commands can be challenging. Additionally, effectively managing resources, monitoring system health and security, and automating actions based on monitoring results remain complex. Root cause analysis and error correlation within the application's services present further challenges.

Conventionally, a system and method provide objective-driven orchestration of service workloads. Conventional system focuses on receiving requests for service workloads that include performance objectives or Quality of Service (QOS) requirements. The conventional system then offers tools to create a plan to fulfill these objectives, initiate the workload's execution based on the plan, and monitor the execution for compliance with the objectives.

Another conventional system provides an intent-based orchestration of heterogeneous computer platforms. The conventional system involves receiving workload requests with intent-based Service Level Objectives (SLOs), generating resource allocation rules and a deployment plan, deploying the workload, monitoring performance using telemetry, and adjusting resource allocation and the deployment plan based on real-time telemetry.

Yet another conventional system provides distributed orchestration and deployment of cloud-based distributed computing applications. The conventional system involves determining a deployment context for a cloud-based application, evaluating rules specifying conditions for resource configurations, determining configurations based on these rules, and orchestrating the deployment on a cloud environment according to the determined configurations. However, the conventional systems and methods orchestration frameworks may need for expertise in provisioning commands, configuring applications, challenges in resource management, complexities in integrating monitoring tools with running systems, and manual effort required for addressing issues to take corrective actions. Furthermore, identifying root causes and correlating errors to specific service issues within the application poses considerable difficulties. These limitations can hinder the efficient operation and scalability of applications.

Further, conventional systems and methods may not effectively manage application-specific events such as scale requirements and replication needs. Another conventional method includes translating service level agreements (SLA), by manually translating the entire SLA to rules to be applied. Applying the rules to the appropriate services, by finding the metrics to be applied to services, and configuring the measurement tool to monitor the metric within the service. Another conventional method includes manual translation of SLA to metrics, by using a syntax-based language to start measuring the metrics. The syntax-based language may be a specific language to configure an open-source measuring tool.

Consequently, there is a need for an improved computer-implemented system and method for artificial intelligence (AI) driven autonomic application management framework in one or more environments, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a computer-implemented method for automatically managing one or more applications in one or more environments using an artificial intelligence (AI) driven autonomic application management framework. The computer-implemented includes obtaining, by one or more hardware processors, one or more items of data from at least one of: one or more electronic devices associated with one or more users and one or more databases. The one or more data comprise information associated with one or more service level agreements (SLAs) corresponding to the one or more applications in the one or more environments. The one or more service level agreements (SLAs) associated with the one or more applications comprise one or more natural language texts.

The computer-implemented further includes determining, by the one or more hardware processors, one or more semantics and structure of the one or more natural language texts associated with the one or more service level agreements (SLAs) based on analysis of the one or more natural language texts associated with the one or more service level agreements (SLAs), using a first artificial intelligence (AI) model. The computer-implemented further includes extracting, by the one or more hardware processors, one or more service level objectives (SLOs) and associated metrics corresponding to one or more services specified in the one or more service level agreements (SLAs) based on the determined one or more semantics and structure of the one or more natural language texts associated with the one or more service level agreements (SLAs), using the first artificial intelligence (AI) model. The computer-implemented further includes obtaining, by the one or more hardware processors, one or more first real-time data comprising one or more actual performance levels, and one or more service level indictors (SLIs), of the one or more services associated with the one or more applications, from one or more monitoring platforms.

The computer-implemented further includes determining, by the one or more hardware processors, whether the one or more actual performance levels of the one or more services associated with the one or more applications, are compliant with one or more expected performance levels by comparing the one or more actual performance levels with one or more pre-defined key performance indicators (KPIs) and one or more pre-defined goals of the one or more services defined in at least one of: the service level agreements (SLAs) and the service level objectives (SLOs), using the first artificial intelligence (AI) model. The first artificial intelligence (AI) model is trained with one or more pre-defined rules and criteria to assess the one or more pre-defined key performance indicators (KPIs) and one or more pre-defined goals defined in at least one of: the service level agreements (SLAs) and the service level objectives (SLOs). The computer-implemented further includes automatically updating, by the one or more hardware processors, the one or more service level objectives (SLOs) and associated metrics corresponding to the one or more services specified in the one or more service level agreements (SLAs), based on deviations of the one or more actual performance levels of the one or more services from the one or more expected performance levels, using the first artificial intelligence (AI) model.

The computer-implemented further includes generating, by the one or more hardware processors, one or more insights associated with one or more actions, to be applied to one or more corresponding services, to be performed to automatically manage the one or more applications based on the automatic updates on the one or more service level objectives (SLOs) and associated metrics corresponding to the one or more services specified in the one or more service level agreements (SLAs), using the first artificial intelligence (AI) model. The computer-implemented further includes providing, by the one or more hardware processors, information associated with the one or more actions, to be applied to the one or more corresponding services to automatically manage the one or more applications, to the one or more environments.

In an embodiment, determining, by the first artificial intelligence (AI) model, the one or more semantics and structure of the one or more natural language texts associated with the one or more service level agreements (SLAs), comprises: (a) training, by the one or more hardware processors, the first artificial intelligence (AI) model on one or more training datasets encompassing one or more texts from one or more text sources, wherein the one or more training datasets comprise at least one of: one or more articles, one or more books, and one or more websites, and wherein the first artificial intelligence (AI) model comprises a fine-tuned large language model (LLM); (b) obtaining, by the one or more hardware processors, the one or more data from at least one of: one or more electronic devices associated with one or more users and one or more databases; and (c) processing, by the one or more hardware processors, the one or more data to determine the one or more semantics and structure of the one or more natural language texts associated with the one or more service level agreements (SLAs) based on the training of the first artificial intelligence (AI) model on the one or more training datasets, wherein processing the one or more data comprises breaking the one or more natural language texts associated with the one or more service level agreements (SLAs) to be learned by the trained first artificial intelligence (AI) model to determine the one or more semantics and structure of the one or more natural language texts.

In another embodiment, the computer-implemented method further includes (a) fine-tuning, by the one or more hardware processors, the trained first artificial intelligence (AI) model with the determined one or more semantics and structure of the one or more natural language texts specific to the one or more service level objectives (SLOs) and associated metrics, wherein the fine-tuned first artificial intelligence (AI) model comprises a Linguistic Latent Attribute model (LLAMA 2), and wherein the trained first artificial intelligence (AI) model is fine-tuned with the determined one or more semantics and structure using one or more techniques comprising at least one of: few shots learning, chain of thoughts, tree of thoughts, ReACT, symbolic reasoning, self-consistency, automatic reasoning, and tool use; and (b) extracting, by the one or more hardware processors, the one or more service level objectives (SLOs) and associated metrics based on the fine-tuning process of the trained first artificial intelligence (AI) model with determined one or more semantics and structure within the one or more natural language texts.

In yet another embodiment, the computer-implemented method further includes extracting, by a second artificial intelligence (AI) model, one or more second real-time data from the one or more first real-time data for fine-tuning the large language model (LLM), wherein the second artificial intelligence (AI) model comprises a small language model (SLM), and wherein extracting the one or more second real-time data from the one or more first real-time data comprises: (a) obtaining, by the one or more hardware processors, the one or more first real-time data from the one or more monitoring platforms using a data ingestion layer, wherein the data ingestion layer is configured to determine whether the one or more first real-time data are obtained efficiently and to preprocess the one or more first real-time data to determine whether the one or more first real-time data comprise consistency and compatibility across the one or more monitoring platforms; (b) categorizing, by the one or more hardware processors, the one or more first real-time data based on at least one of: one or more types of the one or more first real-time data and the one or more monitoring platforms, using a categorization and routing layer, wherein the categorization and routing layer is configured to optimize a routing process of the one or more first real-time data to determine whether the one or more first real-time data are directed to a corresponding small language model (SLM) for analysis of the one or more first real-time data; (c) processing, by the one or more hardware processors, the one or more types of the one or more first real-time data and adding, by the one or more hardware processors, one or more securities and governance criteria to the one or more first real-time data; (d) mitigating, by the one or more hardware processors, one or more data volumes by eliminating one or more repetitive data points associated with the one or more first real-time data to determine an importance of each data point associated with the one or more first real-time data, using a data relevance assessment and reduction layer; and (e) extracting, by the one or more hardware processors, the one or more second real-time data from the one or more first real-time data based on an analysis of the relevancy of the one or more first real-time data.

The processing of the one or more types of the one or more first real-time data comprises: (i) assessing, by the one or more hardware processors, relevancy of the one or more first real-time data using one or more pre-defined criteria; (ii) mitigating, by the one or more hardware processors, noise by filtering the one or more repetitive data points associated with the one or more first real-time data; and (iii) training, by the one or more hardware processors, each small language model (SLM) to recognize one or more patterns and anomalies within one or more domains associated with the one or more first real-time data, to identify one or more security-related events.

In yet another embodiment, the computer-implemented method further includes optimizing, by the one or more hardware processors, the small language model (SLM) based on one or more feedback and results associated with the extraction of the one or more second real-time data using a reinforcement learning layer through a language model (LM) agent. The language model (LM) agent is configured to serve as a dynamic interface between the second artificial intelligence (AI) model and the one or more monitoring platforms. Further, optimizing the small language model (SLM) comprises learning, by the one or more hardware processors, the one or more second real-time data from one or more historical data to analyse security-related one or more second real-time data.

In yet another embodiment, the computer-implemented method further includes (a) fine-tuning, by the one or more hardware processors, the first artificial intelligence (AI) model with the one or more second real-time data in accordance with at least one of: the one or more service level agreements (SLAs), the one or more service level objectives (SLOs) and associated metrics corresponding to the one or more services, wherein the fine-tuned first artificial intelligence (AI) model is an instance language model; and (b) generating, by the one or more hardware processors, one or more knowledge graphs defining one or more structure and relationships common to one or more language models within the one or more domains, wherein the one or more knowledge graphs are one or more ontology views with one or more optimized level concepts and one or more meta-relations comprising at least one of: one or more entities, one or more attributes of the one or more entities, and one or more relationships between the one or more entities.

In yet another embodiment, fine-tuning the first artificial intelligence (AI) model with the one or more second real-time data comprises: (a) obtaining, by the one or more hardware processors, the one or more second real-time data from the one or more monitoring platforms, wherein the one or more second real-time data are stored in one or more interim databases; (b) translating, by the one or more hardware processors, the one or more second real-time data into one or more formats for fine-tuning the first artificial intelligence (AI) model; (c) mapping, by the one or more hardware processors, the one or more second real-time data to at least one of: the one or more service level agreements (SLAs), the one or more service level objectives (SLOs) and associated metrics corresponding to the one or more services, available in the first artificial intelligence (AI) model fine-tuned with the determined one or more semantics and structure of the one or more natural language texts; (d) converting, by the one or more hardware processors, the mapped one or more second real-time data into one or more question answering based datasets for fine-tuning the first artificial intelligence (AI) model; and (e) updating, by the one or more hardware processors, the one or more knowledge graphs based on the one or more second real-time data to update one or more instance view graphs.

In yet another embodiment, fine-tuning the first artificial intelligence (AI) model with the one or more second real-time data further comprises: (a) generating, by the one or more hardware processors, one or more prompt templates for one or more reasonings that learn dynamically from one or more memory buffers; (b) organizing, by the one or more hardware processors, one or more future trajectories over an extended horizon using the first artificial intelligence (AI) model; (c) generating, by the one or more hardware processors, the one or more actions based on the organized one or more future trajectories, using a language model (LM) agent; (d) collecting, by the one or more hardware processors, one or more feedbacks based on the generated one or more actions for the one or more services; (e) storing, by the one or more hardware processors, the collected one or more feedbacks in the one or more memory buffers; and (f) recurring, by the one or more hardware processors, the one or more reasonings to reorganize the one or more future trajectories from an updated state.

In yet another embodiment, generating the one or more actions using the first artificial intelligence (AI) model, comprises: (a) retrieving, by the one or more hardware processors, an initial state of the one or more service level objectives (SLOs) and associated metrics based on an Augmented Deep Active learning for text and Planning Trajectories (ADAPT) agent configured with the first artificial intelligence (AI) model being fine-tuned; (b) generating, by the one or more hardware processors, one or more plan trajectories to accomplish in meeting the one or more service level objectives (SLOs) based on the initial state of the one or more service level objectives (SLOs) and associated metrics, by querying the first artificial intelligence (AI) model from the Augmented Deep Active learning for text and Planning Trajectories (ADAPT) agent; (c) generating, by the one or more hardware processors, the one or more actions, to be applied to the one or more environments, based on at least one of: current state of the one or more service level objectives (SLOs) and probabilities of meeting the one or more service level objectives (SLOs), by at least one of: learning, planning procedures, and resembling actor-critic updates for Partial Observable Markov Decision Processes (POMDPs), wherein the Augmented Deep Active learning for text and Planning Trajectories (ADAPT) agent with the Partial Observable Markov Decision Processes (POMDPs) is configured to monitor the one or more services for adjusting one or more governance principles in the one or more environments; (d) receiving, by the one or more hardware processors, one or more feedbacks to refine a decision-making process on generation of the one or more actions upon analysing the generated one or more actions using a critic model; (e) recurring, by the one or more hardware processors, the refinement of the decision-making process on generation of the one or more actions until one or more optimal actions are generated; (f) optimizing, by the one or more hardware processors, the generated one or more actions to adapt with evolving conditions within the one or more environments by updating the learning, planning procedures; and (g) providing, by the one or more hardware processors, the optimized one or more actions to the one or more environments to accomplish in meeting the one or more service level objectives (SLOs).

In yet another embodiment, the computer-implemented method further includes constructing, by the one or more hardware processors, partial observabilities by providing one or more observations when the language model (LM) agent has partial knowledge of a state of the one or more environments, using the Partiall Observable Markov Decision Process (POMDP). The one or more observations are configured to provide implicit information about a true state, allowing the language model (LM) agent to update probability distribution over one or more possible states.

In another aspect of the present disclosure provides a computer-implemented system for automatically managing one or more applications in one or more environments using an artificial intelligence (AI) driven autonomic application management framework. The computer-implemented system includes one or more hardware processors and a memory. The memory is coupled to the one or more hardware processors. The memory comprises a plurality of subsystems in form of programmable instructions executable by the one or more hardware processors.

The plurality of subsystems comprises a data obtaining subsystem configured to obtain one or more items of data from at least one of: one or more electronic devices associated with one or more users and one or more databases. The one or more data comprise information associated with one or more service level agreements (SLAs) corresponding to the one or more applications in the one or more environments. The one or more service level agreements (SLAs) associated with the one or more applications comprise one or more natural language texts.

The plurality of subsystems further comprises a natural language processing (NLP) subsystem configured to determine one or more semantics and structure of the one or more natural language texts associated with the one or more service level agreements (SLAs) based on analysis of the one or more natural language texts associated with the one or more service level agreements (SLAs), using a first artificial intelligence (AI) model.

The plurality of subsystems further comprises a service level objectives extraction subsystem configured to extract one or more service level objectives (SLOs) and associated metrics corresponding to one or more services specified in the one or more service level agreements (SLAs) based on the determined one or more semantics and structure of the one or more natural language texts associated with the one or more service level agreements (SLAs), using the first artificial intelligence (AI) model. The plurality of subsystems further comprises the data obtaining subsystem further configured to obtain one or more first real-time data comprising one or more actual performance levels, and one or more service level indictors (SLIs), of the one or more services associated with the one or more applications, from one or more monitoring platforms.

The plurality of subsystems further comprises a compliance determining subsystem configured to determine whether the one or more actual performance levels of the one or more services associated with the one or more applications, are compliant with one or more expected performance levels by comparing the one or more actual performance levels with one or more pre-defined key performance indicators (KPIs) and one or more pre-defined goals of the one or more services defined in at least one of: the service level agreements (SLAs) and the service level objectives (SLOs), using the first artificial intelligence (AI) model. The first artificial intelligence (AI) model is trained with one or more pre-defined rules and criteria to assess the one or more pre-defined key performance indicators (KPIs) and one or more pre-defined goals defined in at least one of: the service level agreements (SLAs) and the service level objectives (SLOs).

The plurality of subsystems further comprises a service level objectives updating subsystem configured to automatically update the one or more service level objectives (SLOs) and associated metrics corresponding to the one or more services specified in the one or more service level agreements (SLAs), based on deviations of the one or more actual performance levels of the one or more services from the one or more expected performance levels, using the first artificial intelligence (AI) model.

The plurality of subsystems further comprises a decision-making subsystem configured to generate one or more insights associated with one or more actions, to be applied to one or more corresponding services, to be performed to automatically manage the one or more applications based on the automatic updates on the one or more service level objectives (SLOs) and associated metrics corresponding to the one or more services specified in the one or more service level agreements (SLAs), using the first artificial intelligence (AI) model. The plurality of subsystems further comprises an actions provisioning subsystem configured to provide information associated with the one or more actions, to be applied to the one or more corresponding services to automatically manage the one or more applications, to the one or more environments.

In yet another aspect of the present disclosure provides non-transitory computer-readable storage medium having instructions stored therein that when executed by a hardware processor, cause the processor to execute operations of: (a) obtaining one or more items of data from at least one of: one or more electronic devices associated with one or more users and one or more databases, wherein the one or more data comprise information associated with one or more service level agreements (SLAs) corresponding to the one or more applications in the one or more environments, and wherein the one or more service level agreements (SLAs) associated with the one or more applications comprise one or more natural language texts; (b) determining one or more semantics and structure of the one or more natural language texts associated with the one or more service level agreements (SLAs) based on analysis of the one or more natural language texts associated with the one or more service level agreements (SLAs), using a first artificial intelligence (AI) model; (c) extracting one or more service level objectives (SLOs) and associated metrics corresponding to one or more services specified in the one or more service level agreements (SLAs) based on the determined one or more semantics and structure of the one or more natural language texts associated with the one or more service level agreements (SLAs), using the first artificial intelligence (AI) model; (d) obtaining one or more first real-time data comprising one or more actual performance levels, and one or more service level indictors (SLIs), of the one or more services associated with the one or more applications, from one or more monitoring platforms; (e) determining whether the one or more actual performance levels of the one or more services associated with the one or more applications, are compliant with one or more expected performance levels by comparing the one or more actual performance levels with one or more pre-defined key performance indicators (KPIs) and one or more pre-defined goals of the one or more services defined in at least one of: the service level agreements (SLAs) and the service level objectives (SLOs), using the first artificial intelligence (AI) model, wherein the first artificial intelligence (AI) model is trained with one or more pre-defined rules and criteria to assess the one or more pre-defined key performance indicators (KPIs) and one or more pre-defined goals defined in at least one of: the service level agreements (SLAs) and the service level objectives (SLOs); (f) automatically updating the one or more service level objectives (SLOs) and associated metrics corresponding to the one or more services specified in the one or more service level agreements (SLAs), based on deviations of the one or more actual performance levels of the one or more services from the one or more expected performance levels; (g) generating one or more insights associated with one or more actions, to be applied to one or more corresponding services, to be performed to automatically manage the one or more applications based on the automatic updates on the one or more service level objectives (SLOs) and associated metrics corresponding to the one or more services specified in the one or more service level agreements (SLAs), using the first artificial intelligence (AI) model; and (h) providing information associated with the one or more actions, to be applied to the one or more corresponding services to automatically manage the one or more applications, to the one or more environments.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
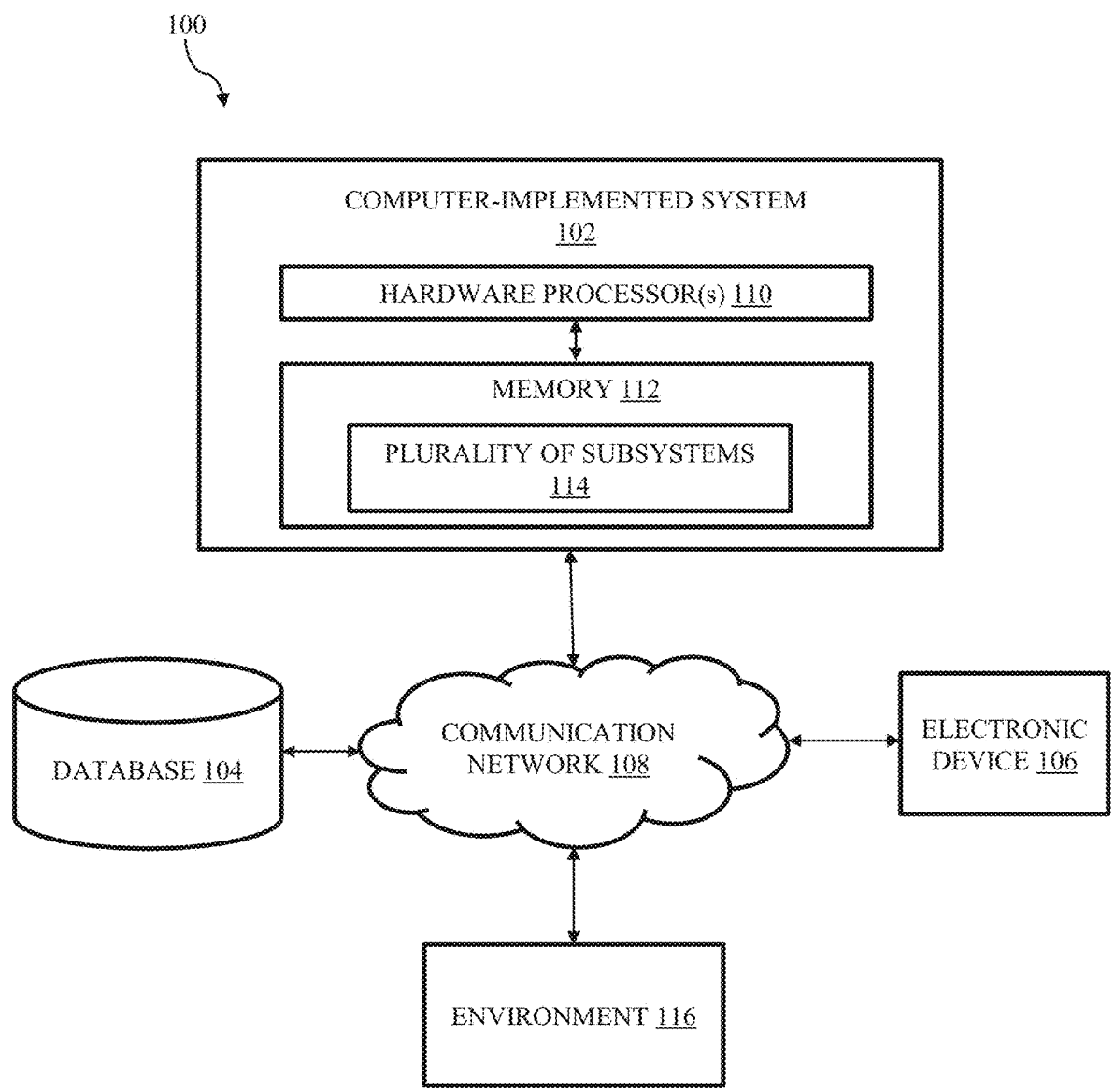
FIG. 1 illustrates an exemplary block diagram representation of a network architecture implementing a computer-implemented system for an artificial intelligence (AI) driven autonomic application management framework in one or more environments, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or s "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 23, where similar reference characters denote corresponding features consistently throughout the figures, there are shown preferred embodiments, and these embodiments are described in the context of the following exemplary system and/or method.

FIG. 1 illustrates an exemplary block diagram representation of a network architecture 100 implementing a computer-implemented system 102 for an artificial intelligence (AI) driven autonomic application management framework in one or more environments 116, in accordance with an embodiment of the present disclosure. According to FIG. 1, the network architecture 100 includes the computer-implemented system 102, one or more databases 104, one or more electronic devices 106, and the one or more environments 116. The one or more electronic devices 106 may be associated with one or more users, and communicatively coupled to the computer-implemented system 102 (otherwise called as a system) via a communication network 108. In an exemplary embodiment of the present disclosure, the electronic devices 106 may include a laptop computer, desktop computer, tablet computer, smartphone, wearable device, a digital camera, and the like. Further, the communication network 108 may be a wired network or a wireless network.

The computer-implemented system 102 may be at least one of, but not limited to, a central server, a cloud server, a remote server, an electronic device, a portable device, and the like. Further, the computer-implemented system 102 may be communicatively coupled to the database 104, via the communication network 108. The one or more databases 104 may include, but is not limited to, service level agreements (SLAs), enterprise applications, service level objective (SLO) parameters, policy record, measurable performance metrics, services, performance requirements, policy action(s) for each service, error files, standard SLI record, data compliance, security requirements, encryption requirements, governance requirements, requirements, objectives, constraints, a location, availability requirements, pricing requirements, security requirements associated with the one or more ERP applications, response time, availability, throughput, performance indicators, service name, a current performance level of a performance metric under consideration, an empty actions service name, performance required metric, action to improve or maintain the record, any other data, and combinations thereof. The one or more databases 104 may be any kind of databases/repositories such as, but are not limited to, relational database, dedicated database, dynamic database, monetized database, scalable database, cloud database, distributed database, any other database, and combination thereof.

Further, the one or more environments 116 may include, but is not limited to, multiple cloud environments, hybrid cloud environments, colocation environments, on-premises infrastructure environments, edge computing environments, and the like. Further, the one or more electronic devices 106 may be associated with, but not limited to, a user, an individual, an administrator, a vendor, a technician, a worker, a specialist, a healthcare worker, an instructor, a supervisor, a team, an entity, an organization, a company, a facility, a bot, any other user, and combination thereof. The entities, the organization, and the facility may include, but are not limited to, a hospital, a healthcare facility, an exercise facility, a laboratory facility, an e-commerce company, a merchant organization, an airline company, a hotel booking company, a company, an outlet, a manufacturing unit, an enterprise, an organization, an educational institution, a secured facility, a warehouse facility, a supply chain facility, any other facility and the like. The one or more electronic devices 106 may be used to provide input and/or receive output to/from the computer-implemented system 102, and/or to the one or more databases 104, respectively. The one or more electronic devices 106 may present to the one or more user interfaces for the one or more user to interact with the computer-implemented system 102 and/or to the one or more databases 104 for artificial intelligence (AI) driven autonomic application management framework need. The one or more electronic devices 106 may be at least one of, an electrical, an electronic, an electromechanical, and a computing device. The one or more electronic devices 106 may include, but is not limited to, a mobile device, a smartphone, a personal digital assistant (PDA), a tablet computer, a phablet computer, a wearable computing device, a virtual reality/augmented reality (VR/AR) device, a laptop, a desktop, a server, and the like.

The term "management" in the present disclosure implies deployment, monitoring, optimization, managing applications across the one or more environments 116. For example, managing involves coordinating and automating various tasks and processes related to the lifecycle of applications, including deployment, monitoring, optimization, and management, to ensure efficient operation in multi-cloud environments.

Further, the computer-implemented system 102 may be implemented by way of a single device or a combination of multiple devices that may be operatively connected or networked together. The computer-implemented system 102 may be implemented in hardware or a suitable combination of hardware and software. The computer-implemented system 102 includes one or more hardware processor(s) 110, and a memory 112. The memory 112 may include a plurality of subsystems 114. The computer-implemented system 102 may be a hardware device including the one or more hardware processors 110 executing machine-readable program instructions for the artificial intelligence (AI) driven autonomic application management framework. Execution of the machine-readable program instructions by the one or more hardware processors 110 may enable the proposed computer-implemented system 102 to manage the artificial intelligence (AI) driven autonomic application framework. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, the one or more hardware processors 110 may fetch and execute computer-readable instructions in the memory 112 operationally coupled with the computer-implemented system 102 for performing tasks such as data processing, input/output processing, and/or any other functions. Any reference to a task in the present disclosure may refer to an operation being or that may be performed on data.

Though few components and subsystems are disclosed in FIG. 1, there may be additional components and subsystems which is not shown, such as, but not limited to, ports, routers, repeaters, firewall devices, network devices, databases, network attached storage devices, servers, assets, machinery, instruments, facility equipment, emergency management devices, image capturing devices, sensors, any other devices, and combination thereof. The person skilled in the art should not be limiting the components/subsystems shown in FIG. 1. Although FIG. 1 illustrates the computer-implemented system 102, and the one or more electronic devices 106 connected to the one or more databases 104, one skilled in the art can envision that the computer-implemented system 102, and the one or more electronic devices 106 can be connected to several electronic devices located at various locations and several databases via the communication network 108.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the computer-implemented system 102 as is unique to the present disclosure or necessary for an understanding of the present disclosure is depicted and described. The remainder of the construction and operation of the system 102 may conform to any of the various current implementations and practices that were known in the art.

In an exemplary embodiment, the computer-implemented system 102 may be configured to obtain one or more items of data from at least one of: one or more electronic devices 106 associated with the one or more users and the one or more databases 104. In an embodiment, the one or more data may include information associated with one or more service level agreements (SLAs) corresponding to the one or more applications (e.g., one or more enterprise applications) associated with the one or more environments 116. In an embodiment, the one or more service level agreements (SLAs) associated with the one or more applications may include one or more natural language texts.

The computer-implemented system 102 may be further configured to determine one or more semantics and structure of the one or more natural language texts associated with the one or more service level agreements (SLAs) based on analysis of the one or more natural language texts associated with the one or more service level agreements (SLAs), using a first artificial intelligence (AI) model.

The computer-implemented system 102 may be further configured to extract one or more service level objectives (SLOs) and associated metrics corresponding to one or more services specified in the one or more service level agreements (SLAs) based on the determined one or more semantics and structures of the one or more natural language texts associated with the one or more service level agreements (SLAs), using the first artificial intelligence (AI) model. In an embodiment, the one or more service level objectives (SLOs) include, but are not limited to, response time, availability, throughput, performance indicators, and the like.

The computer-implemented system 102 may be further configured to obtain one or more first real-time data including one or more actual performance levels, and one or more service level indictors (SLIs), of the one or more services associated with the one or more applications, from one or more monitoring platforms. The computer-implemented system 102 may be further configured to determine whether the one or more actual performance levels of the one or more services associated with the one or more applications, are compliant with one or more expected performance levels by comparing the one or more actual performance levels with one or more pre-defined key performance indicators (KPIs) and one or more pre-defined goals of the one or more services defined in at least one of: the service level agreements (SLAs) and the service level objectives (SLOs), using the first artificial intelligence (AI) model.

In an embodiment, the first artificial intelligence (AI) model is trained with one or more pre-defined rules and criteria to assess the one or more pre-defined key performance indicators (KPIs) and one or more pre-defined goals defined in at least one of: the service level agreements (SLAs) and the service level objectives (SLOs). The computer-implemented system 102 may be further configured to automatically update the one or more service level objectives (SLOs) and associated metrics corresponding to the one or more services specified in the one or more service level agreements (SLAs), based on deviations of the one or more actual performance levels of the one or more services from the one or more expected performance levels, using the first artificial intelligence (AI) model.

The computer-implemented system 102 may be further configured to generate one or more insights associated with one or more actions, to be applied to one or more corresponding services, to be performed to automatically manage the one or more applications based on the automatic updates on the one or more service level objectives (SLOs) and associated metrics corresponding to the one or more services specified in the one or more service level agreements (SLAs), using the first artificial intelligence (AI) model. The computer-implemented system 102 may be further configured to provide information associated with the one or more actions, to be applied to the one or more corresponding services to automatically manage the one or more applications, to the one or more environments 116.

Figure 2:
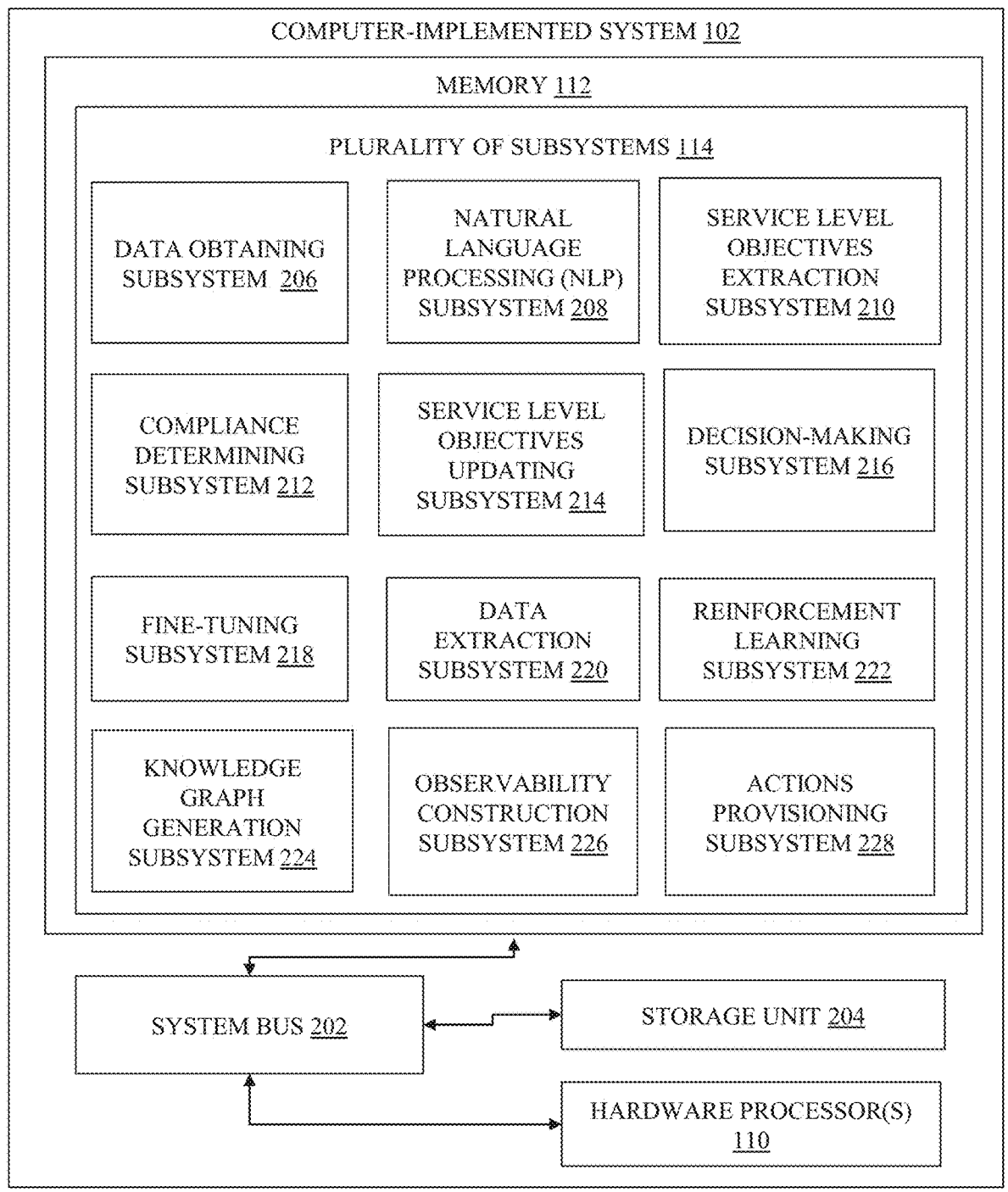
FIG. 2 illustrates an exemplary block diagram representation of the computer implemented system 102, such as those shown in FIG. 1, capable of the artificial intelligence (AI) driven autonomic applications management framework in the one or more environments, in accordance with an embodiment of the present disclosure.

FIG. 2 illustrates an exemplary block diagram representation of a computer implemented system, such as those shown in FIG. 1, capable of the artificial intelligence (AI) driven autonomic applications management framework in the one or more environments 116, in accordance with an embodiment of the present disclosure. The computer-implemented system 102 may also function as a system/server (hereinafter referred to as the system 102). The computer-implemented system 102 comprises the one or more hardware processors 110, the memory 112, and a storage unit 204. The one or more hardware processors 110, the memory 112, and the storage unit 204 are communicatively coupled through a system bus 202 or any similar mechanism. The memory 112 comprises the plurality of subsystems 114 in the form of programmable instructions executable by the one or more hardware processors 110.

Further, the plurality of subsystems 114 includes a data obtaining subsystem 206, a natural language processing (NLP) subsystem 208, a service level objectives extraction subsystem 210, a compliance determining subsystem 212, a service level objectives updating subsystem 214, a decision-making subsystem 216, a fine-tuning subsystem 218, a data extraction subsystem 220, a reinforcement learning subsystem 222, a knowledge graph generation subsystem 224, an observability construction subsystem 226, and an actions provisioning subsystem 228.

The one or more hardware processors 110, as used herein, means any type of computational circuit, such as, but not limited to, a microprocessor unit, microcontroller, complex instruction set computing exceptionally long processor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory 112 may be a non-transitory volatile memory and a non-volatile memory. The memory 112 may be coupled to communicate with the one or more hardware processors 110, such as being a computer-readable storage medium. The one or more hardware processors 110 may execute machine-readable instructions and/or source code stored in the memory 112. A variety of machine-readable instructions may be stored in and accessed from the memory 112. The memory 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 112 includes the plurality of modules 114 stored in the form of machine-readable instructions on any of the above-mentioned storage media and may be in communication with and executed by the one or more hardware processors 110.

The storage unit 204 may be a cloud storage or a repository such as those shown in FIG. 1. The storage unit 204 may store, but is not limited to, the service level agreements (SLAs), the applications (e.g., the enterprise applications), the service level objectives (SLOs), policy records, measurable performance metrics, the services, performance requirements, policy action(s) for each service, error files, standard SLI record, data compliance, security requirements, encryption requirements, governance requirements, requirements, objectives, constraints, a location, availability requirements, pricing requirements, security requirements associated with the one or more ERP applications, response time, availability, throughput, performance indicators, service name, a current performance level of a performance metric under consideration, an empty actions service name, performance required metric, action to improve or maintain the record, any other data, and combinations thereof. The storage unit 204 may be any kind of databases/repositories such as, but are not limited to, relational database, dedicated database, dynamic database, monetized database, scalable database, cloud database, distributed database, any other database, and combination thereof.

The plurality of subsystems 114 includes the data obtaining subsystem 206 that is communicatively connected to the one or more hardware processors 110. The data obtaining subsystem 206 is configured to obtain the one or more items of data from at least one of: the one or more electronic devices 106 associated with the one or more users and the one or more databases 104. In an embodiment, the one or more data may include the information associated with the one or more service level agreements (SLAs) corresponding to the one or more applications (e.g., one or more enterprise applications) associated with the one or more environments 116. In an embodiment, the one or more service level agreements (SLAs) associated with the one or more applications may include the one or more natural language texts.

The one or more applications may include, but are not limited to, the enterprise resource planning (ERP) applications, and customer relationship management (CRM) applications. In an example, the one or more SLAs may be an explicit contract between an infrastructure provider and an enterprise that runs services. The one or more SLAs includes, but are not limited to requirements, objectives, constraints, a location, availability requirements, pricing requirements, security requirements associated with the one or more applications, and the like.

The plurality of subsystems 114 further includes the natural language processing (NLP) subsystem 208 that is communicatively connected to the one or more hardware processors 110. The natural language processing (NLP) subsystem 208 is configured to determine the one or more semantics and structures of the one or more natural language texts associated with the one or more service level agreements (SLAs) based on analysis of the one or more natural language texts associated with the one or more service level agreements (SLAs), using the first artificial intelligence (AI) model.

For determining the one or more semantics and structures of the one or more natural language texts associated with the one or more service level agreements (SLAs), the natural language processing subsystem 208 is configured to train the first artificial intelligence (AI) model on one or more training datasets encompassing one or more texts from one or more text sources (e.g., internet). The first artificial intelligence (AI) model may be a fine-tuned large language model (LLM).

The large language model (LLM) is a sophisticated artificial intelligence system configured to determine and generate the one or more natural language texts on a massive scale. The large language model (LLM) is configured to utilize deep learning techniques to process and generate coherent language, enabling the one or more applications including at least one of: natural language understanding, text completion, and human conversation. The Large language models (LLMs) are typically trained on vast and diverse training datasets that encompass a wide range of the one or more texts from the internet. The one or more training datasets may include at least one of: one or more articles, one or more books, one or more websites, and other text sources to expose the large language model to a broad spectrum of language patterns and contexts.

In an embodiment, the one or more training datasets may be obtained from one or more languages, and the one or more training datasets may include one or more topics, allowing the first artificial intelligence model (e.g., the large language model) to learn one or more nuances and intricacies of human language across different domains. In an embodiment, the one or more specific training datasets used, may be changed depending on the one or more users (e.g., an organization or researcher) training the large language model. The large language model may determine the semantics and structure of the one or more nature language texts. The large language model may posse the ability to determine and generate human-like text, enabling tasks including at least one of: natural language understanding, text generation, language translation, and summarization. The large language model may excel in applications including at least one of: conversational agents, code generation, sentiment analysis, and question answering, showcasing their versatility across various language-related tasks.

Upon obtaining the one or more data from at least one of: one or more electronic devices 106 associated with the one or more users and the one or more databases 104, the natural language processing subsystem 208 is further configured to process the one or more data to determine the one or more semantics and structures of the one or more natural language texts associated with the one or more service level agreements (SLAs) based on the training of the first artificial intelligence (AI) model on the one or more training datasets. In an embodiment, processing the one or more data includes breaking the one or more natural language texts associated with the one or more service level agreements (SLAs) to be learned by the trained first artificial intelligence (AI) model to determine the one or more semantics and structures of the one or more natural language texts.

In an embodiment, the large language model may have a comprehensive understanding of the one or more semantics and structures of the one or more natural language texts associated with the one or more service level agreements (SLAs). The large language model may effectively navigate complex language structures and infer semantic meanings, facilitating tasks including at least one of: natural language understanding and context-aware text generation, by enhancing/fine-tuning the large language model with an ability to reason. Further, based on the enhanced reasoning capability, the large language model may make informed responses to questions, make connections between disparate pieces of information, and exhibit a degree of contextual awareness in generating human-like contextual text to reason and act.

The plurality of subsystems 114 further includes the service level objectives extractions subsystem 210 that is communicatively connected to the one or more hardware processors 110. The service level objectives extractions subsystem 210 is configured to extract the one or more service level objectives (SLOs) and the associated metrics corresponding to the one or more services specified in the one or more service level agreements (SLAs) based on the determined one or more semantics and structures of the one or more natural language texts associated with the one or more service level agreements (SLAs), using the first artificial intelligence (AI) model (e.g., the large language model (LLM)).

In an embodiment, the trained first artificial intelligence (AI) model is fine-tuned with the determined one or more semantics and structure of the one or more natural language texts specific to the one or more service level objectives (SLOs) and associated metrics, using the fine-tuning subsystem 218. In an embodiment, the fine-tuned first artificial intelligence (AI) model may include a Linguistic Latent Attribute model (LLAMA 2). In other words, the large language model is fine-tuned to grasp the one or more semantics and structure of the one or more natural language texts specific to service level objectives (SLOs) and associated metrics. In an embodiment, the one or more data (i.e., static data) from one or more contractual documents may provide a foundation for the fine-tuning process of the large language model, enabling the large language model to analyze and determine the intricacies of the service level agreements (SLAs). The service level objectives extraction subsystem 210 is further configured to extract the one or more service level objectives (SLOs) and associated metrics based on the fine-tuning process of the trained first artificial intelligence (AI) model with the determined one or more semantics and structures of within the one or more natural language texts.

The data obtaining subsystem 206 is further configured to obtain the one or more first real-time data including the one or more actual performance levels, and the one or more service level indictors (SLIs), of the one or more services associated with the one or more applications, from the one or more monitoring platforms. In an embodiment, the one or more monitoring platforms may include at least one of: New Relic, Prometheus, Azure, and other Observability platforms, capturing live and low-level performance indicators of IT infrastructure (i.e., the one or more services of the one or more applications). In an embodiment, the one or more real-time data (i.e., dynamic data) enables generation of an instance LLM model and one or more knowledge graphs, providing a real-time perspective of system's health.

The plurality of subsystems 114 further includes the compliance determining subsystem 212 that is communicatively connected to the one or more hardware processors 110. The compliance determining subsystem 212 is configured to determine whether the one or more actual performance levels of the one or more services associated with the one or more applications, are compliant with the one or more expected performance levels by comparing the one or more actual performance levels with the one or more pre-defined key performance indicators (KPIs) and the one or more pre-defined goals of the one or more services defined in at least one of: the service level agreements (SLAs) and the service level objectives (SLOs), using the first artificial intelligence (AI) model.

In an embodiment, the first artificial intelligence (AI) model (e.g., the large language model) is trained with the one or more pre-defined rules and criteria to assess the one or more pre-defined key performance indicators (KPIs) and the one or more pre-defined goals defined in at least one of: the service level agreements (SLAs) and the service level objectives (SLOs).

The plurality of subsystems 114 further includes the service level objectives updating subsystem 214 that is communicatively connected to the one or more hardware processors 110. The service level objectives updating subsystem 214 is configured to automatically update the one or more service level objectives (SLOs) and associated metrics corresponding to the one or more services specified in the one or more service level agreements (SLAs), based on the deviations of the one or more actual performance levels of the one or more services from the one or more expected performance levels, using the first artificial intelligence (AI) model.

The plurality of subsystems 114 further includes the data extraction subsystem 220 that is communicatively connected to the one or more hardware processors 110. The data extraction subsystem 220 is configured to extract one or more second real-time data from the one or more first real-time data for fine-tuning the large language model (LLM) using a second artificial intelligence (AI) model. In an embodiment, the second artificial intelligence (AI) model may be a small language model (SLM). For extracting the one or more second real-time data from the one or more first real-time data, the data extraction subsystem 220 is configured to obtain the one or more first real-time data from the one or more monitoring platforms using a data ingestion layer. The data ingestion layer is configured to determine whether the one or more first real-time data are obtained efficiently and to preprocess the one or more first real-time data to determine whether the one or more first real-time data include consistency and compatibility across the one or more monitoring platforms.

The data extraction subsystem 220 is further configured to categorize the one or more first real-time data based on at least one of: one or more types of the one or more first real-time data and the one or more monitoring platforms, using a categorization and routing layer. The categorization and routing layer is configured to optimize a routing process of the one or more first real-time data to determine whether the one or more first real-time data are directed to a corresponding small language model (SLM) for analysis of the one or more first real-time data.

The data extraction subsystem 220 is further configured to process the one or more types of the one or more first real-time data and add one or more securities and governance criteria to the one or more first real-time data. For processing the one or more types of the one or more first real-time data includes (a) assessing relevancy of the one or more first real-time data using one or more pre-defined criteria, (b) mitigating noise by filtering one or more repetitive data points associated with the one or more first real-time data, and (c) training each small language model (SLM) to recognize one or more patterns and anomalies within one or more domains associated with the one or more first real-time data, to identify one or more security-related events.

The data extraction subsystem 220 is further configured to mitigate one or more data volumes by eliminating the one or more repetitive data points associated with the one or more first real-time data to determine an importance of each data point associated with the one or more first real-time data, using a data relevance assessment and reduction layer. The data extraction subsystem 220 is further configured to extract the one or more second real-time data from the one or more first real-time data based on an analysis of the relevancy of the one or more first real-time data.

The plurality of subsystems 114 further includes the reinforcement learning subsystem 222 that is communicatively connected to the one or more hardware processors 110. The reinforcement learning subsystem 222 is configured to optimize the small language model (SLM) based on one or more feedback and results associated with the extraction of the one or more second real-time data using a reinforcement learning layer through a language model (LM) agent. In an embodiment, the language model (LM) agent is configured to serve as a dynamic interface between the second artificial intelligence (AI) model and the one or more monitoring platforms. The language model (LM) agent may possess reinforcement capabilities, facilitating continuous learning and adjustment based on real-time feedback from the dynamic data, which ensures that the computer-implemented system 102 evolves and adapts to emerging patterns, contributing to a more resilient and responsive monitoring framework. In another embodiment, the small language model (SLM) is optimized by learning the one or more second real-time data from one or more historical data to analyse security-related one or more second real-time data.

The plurality of subsystems 114 further includes the fine-tuning subsystem 218 that is communicatively connected to the one or more hardware processors 110. The fine-tuning subsystem 218 is configured to fine-tune the first artificial intelligence (AI) model with the one or more second real-time data in accordance with at least one of: the one or more service level agreements (SLAs), the one or more service level objectives (SLOs) and associated metrics corresponding to the one or more services. In an embodiment, the fine-tuned first artificial intelligence (AI) model may be the instance language model.

The plurality of subsystems 114 further includes the knowledge graph generation subsystem 224 that is communicatively connected to the one or more hardware processors 110. The knowledge graph generation subsystem 224 is configured to generate one or more knowledge graphs defining one or more structure and relationships common to one or more language models within the one or more domains. In an embodiment, the one or more knowledge graphs are one or more ontology views with one or more optimized level concepts and one or more meta-relations including at least one of: one or more entities, one or more attributes of the one or more entities, and one or more relationships between the one or more entities.

For fine-tuning the first artificial intelligence (AI) model with the one or more second real-time data, the fine-tuning subsystem 218 is configured to obtain the one or more second real-time data from the one or more monitoring platforms. In an embodiment, the one or more second real-time data are stored in one or more interim databases. The fine-tuning subsystem 218 is further configured to translate the one or more second real-time data into one or more formats for fine-tuning the first artificial intelligence (AI) model.

The fine-tuning subsystem 218 is further configured to map the one or more second real-time data to at least one of: the one or more service level agreements (SLAs), the one or more service level objectives (SLOs) and associated metrics corresponding to the one or more services, available in the first artificial intelligence (AI) model fine-tuned with the determined one or more semantics and structure of the one or more natural language texts. The fine-tuning subsystem 218 is further configured to convert the mapped one or more second real-time data into one or more question answering based datasets for fine-tuning the first artificial intelligence (AI) model. The fine-tuning subsystem 218 is further configured to update the one or more knowledge graphs based on the one or more second real-time data to update one or more instance view graphs.

The plurality of subsystems 114 further includes the decision-making subsystem 216 that is communicatively connected to the one or more hardware processors 110. The decision-making subsystem 216 is configured to generate the one or more insights associated with the one or more actions, to be applied to the one or more corresponding services, to be performed to automatically manage the one or more applications based on the automatic updates on the one or more service level objectives (SLOs) and associated metrics corresponding to the one or more services specified in the one or more service level agreements (SLAs), using the first artificial intelligence (AI) model.

For generating the one or more actions, the decision making subsystem 216 with the first artificial intelligence (AI) model is configured to retrieve an initial state of the one or more service level objectives (SLOs) and associated metrics based on an Augmented Deep Active learning for text and Planning Trajectories (ADAPT) agent configured with the first artificial intelligence (AI) model being fine-tuned. The decision making subsystem 216 is further configured to generate one or more plan trajectories to accomplish in meeting the one or more service level objectives (SLOs) based on the initial state of the one or more service level objectives (SLOs) and associated metrics, by querying the first artificial intelligence (AI) model from the Augmented Deep Active learning for text and Planning Trajectories (ADAPT) agent.

The decision making subsystem 216 is further configured to generate the one or more actions, to be applied to the one or more environments 116, based on at least one of: current state of the one or more service level objectives (SLOs) and probabilities of meeting the one or more service level objectives (SLOs), by at least one of: learning, planning procedures, and resembling actor-critic updates for Partial Observable Markov Decision Processes (POMDPs). The decision making subsystem 216 is further configured to receive one or more feedbacks to refine a decision-making process on generation of the one or more actions upon analysing the generated one or more actions using a critic model. The decision making subsystem 216 is further configured to recur the refinement of the decision-making process on generation of the one or more actions until one or more optimal actions are generated. The decision making subsystem 216 is further configured to optimize the generated one or more actions to adapt with evolving conditions within the one or more environments 116 by updating the learning, planning procedures. The decision making subsystem 216 is further configured to provide the optimized one or more actions to the one or more environments 116 to accomplish in meeting the one or more service level objectives (SLOs).

The plurality of subsystems 114 further includes the observability construction subsystem 226 that is communicatively connected to the one or more hardware processors 110. The observability construction subsystem 226 is configured to construct partial observabilities by providing one or more observations when the language model (LM) agent has partial knowledge of a state of the one or more environments 116, using the Partially Observable Markov Decision process (POMDP). In an embodiment, the one or more observations are configured to provide implicit information about a true state, allowing the language model (LM) agent to update probability distribution over one or more possible states.

The plurality of subsystems 114 further includes the actions provisioning subsystem 228 that is communicatively connected to the one or more hardware processors 110. The actions provisioning subsystem 228 is configured to provide the information associated with the one or more actions, to be applied to the one or more corresponding services to automatically manage the one or more applications, to the one or more environments 116.

Figure 3:
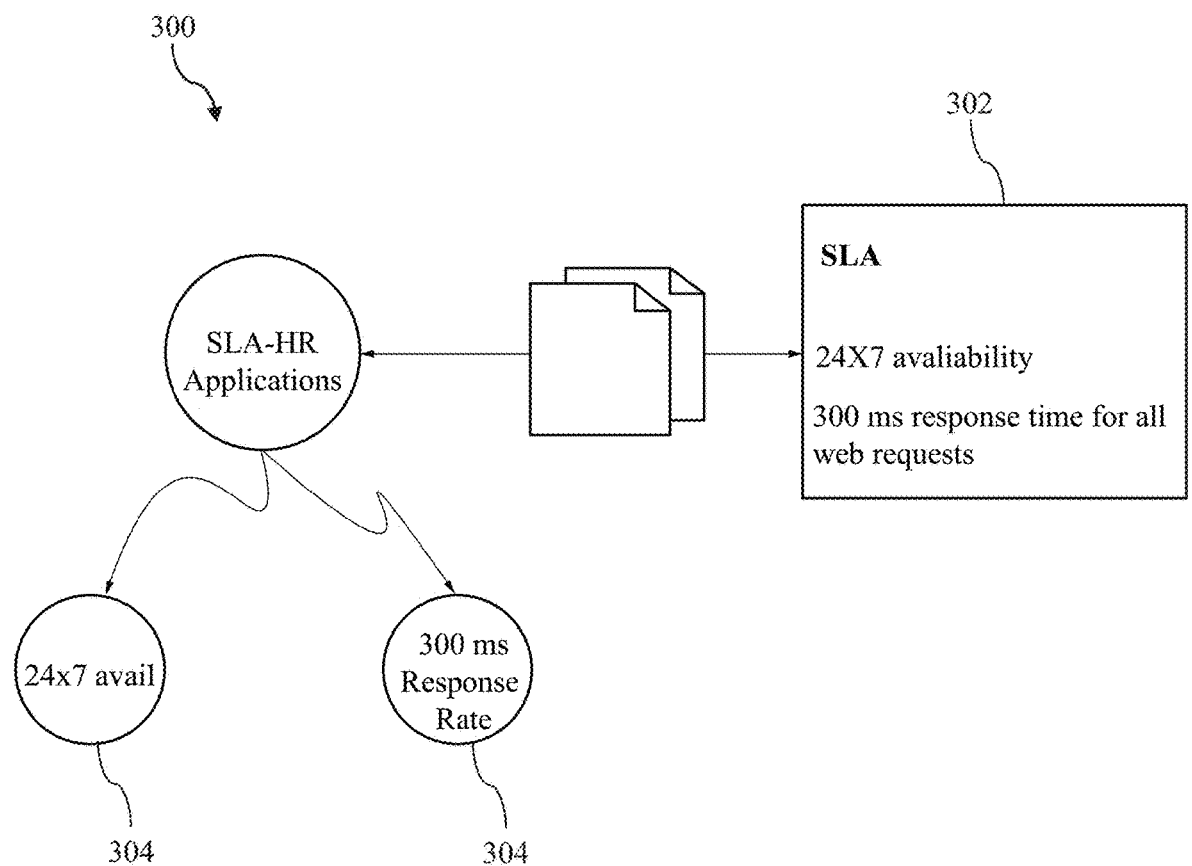
FIG. 3 illustrates a schematic diagram of a logical representation of one or more service level agreements (SLAs), in accordance with an embodiment of the present disclosure.

FIG. 3 illustrates a schematic diagram 300 of a logical representation of the one or more service level agreements (SLAs) 302, in accordance with an embodiment of the present disclosure. Business processes may depend heavily on a multitude of software applications, each handling various tasks. To determine overall health of a business, the computer-implemented system 102 needs to examine the key performance indicators of individual processes and consolidate the key performance indicators of all individual processes into a unified system that may provide the one or more insights enabling the one or more actions to be taken to either correct the process or to make the process more efficient. The reported data may not always be real-time and the reported data may be days or even months old, depending on the reporting frequency.

For example, an IT company specializes in deploying and managing software for its customers. In this scenario, the IT company commits to the Service Level Agreements (SLAs) 302, ensuring the one or more services 304 including at least one of: 24/7 availability and response times under 300 milliseconds for business applications. For a moderately complex deployment, involving various applications like front-end, APIs, and databases across physical or virtual machines, meeting these SLAs 302 requires seamless collaboration among various components of the one or more applications.

Figure 4:
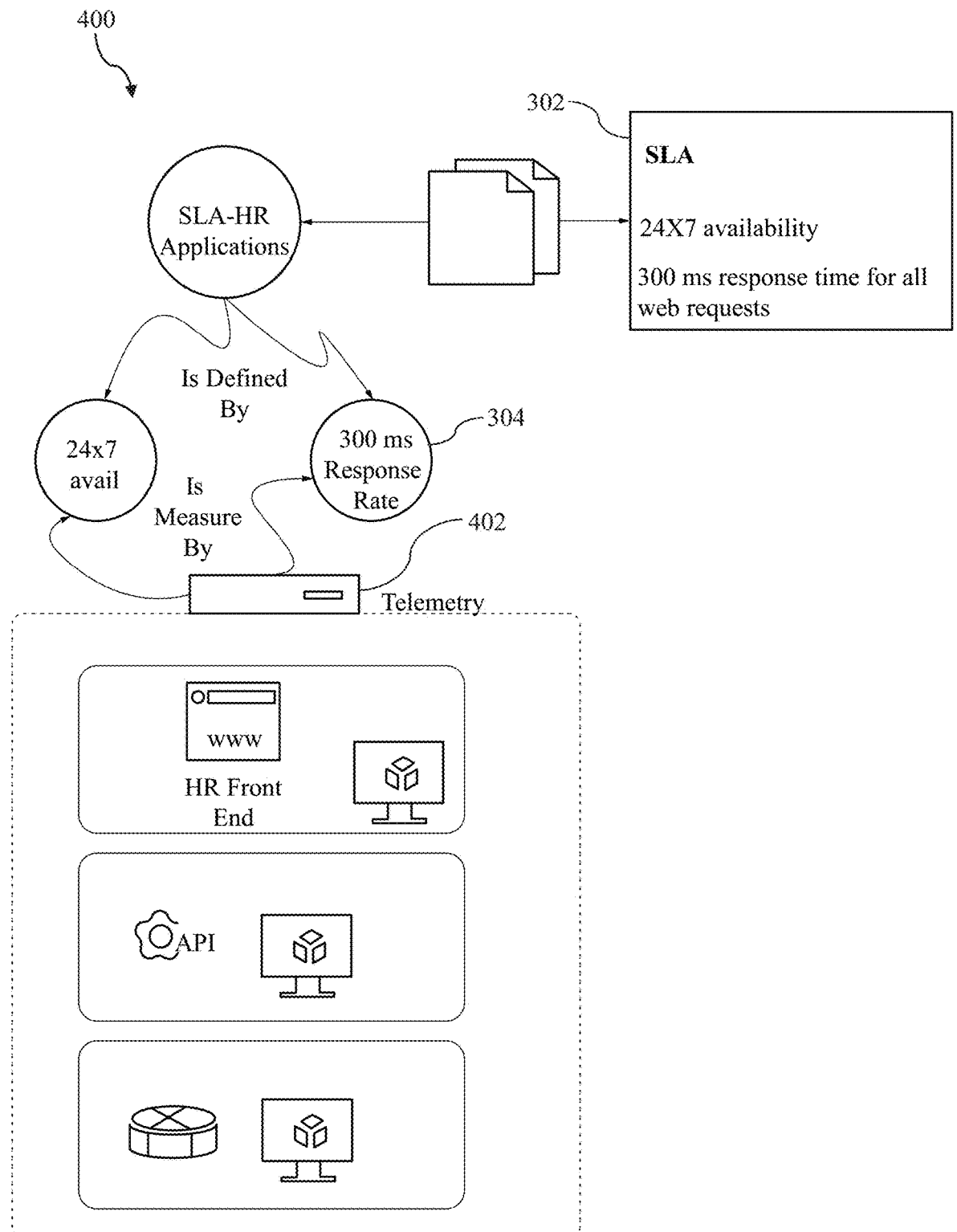
FIG. 4 illustrates a schematic diagram depicting the one or more service level agreements (SLAs) and one or more service level objectives (SLOs), that are measured by a telemetry, in accordance with an embodiment of the present disclosure.

FIG. 4 illustrates a schematic diagram 400 depicting the one or more service level agreements (SLAs) 302 and one or more service level objectives (SLOs), that are measured by a telemetry 402, in accordance with an embodiment of the present disclosure. Each component of the one or more applications may provide the telemetry 402 on its health, performance, and errors. The telemetry 402 is delivered at a rapid frequency, in a sub-second interval, generating a substantial volume of data. Interpreting the data may pose a complex challenge, and an even more daunting task is an ability to respond in real-time to address issues before the data lead to a breach of service level objectives (SLOs).

The computer-implemented system 102 may automate the entire lifecycle of the service level agreements (SLAs) 302, starting from a moment of signing the contracts, capturing the one or more real-time data from various documents, and utilizing the artificial intelligence model capabilities to reason and act to generate the one or more insights received from the one or more real-time data, serves as significant solution for one or more organizations. The decision-making process on generating the one or more insights associated with the one or more actions by the artificial intelligence model to be applied to the corresponding services, may significantly reduce allocation of time, financial resources, and personnels associated with operations.

Figure 5:
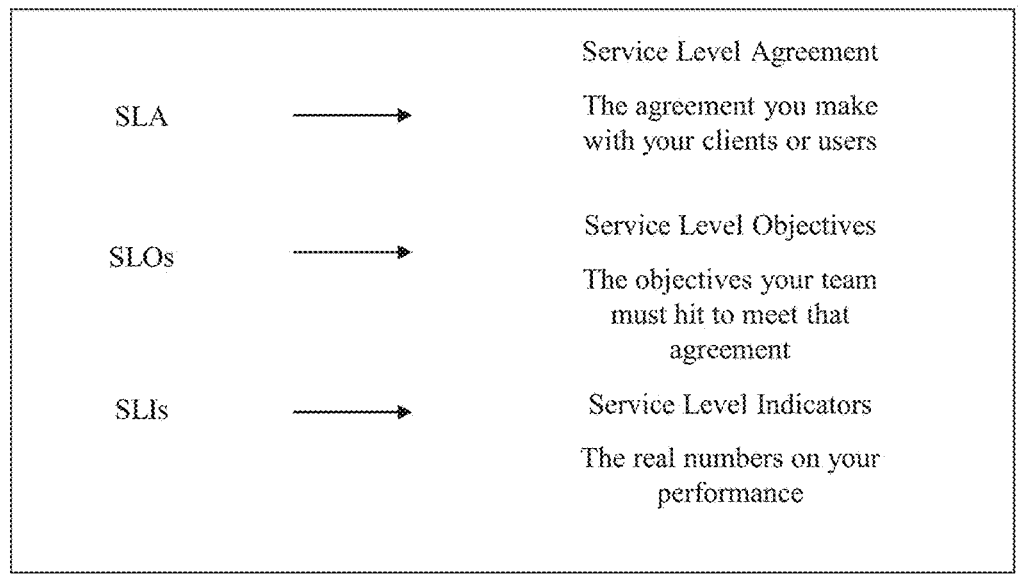
FIG. 5 illustrates a schematic diagram depicting an automation of the one or more service level agreements (SLAs) and one or more service level objectives (SLOs) using an artificial intelligence (AI) model, in accordance with an embodiment of the present disclosure.
Figure 5:
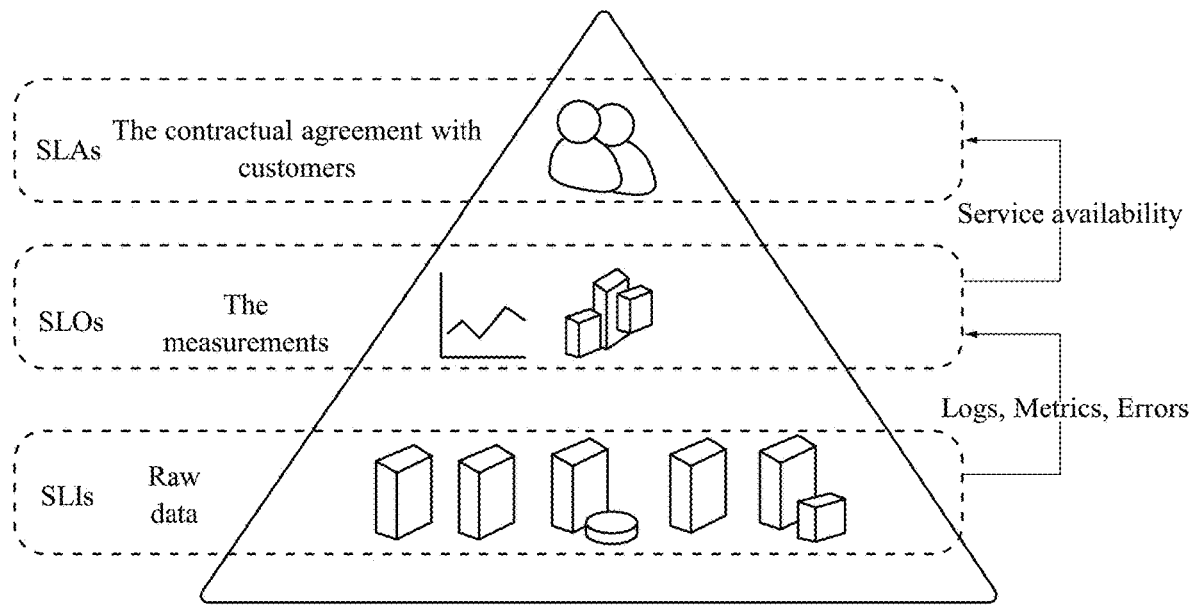

FIG. 5 illustrates a schematic diagram 500 depicting an automation of the one or more service level agreements (SLAs) and one or more service level objectives (SLOs) using the artificial intelligence (AI) model (e.g., the large language model (LLM)), in accordance with an embodiment of the present disclosure. The large language model has capabilities of analyzing the one or more natural language texts, generating the determining context reasoning. The main component of the large language model is a transformer configured to encode and decode the one or more natural language texts based on one or more deep neural networks of the transformer. The large language model may store the one or more semantics and structure of the one or more natural language texts based on analysis of the one or more pre-defined rules (e.g., grammar) of the language, determination of the context of the text and reasoning based on the one or more pre-defined rules. The large language model is configured to automate the one or more service level objectives (SLOs) and generate the one or more actions to meet the SLOs if needed.

Figure 6:
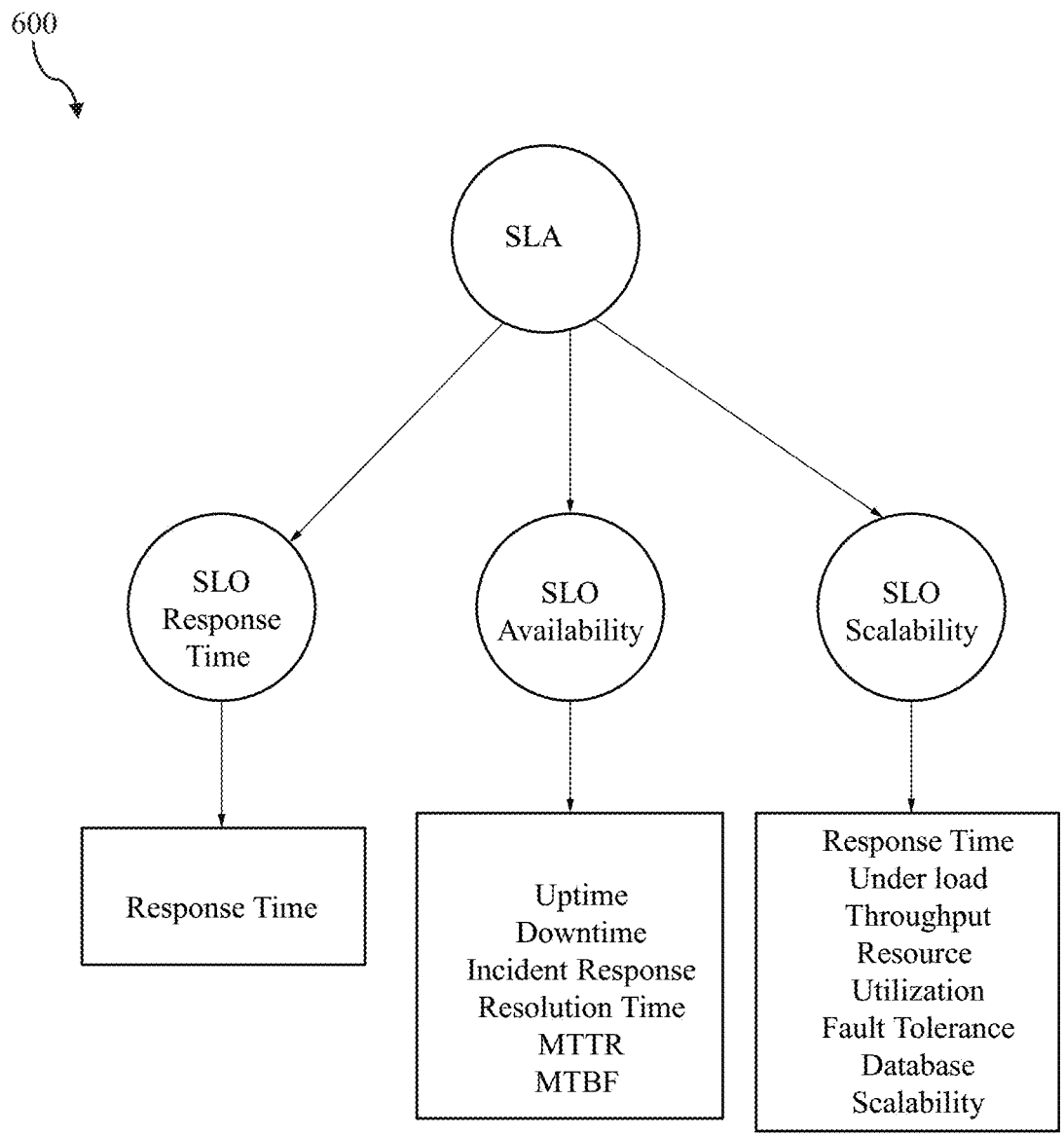
FIG. 6 illustrates an exemplary schematic diagram representing the one or more service level agreements (SLAs) and one or more service level objectives (SLOs) and associated metrics for a web application, in accordance with an embodiment of the present disclosure.

FIG. 6 illustrates an exemplary schematic diagram 600 representing the one or more service level agreements (SLAs) and one or more service level objectives (SLOs) and associated metrics for a web application, in accordance with an embodiment of the present disclosure. The exemplary schematic diagram shows that the SLAs, SLOs and associated metrics may have the one or more semantics and structure of the natural language texts. The rule in this exemplary case is determined from the "service level performance" for example, "if the response rate <30 ms, the SLO meets the expectation".

In overall, the large language model is configured to analyze the one or more semantics and structure of the natural language texts and determine one or more semantics and structure of the natural language texts associated with the one or more service level agreements (SLAs), the one or more service level objectives (SLOs) and associated metrics. The large language model is further configured to decode the one or more real-time dynamic data for better decision-making on generating actions for the one or more corresponding services for an autonomic system to meet the SLAs and SLOs expectations, using the one or more pre-defined rules the large language model is trained with.

The large language models (e.g., generative pre-trained transformer (GPT)), has capabilities in understanding the semantics and structure of the natural language texts. This includes the ability to comprehend the context, meaning, and relationships within textual information, which is crucial for interpreting SLAs, SLOs, and metrics specified in these documents. The capabilities of the large language models to process and understand the one or more real-time data may be valuable for monitoring dynamic aspects of SLAs and SLOs, which allows for the analysis of live data streams, identifying trends, anomalies, or deviations from expected performance levels specified by the SLOs.

Further, the large language model is trained with the one or more pre-defined rules and criteria to evaluate the key performance indicators (KPIs) and goals specified in SLAs and SLOs. By applying these pre-defined rules to the one or more real-time data, the computer-implemented system 102 with the large language model may determine whether the one or more actual performance levels are compliant with the one or more expected performance levels. The determination of the semantics and structure of the natural language texts, the real-time data and the utilization of the pre-defined rules, by the large language model, may contribute to the development of an efficient computer-implemented system 102 (i.e., an automated SLA and SLO system) to generate corrective actions if needed. The computer-implemented system 102 may continuously evaluate performance metrics, compare the performance metrics against the pre-defined goals, and generate the one or more insights or alerts based on the comparison and analysis.

The one or more insights generated from the computer-implemented system 102 may contribute to more informed automated decision-making. The computer-implemented system 102 may utilize the one or more insights to proactively address issues, optimize performance, and generate strategic decisions related to service levels. In summary, leveraging the capabilities large language model for understanding the one or more semantics and structure of the natural language texts, processing the real-time data, and applying the one or more pre-defined rules, may serve as a cornerstone for building an efficient and intelligent autonomic system for monitoring meeting SLAs and SLOs expectations, leading to improved decision-making in managing services and meeting performance goals.

In specific, the large language model may play a pivotal role in fine-tuning, combining internal enterprise specific proprietary knowledge and external insights to establish an initial metal model and a knowledge graph. The initial meta model may be used for comprehending static aspects of SLA definitions and associated metrics. The computer-implemented system 102 retrieves the one or more real-time dynamics data from the one or more monitoring platforms including at least one of: New Relic, Prometheus, and similar monitoring platforms. The one or more monitoring platforms may capture the live and low-level performance metrics from the IT infrastructure. The one or more real-time dynamic data is utilized to generate the instance large language model and the knowledge graph are dynamically generated for providing a real-time view of system's performance. The computer-implemented system 102 utilizes reinforcement learning through the language model (LM) agent, ensuring continuous adaptation. A planner, introduced into the computer-implemented system 102, contributes to adaptive learning, handling mathematical computations and guiding the computer-implemented system 102 towards defined goals.

The language model (LM) agent may be configured as a dynamic bridge, facilitating integration with the one or more monitoring platforms but crucially introduces reinforcement learning. The planner with its proficiency in mathematical precision and goal-oriented planning, enhances the overall intelligence of the computer-implemented system 102. This collaborative effort ensures a comprehensive view of SLA and SLO adherence. Time-series analysis is facilitated through the knowledge graph's built-in data partitioning, providing a nuanced understanding of performance trends. The integrated meta model ensures interpretability, empowering the computer-implemented system 102 with actionable intelligence for informed decision-making. The planner is configured to integrate into the software architecture (i.e., the artificial intelligence (AI) driven autonomic application management framework), handling mathematical calculations, defining expected trajectories, and providing adaptive planning strategies. The planner works in harmony with the large language models (LLMs), contributing to a more precise and adaptive corrective system. The planner ensures that the computer-implemented system 102 not only comprehends the language-based context but also excels in the intricate mathematical aspects inherent in SLA and SLO management.

In summary, the software architecture with the planner represents a pinnacle in automated SLA and SLO monitoring and taking autonomic actions. The collaborative synergy between LLMs, the planner, and real-time dynamic data ensures compliance and continual adaptation to the evolving dynamics of enterprise operations, setting a new standard in intelligent and adaptive monitoring solutions.

Figure 7:
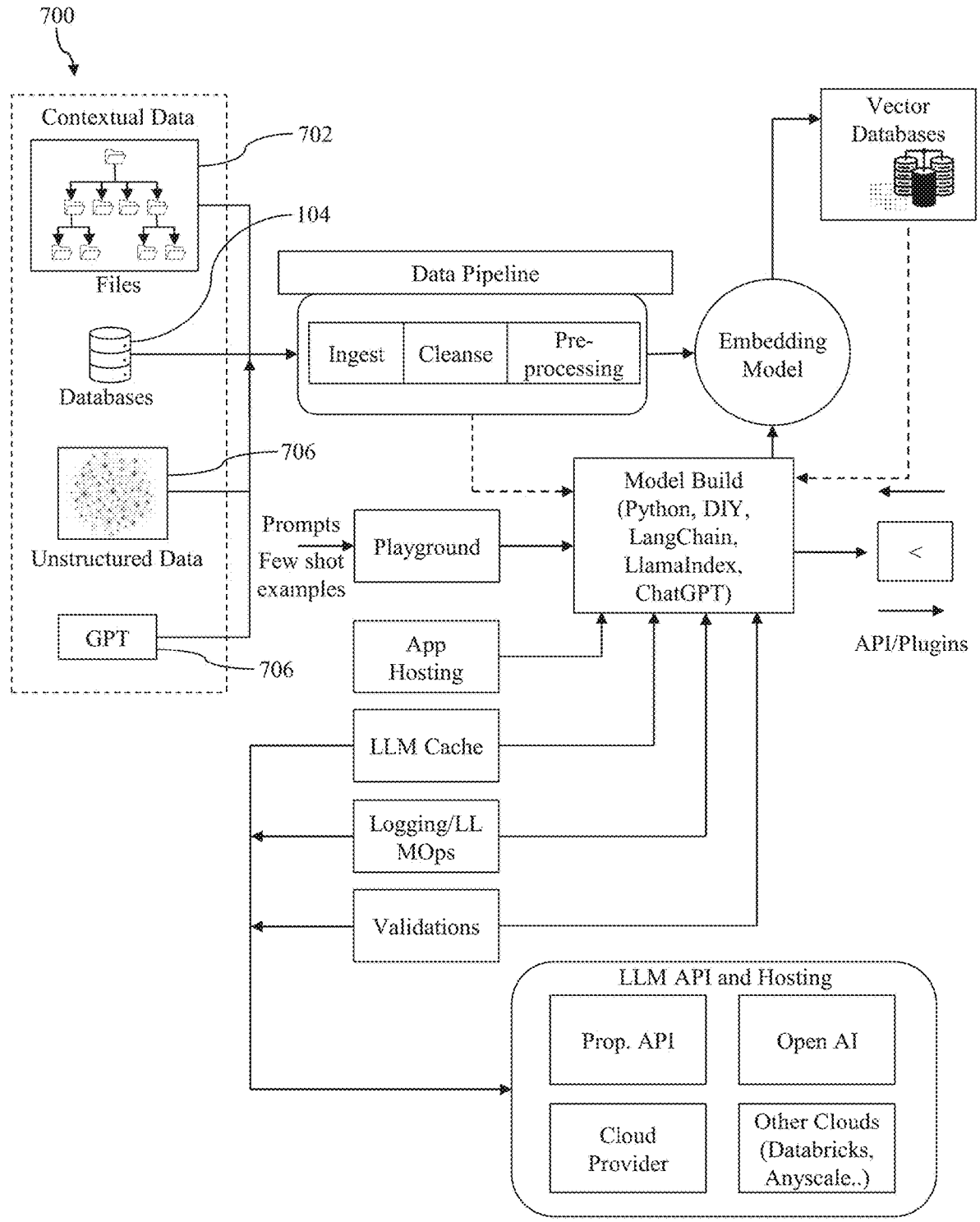
FIG. 7 illustrates a schematic diagram representing a high-level architecture of the artificial intelligence (AI) driven autonomic applications management framework in the one or more environments, in accordance with an embodiment of the present disclosure.

FIG. 7 illustrates a schematic diagram 700 representing a high-level architecture of the artificial intelligence (AI) driven autonomic applications management framework in the one or more environments 116, in accordance with an embodiment of the present disclosure. The high-level architecture of the artificial intelligence (AI) driven autonomic applications management framework is initiated with a data ingestion from one or more sources including at least one of: the one or more electronic devices 106 associated with the one or more users, and the one or more databases. The one or more data 702 may include the information associated with the one or more service level agreements (SLAs) and the one or more service level objectives (SLOs) corresponding to the one or more applications in the one or more environments 116. The one or more service level agreements (SLAs) and the one or more service level objectives (SLOs) are generally stored in contracts, documents and electronic mails. In an embodiment, the one or more data 702 may bring specificity to data context.

In an embodiment, the one or more service level agreements (SLAs) and the one or more service level objectives (SLOs) are typically documented in at least one of: contracts, emails, and other written agreements. The one or more data 702 may be crucial for some reasons. The one or more service level agreements (SLAs) and the one or more service level objectives (SLOs) provide specific details about the expectations and commitments between parties involved, including a service provider and its customers. The SLAs and SLOs outline precise metrics, benchmarks, and performance targets. The SLAs and SLOs may include valuable information associated with at least one of: a scope of services, response times, uptime guarantees, and penalties for non-compliance. The above said information ensures that both parties have a clear understanding of what is expected.

The SLAs and SLOs may provide context by defining the rules and conditions under which the one or more services may be delivered. The context may help in interpreting and enforcing the agreements effectively. The well-defined SLAs and SLOs may facilitate informed decision-making on generating the one or more actions to the one or more corresponding services. The SLAs and SLOs allow the organizations to assess whether the service providers are meeting their commitments and make necessary adjustments or decisions based on the one or more data. The SLAs and SLOs establish accountability by setting expectations for performance. If there are disputes or issues, the SLAs and SLOs may serve as a reference point to determine responsibility and liability.

The SLAs and SLOs are essential components of business agreements that ensure the quality and reliability of the one or more services and provide a foundation for effective communication, monitoring, and decision-making between the parties involved. The one or more data 702 are significant as the data provide more information about various SLAs, SLOs, and terms about the organization. The one or more data 702 brings the specific semantic and logical reasoning with pure context which helps in core decision-making. In an embodiment, the one or more data 702 for SLA, SLO contracts are generally stored in pdf, word, text, emails, and the like. In an embodiment, the one or more data 702 are utilized by at least one of: the software architecture, an infrastructure architecture, the information of a selected technology, and the one or more monitoring platforms, for fine-tuning a static model (i.e., the large language model).

The one or more organizations may use one or more service management tools or software to track and manage the SLAs and SLOs. The one or more service management tools may store the SLAs and SLOs in a structured database or the computer-implemented system 102, making the one or more service management tools easier to monitor and report on performance of the one or more applications. The one or more data 702 is high structured by nature in terms of SLAs and SLOs, metrics and rules. The one or more data 702 need to be ingested into the computer-implemented system 102.

In an embodiment, there may be references and discussions about the SLAs and SLOs in unstructured text documents, emails, and communications logs. In such a scenario, the natural language processing model is used to extract and analyse one or more relevant information from the unstructured text/data 704. In an embodiment, the generative pre-trained transformer (GPT) 706 may provide a wealth of information associated with the SLAs, SLOs and associated metrics in a generic context. The one or more data from the GPT 706 provides for the generic semantics and logical context to build out the meta framework for SLAs, SLOs and associated metrics.

In an embodiment, the one or more data 702 from the one or more sources need to be cleansed of any irregularities. In an embodiment, the one or more data 702 are processed (i.e., pre-processing of the one or more data 702) to determine the one or more semantics and structure of the one or more natural language texts associated with the one or more service level agreements (SLAs). The processing of the one or more data includes breaking the one or more natural language texts associated with the one or more service level agreements (SLAs) to be learned by the trained first artificial intelligence (AI) model to determine the one or more semantics and structure of the one or more natural language texts.

For example, the service level statement "SLO for performance refers to minimum response rate of less than 30 ms for web applications" is broken to determine how the large language model learns from the documents. In an embodiment, the web application may be selected to explain the semantic analysis, structure analysis, and implicit rules. In the semantic analysis, a meaning statement describes a service level objective (SLO) related to the performance of the web applications. Specifically, the meaning statement specifies a criterion for performance, stating that the minimum response rate should be less than 30 milliseconds (ms). This means that the web application should ideally respond to user requests within this timeframe to meet the defined performance standard. In the semantic analysis, a context is within the realm of web development and performance optimization. The SLOs are common metrics used to set goals and to measure the performance of the web applications. The context further implies that achieving a response rate of less than 30 ms is considered desirable for optimal user experience and efficient operation of the web application.

In the structure analysis, a syntax of a statement is clear and grammatically correct. The syntax follows a standard sentence structure with at least one of: subject ("SLO for performance"), verb ("refers to"), and object ("minimum response rate of less than 30 ms for web applications"). In the structure analysis, a logical structure may have a logical flow, initiated with a definition of the SLO for performance and then specifying the criterion for measuring performance in terms of response rate. In the structure analysis, a technical structure of the statement lies in its quantification of performance metrics (e.g., response rate) and the specific threshold set (e.g., less than 30 ms). This provides a clear and measurable goal for assessing the performance of the web applications. The implicit rule specifies the response rate of the web applications that should be less than 30 milliseconds to meet the performance criteria.

In summary, the semantic analysis specifies the meaning and context of the statement within a domain of IT application management and performance optimization. The structure analysis may examine the grammatical and logical organization of the statement, along with its technical specifications regarding performance metrics and thresholds. The system is configured to handle more complex scenarios and applications where the one or more data are available to make decisions based on reasoning and act of the one or more data.

Figure 8:
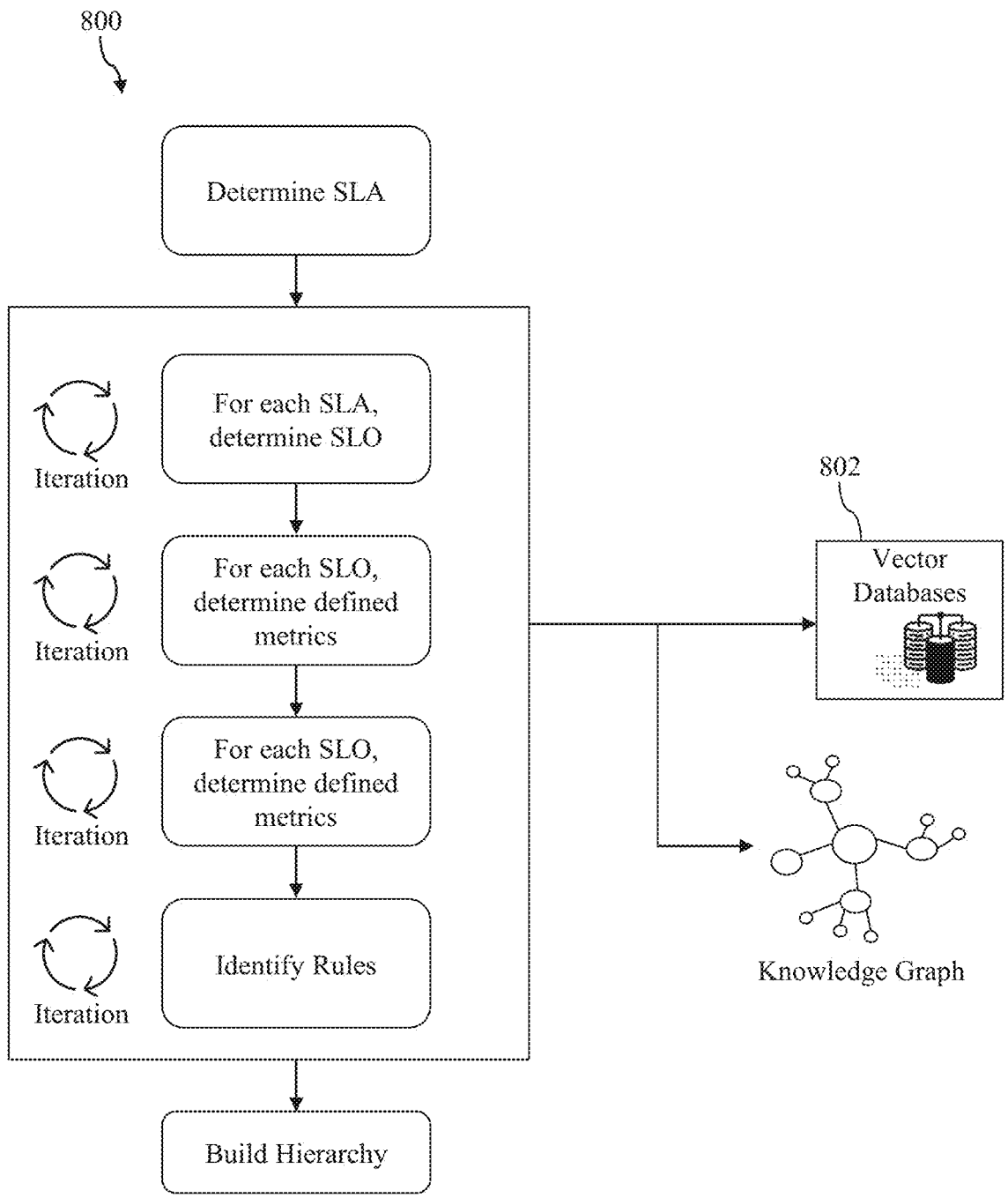
FIG. 8 illustrates a block diagram representing a process of one or more data by the artificial intelligence (AI) model to determine one or more semantics and structure of one or more natural language texts, in accordance with an embodiment of the present disclosure.

FIG. 8 illustrates a block diagram 800 representing a process (i.e., pre-process) of one or more data by the artificial intelligence (AI) model to determine one or more semantics and structure of one or more natural language texts, in accordance with an embodiment of the present disclosure. The one or more data obtained from various sources may be inputted through the preprocessing flow. The one or more data may be pre-processed when the one or more data are not well defined. This is the system's way of learning about core objectives, the metrics associated with the rules of the target system, and uses the information to generate knowledge base along with the large language model which has capabilities in understanding, evaluating, and recommending how the target system is compliant with the defined goals. The one or more data that are ingested and understood may be stored in a vector database 802.

Figure 9:
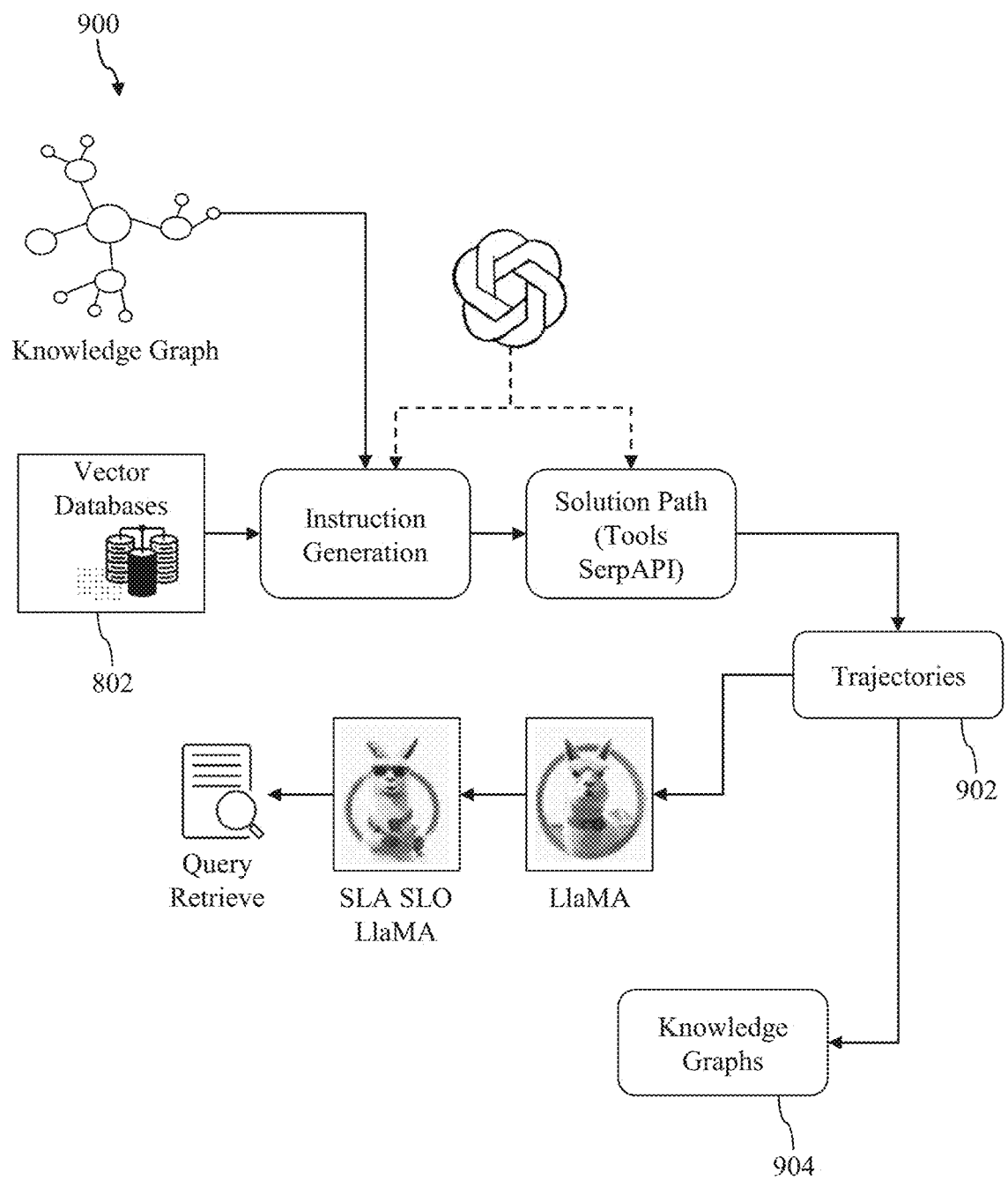
FIG. 9 illustrates a block diagram representing a fine-tuning process of the artificial intelligence (AI) model, in accordance with an embodiment of the present disclosure.

FIG. 9 illustrates a block diagram 900 representing a fine-tuning process of the artificial intelligence (AI) model, in accordance with an embodiment of the present disclosure. The large language model may understand the one or more semantics, structure, and context of the specific language which is trained. Extending the large language models to understand the semantic, structure and context of "SLA, SLO automation" domain and further understanding the real-time data which comes about as a part of monitoring the applications provide the models the ability to (a) understand a current state of the target system, (b) evaluate how compliant is the target system from the defined goals, (c) recommend the one or more actions based on intelligent insights, (d) continuous learning and evaluate new information, and (e) drive the target system towards optimized compliance. In an embodiment, the vector database 802 may have at least one of: specific data, generic and other data types.

The large language model is configured to perform complex reasoning tasks requiring expert knowledge across a wide range of fields, including in specialized domains such as programming and creative writing. The large language model may interact with humans through intuitive chat interfaces, which has led to rapid and widespread adoption among public. In an embodiment, the capabilities of large language models are focusing the seemingly straightforward nature of the training methodology. In an embodiment, auto-regressive transformers are pretrained on an extensive corpus of self-supervised data, followed by alignment with human preferences via techniques such as Reinforcement Learning with Human Feedback (RLHF). Further, the large language models may be a Linguistic Latent Attribute model (Llama 2) that is a collection of pretrained and fine-tuned generative text models ranging in scale from 7 billion to 70 billion parameters.

In an embodiment, the large language model (i.e., trained first artificial intelligence (AI) model) is fine-tuned with the determined one or more semantics and structure using one or more techniques including at least one of: few shots learning, chain of thoughts, tree of thoughts, ReACT, symbolic reasoning, self-consistency, automatic reasoning, and tool use. One or more trajectories 902, as shown in FIG. 9, are used to fine-tune the Llama 2 model and the trajectories 902 may have information associated with SLAs, SLOs and metrics and the information is updated in the knowledge graph 904.

Figure 10:
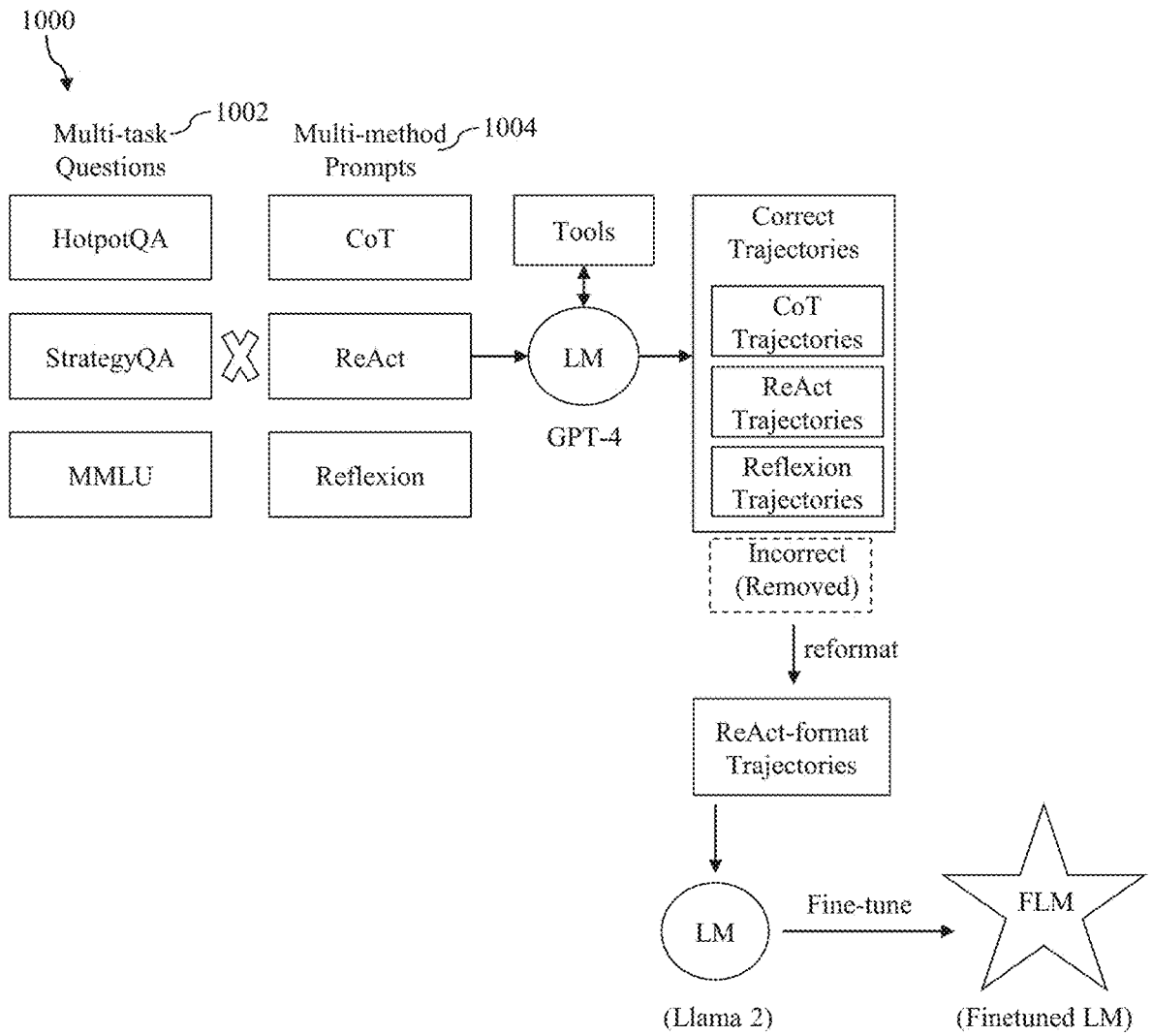
FIG. 10 illustrates a block diagram representing generation of one or more instruction sets for fine-tuning the artificial intelligence (AI) model based on one or more trajectories, in accordance with an embodiment of the present disclosure.
Figure 10:
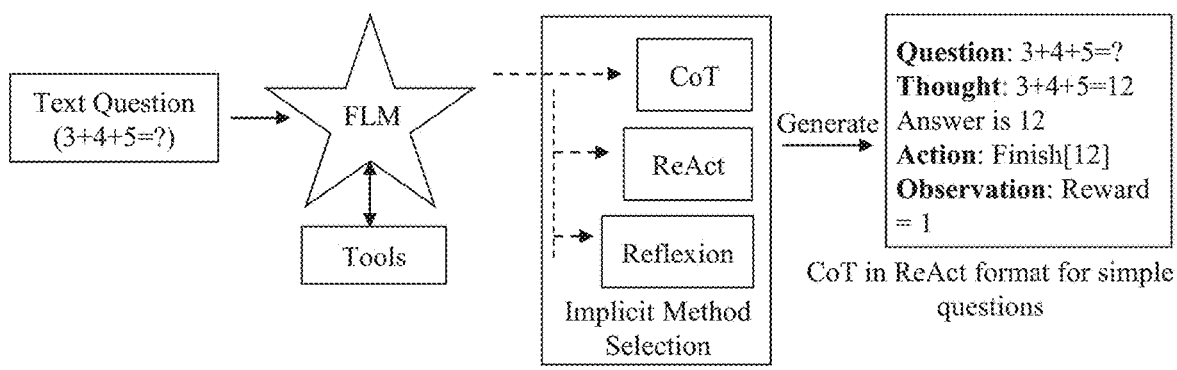

FIG. 10 illustrates a block diagram 1000 representing generation of one or more instruction sets for fine-tuning the artificial intelligence (AI) model based on the one or more trajectories, in accordance with an embodiment of the present disclosure. Training the large language model for downstream or specialized tasks may require the generation of the one or more instruction sets. The generation of the one or more instruction sets may provide power of reasoning and acting for the large language model, without which the large language model may be ineffective.

The one or more instruction sets are used for fine tuning the large language model are based on ReACT trajectories. The one or more data which are stored in the vector database 802 may have private data (i.e., obtained from the documents) and public data (i.e., obtained from gpt3, and google search). The one or more data 702 need to be converted into the one or more instruction sets, as a first set and the one or more data obtained from the vector database 802 need to be converted into one or more question answer formats 1002 to cover the reasoning and facts. The one or more question answer formats 1002 may include HotpotQA, StrategyQA, and Massive Multitask Language Understanding (MMLU).

The HotpotQA is a question-answering dataset configured to test complex reasoning and the ability to retrieve relevant facts from multiple documents to answer a query. The StrategyQA is configured to challenge the reasoning capabilities of the large language models by requiring the large language models to understand implicit questions and perform multi-step inference to arrive at a yes/no answer, often without direct evidence. The Massive Multitask Language Understanding (MMLU) is a diverse collection of multiple-choice questions across 57 subjects, aimed at evaluating an AI's breadth of knowledge and its understanding in a wide range of topics from academic subjects to professional domains.

The question sets from HotpotQA, StrategyQA, and Massive Multitask Language Understanding (MMLU), which each question set present unique challenges in reasoning and knowledge. The question sets are used to generate the one or more data for training the large language models. By utilizing various prompting techniques 1004 including at least one of: Chain of Thought (CoT), ReAct, and Reflexion, different styles of problem-solving are invoked, leading to diverse trajectories. These trajectories simulate a human-like reasoning process in the large language model, allowing the large language model to generate answers or solutions that are more aligned with how a person might think through a problem. This diversity in training helps improve the large language model's ability to handle a wide range of tasks and increases its overall robustness and effectiveness. Below is table explaining the specifics on QnA sets.

| QnA Technique | # of QnA Set | Private, Public split |
|---|---|---|
| HotpotQA | 492 | 75/417 |
| MMLU | 335 | 78/257 |
| StrategyQA | 453 | 71/382 |

The multi-prompt method 1004 may be configured to apply few-shot prompting to generate ReAct trajectories with a strong large language model, including GPT-4. This process includes creating thought-action-observation rounds to guide the large language model through task-solving processes. The multi-prompt method 1004 may be further configured to convert Chain of Thought (CoT) prompts into one-round ReAct trajectories where the "thought" is the reasoning step, and the "action" is the answer to the question. The multi-prompt method 1004 may be further configured to provide Reflexion trajectories by prompting for reflections at specific rounds, allowing the large language model to adjust its strategy in solving the one or more tasks.

In an embodiment, the large language model may utilize a search tool (e.g., Google search tool) including SerpAPI, to assist the large language model in retrieving the knowledge, which is a part of action steps in ReAct trajectories. The search tool may provide concise and relevant results to support task-solving capabilities of the large language model. In another embodiment, the large language model may utilize the prompting methods 1004 and tasks to generate a wide range of the ReAct trajectories, which are instrumental in the fine-tuning process. The aim is to expose the large language model to a broad spectrum of problem-solving scenarios. In an embodiment, the diverse set of ReAct trajectories as training data to fine-tune a smaller language model through a process analogous to knowledge distillation. This may result in the smaller language model learning to solve one or more tasks more effectively by mimicking the thought-action-observation process. The fine-tuning process explicitly aims to enhance data diversity by combining multiple training tasks and prompting methods.

In an embodiment, the fine-tuned language model is deployed for inference without the need for few-shot prompting, thereby making the process more efficient. In an embodiment, the fine-tuned agent may be capable of adapting its method based on task complexity, providing strong generalization and robustness because of the diverse learning support that the language model is received during training. In an embodiment, the performance of the fine-tuned language model is evaluated using a set of 500 dev questions from HotpotQA and questions from other datasets. In an embodiment, the evaluation focuses on exact match (EM) scores to determine an accuracy of the fine-tuned language model in answering the questions correctly.

In an embodiment, the evaluation results may be iterated to optimize the fine-tuning process. If the fine-tuned language model provides significant improvement in terms of efficiency and accuracy, the system validates the effectiveness of the fine-tuned language model. Based on the above procedures, the final ReAct trajectories are generated, leading to the fine-tuned language model that may outperform both few-shot prompted language models and those that have not undergone such systematic fine-tuning. This approach aims to harness the strengths of reasoning and acting in tandem to improve the overall performance of language agents.

In an embodiment, the large language models under new context based on fine-tuning which essentially is sending a set of prompts (e.g., few shot learning) to complete chain of thought derivation from human way of thinking which involves thought, action, observation and taking the trajectory (e.g., ReACT) with Reflexion which involves feedback and self-reflection specific data. More often ReACT and Reflexion are advanced prompting techniques which are also known as the trajectories in that the problem statement is outlined and a series of sequential actions to achieve the desired goal is provided.

Figure 11:
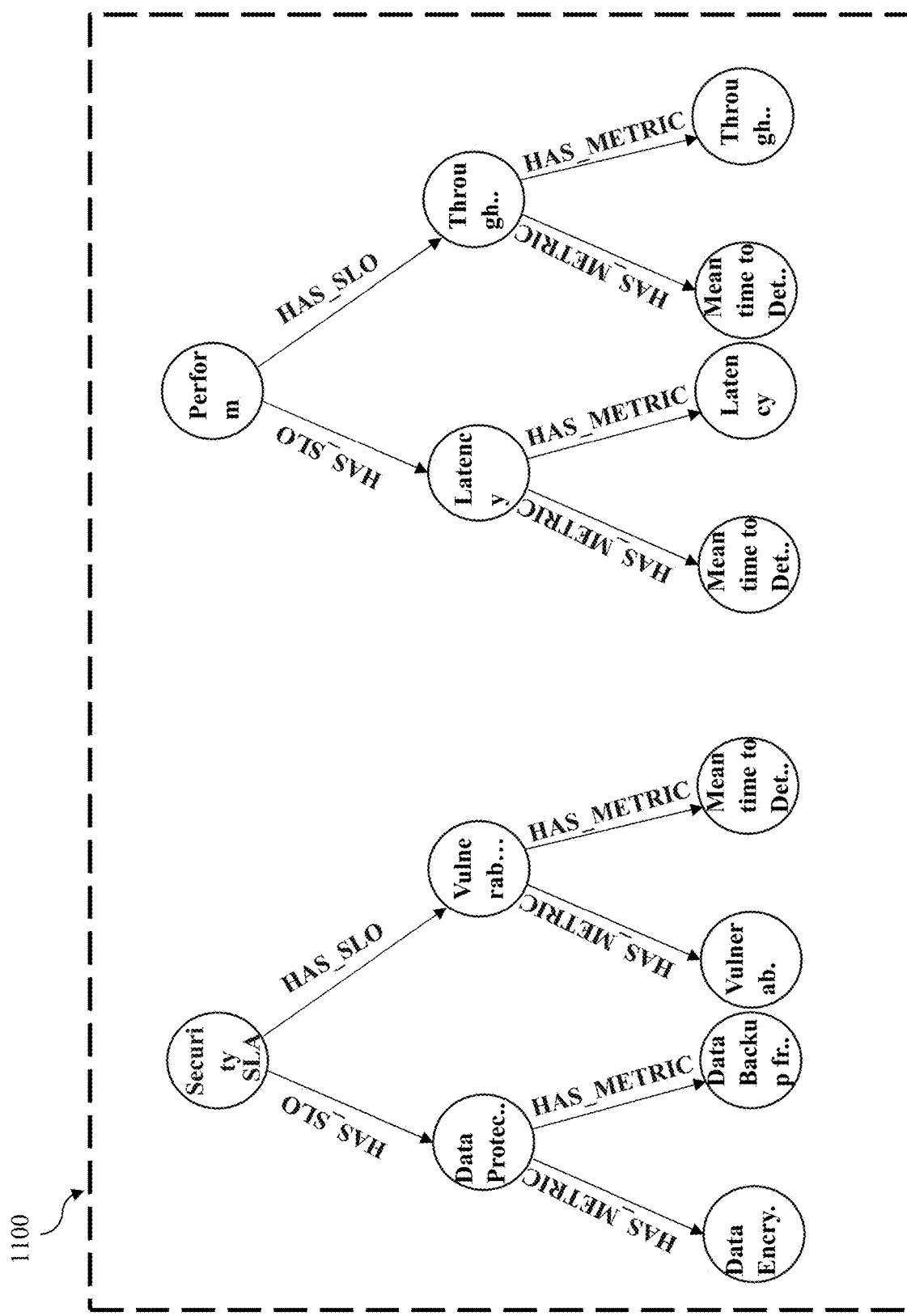
FIG. 11 illustrates a schematic diagram representing the one or more semantics and structure of the one or more natural language texts associated with the one or more service level agreements (SLAs) and the one or more service level objectives (SLOs), embedded into the fine-tuned artificial intelligence (AI) model, in accordance with an embodiment of the present disclosure.
Figure 11:
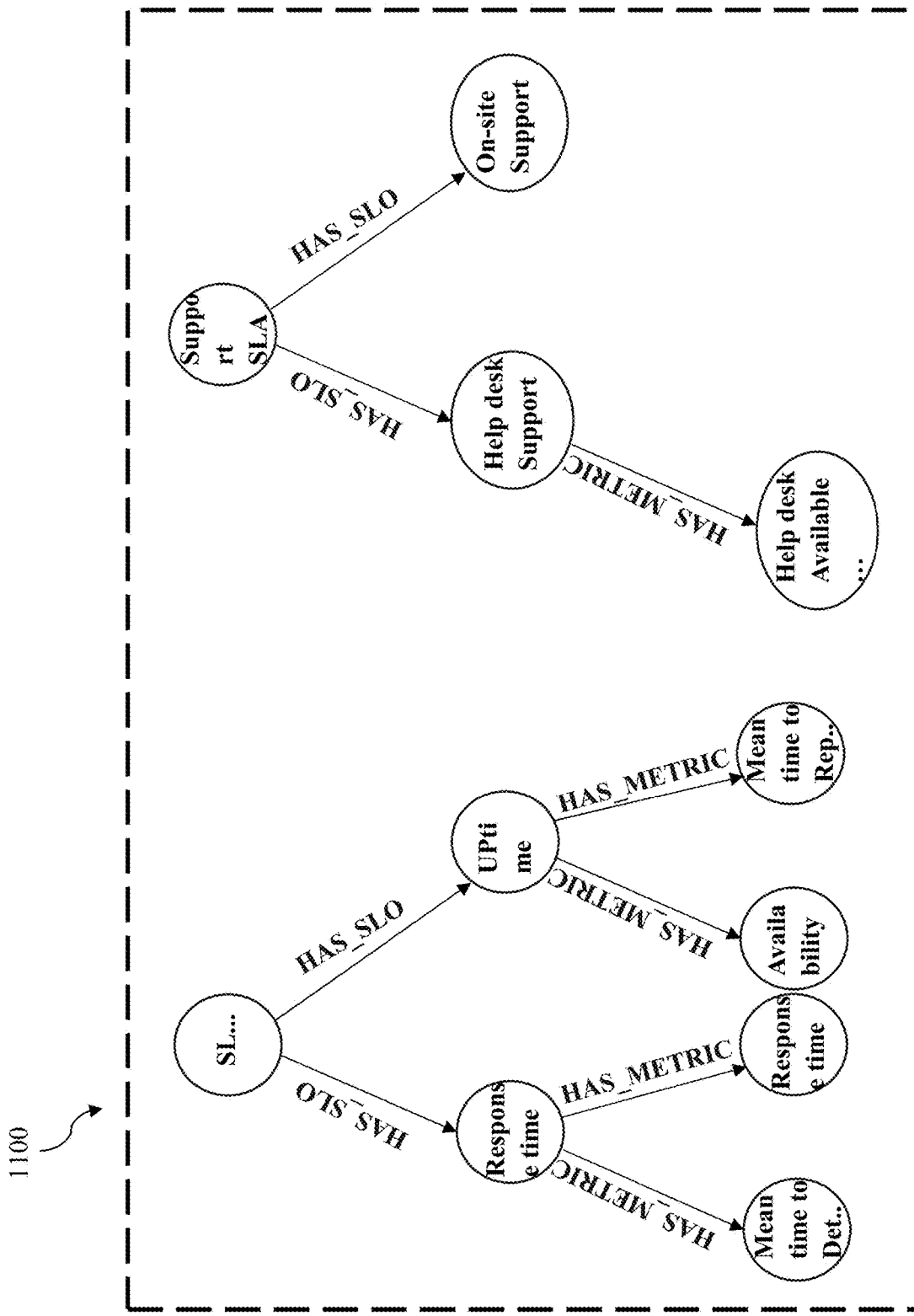

FIG. 11 illustrates a schematic diagram 1100 representing the one or more semantics and structure of the one or more natural language texts associated with the one or more service level agreements (SLAs) and the one or more service level objectives (SLOs), embedded into the fine-tuned artificial intelligence (AI) model, in accordance with an embodiment of the present disclosure. The fine-tuned language model is trained on private data from the one or more documents (which generally includes contract definitions for SLA, SLO and goals to be achieved by corporate) and public data associated with the SLA, SLO and metrics associated with domain of choice. This combined private and public data provides rich semantics and structure understanding of SLA and SLO, which is embedded into the fine-tuned language model and the knowledge graph.

The fine-tuned language model good at providing the information associated with the SLA, SLO and associated metrics, is static due to the nature of data is inputted. In an embodiment, the fine-tuned language model may reason to a certain extent with such static data. The static model is fine-tuned with the relevant information is an initial step of the process. For generating the one or more actions to ensure the SLO and associated metrics measurements meet the SLA, requires comprehensive understanding of the real-time monitoring data of the application for the language model. In an embodiment, the static model may be fine-tuned with relevant real-time data to generate the dynamic model.

The real-time data obtained from the one or more monitoring platforms tends to repeatable and verbose in nature due to the frequent captures occurring typically in minutes. Sending the entire dataset for fine-tuning the static model may not be efficient in terms of both cost and accuracy. Moreover, the large language models may not determine time series data or concept of time. Managing the time for LLM requires a distinct set of components.

Figure 12:
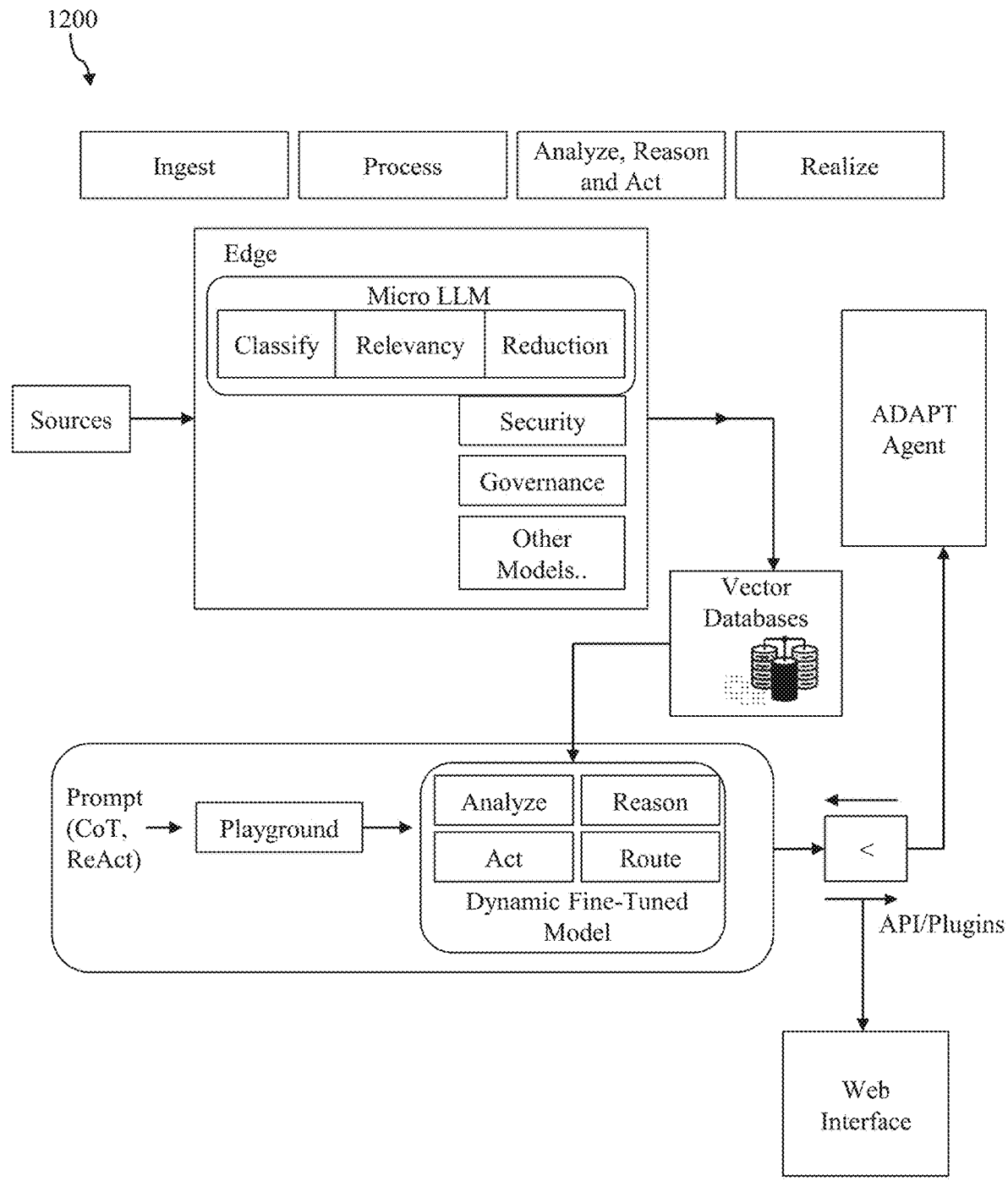
FIG. 12 illustrates a block diagram representing generation and execution of a dynamic model with the one or more real-time data, such as those show in FIG. 11, in accordance with an embodiment of the present disclosure.

FIG. 12 illustrates a block diagram 1200 representing generation and execution of the dynamic model with the one or more real-time data, such as those show in FIG. 11, in accordance with an embodiment of the present disclosure. The one or more data obtained from the one or more monitoring platforms are generally captured every minute, and the one or more data may tend to be very verbose and nature. The relevant data for decision making is usually about 40% of the actual incoming data. The incoming data arrives at a rapid rate needs to be classified, reduced and cull out the relevant data that needs to be used for fine-tuning which poses challenges to the large language model.

In order to extract the relevant data, the system utilizes a small language model (SLM). The small language model (SLM) may perform categorization, data relevancy assessment, reinforcement learning, and other specific areas of IT security and governance to streamline the processing and analysis of security-related data. By leveraging specialized SLMs for specific data types and integrating reinforcement learning techniques, the architecture ensures that only relevant and important data, along with created prompts are passed on to the Large Language Model (LLM) for further analysis. This results in improved decision-making, reduced response times, and enhanced security posture.

Figure 13:
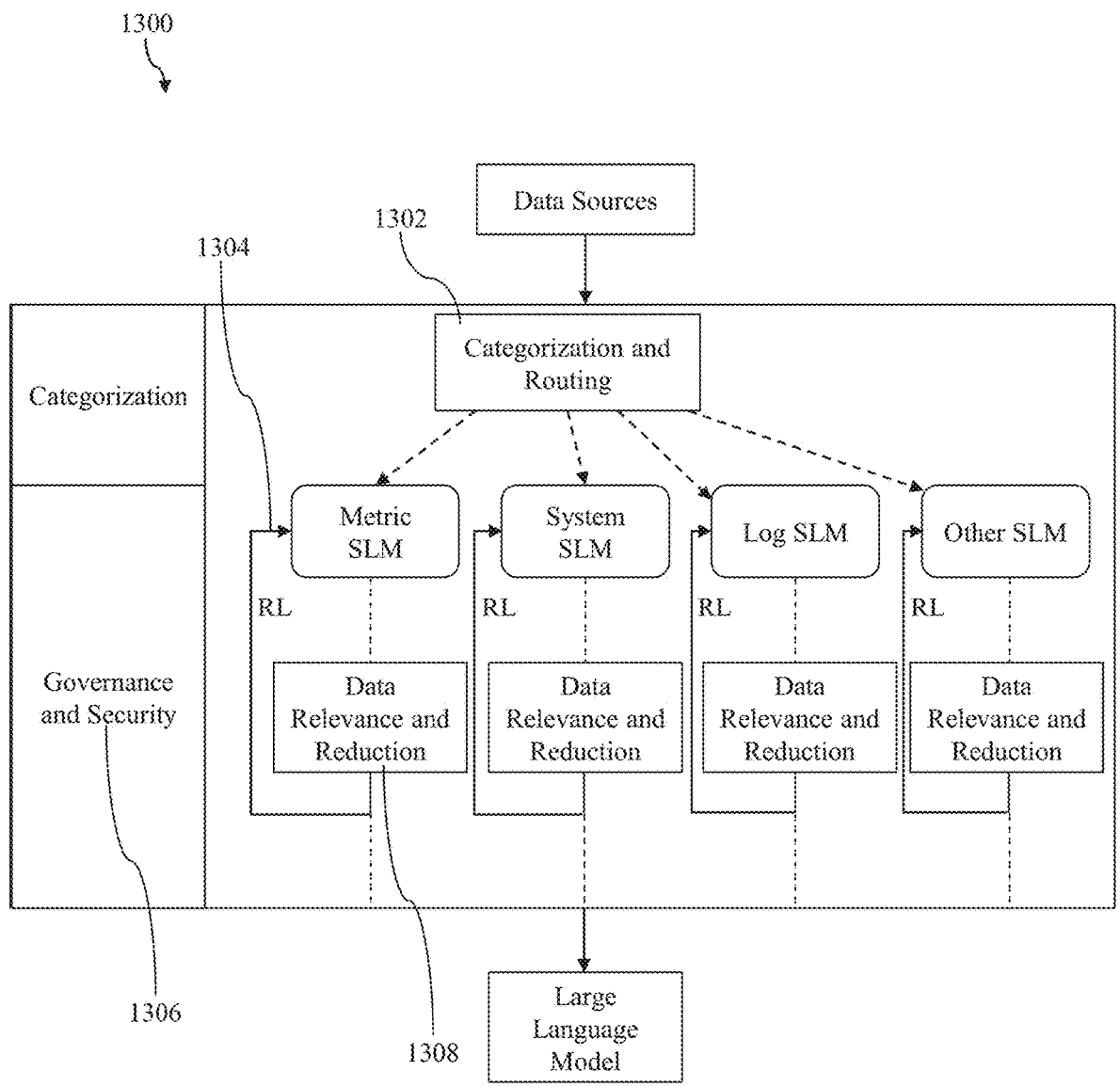
FIG. 13 illustrates a block diagram representing extraction of one or more relevant real-time data from the one or more real-time data using a small language model (SLM), in accordance with an embodiment of the present disclosure.

FIG. 13 illustrates a block diagram 1300 representing extraction of the one or more relevant real-time data from the one or more real-time data using the small language model (SLM), in accordance with an embodiment of the present disclosure. The one or more first real-time data are initially obtained from the one or more monitoring platforms using a data ingestion layer. In an embodiment, the data ingestion layer is configured to determine whether the one or more first real-time data are obtained efficiently and to preprocess the one or more first real-time data to determine whether the one or more first real-time data comprise consistency and compatibility across the one or more monitoring platforms.

Further, the one or more first real-time data may be categorized based on at least one of: one or more types of the one or more first real-time data and the one or more monitoring platforms, using a categorization and routing layer 1302. The categorization and routing layer 1302 is configured to utilize sophisticated algorithms to classify the one or more real-time data accurately and to optimize a routing process of the one or more first real-time data to determine whether the one or more first real-time data are directed to a corresponding small language model (SLM) for analysis of the one or more first real-time data.

Further, the small language model is configured to process the one or more types of the one or more first real-time data and add one or more securities (e.g., IT securities) and governance criteria 1306 to the one or more first real-time data. In an embodiment, processing of the one or more types of the one or more first real-time data may include (a) assessing the relevancy of the one or more first real-time data using the one or more pre-defined criteria, (b) mitigating the noise by filtering the one or more repetitive data points associated with the one or more first real-time data, and (c) training each small language model (SLM) to recognize the one or more patterns and anomalies within the one or more domains associated with the one or more first real-time data, to identify the one or more security-related events.

Further, the small language model is configured to mitigate the one or more data volumes by eliminating the one or more repetitive data points associated with the one or more first real-time data to determine the importance of each data point associated with the one or more first real-time data, using a data relevance assessment and reduction layer 1308. By focusing on data relevancy, the data relevance assessment and reduction layer 1308 ensures that only the most pertinent information is retained for further analysis, thereby improving the signal-to-noise ratio and enhancing decision-making capabilities.

Further, the small language model utilizes a reinforcement layer 1304 with reinforcement learning techniques to continuously train and optimize the performance of the small language model based one or more feedback and results associated with the extraction of the one or more second real-time data using a reinforcement learning layer 1304 through a language model (LM) agent. By adapting to changing data patterns and evolving threat landscapes, the reinforcement layer 1304 ensures that the SLMs remain effective and relevant over time. The small language model (SLM) is optimized by learning the one or more second real-time data from one or more historical data to analyse security-related one or more second real-time data.

The instance model which has the knowledge of the real-time data (i.e., the one or more relevance real-time data) may be better equipped to provide information and decision making for the one or more organizations. In an embodiment, the instance static model is fined-tuned, by the fine-tuning subsystem 218, with real-time data specific to SLA, SLO and metrics which then becomes the instance specific language model. Similarly, the one or more knowledge graphs generated are meta model which hold structure and semantic of language texts. The meta model is a higher-level abstraction defining one or more structure and relationships common to one or more language models within the one or more domains. The one or more knowledge graphs are one or more ontology views with one or more optimized level concepts and one or more meta-relations comprising at least one of: one or more entities, one or more attributes of the one or more entities, and one or more relationships between the one or more entities. The dynamic data obtained from various monitoring platforms help in generating the instance-view KG with fine-grained instances and relations.

Figure 14:
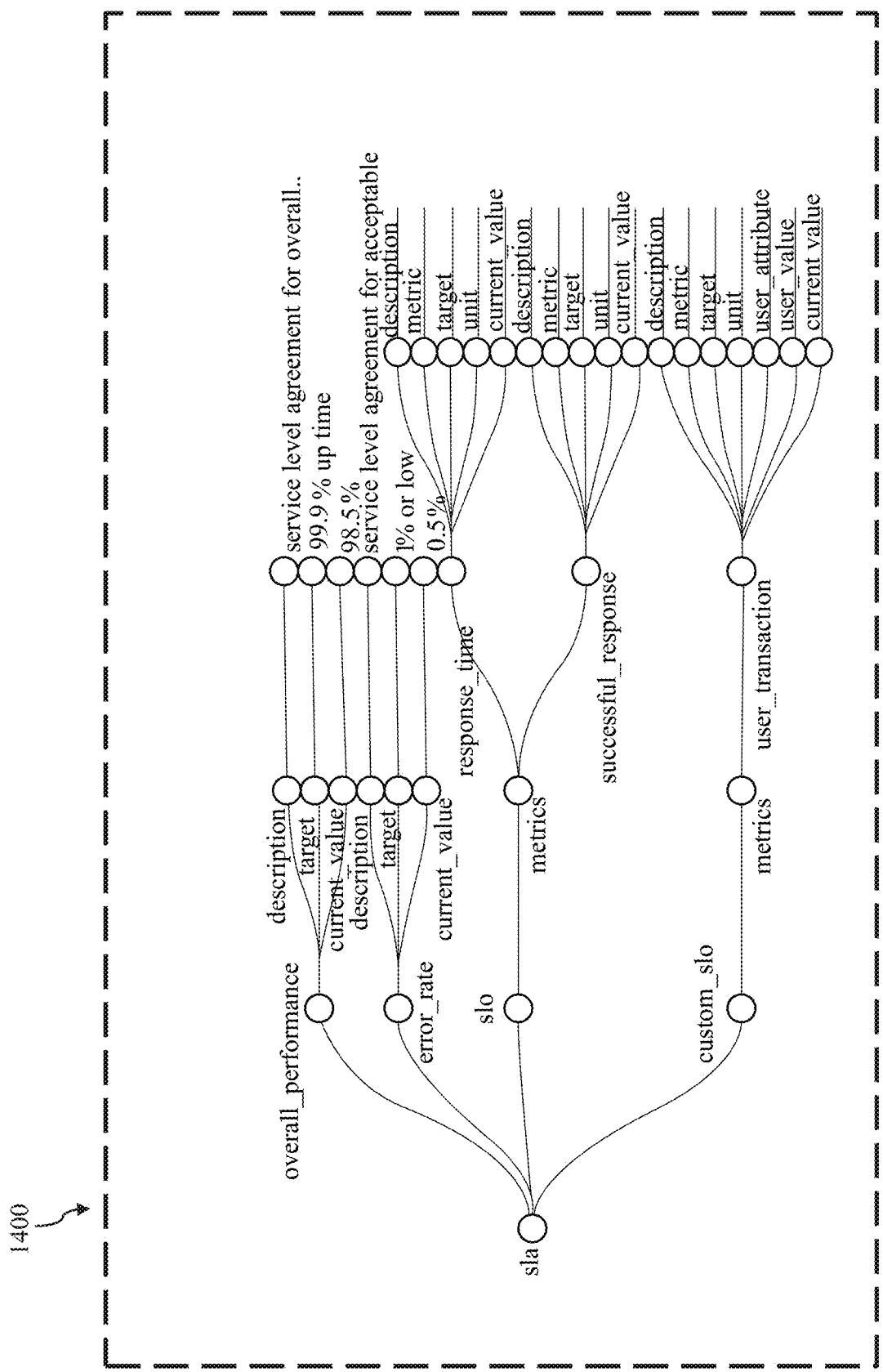
FIG. 14 illustrates a schematic diagram representing a fine-tuning process of the dynamic model to arrive at an instance language model and updation of a knowledge graph to arrive at an instance knowledge graph, in accordance with an embodiment of the present disclosure.

FIG. 14 illustrates a schematic diagram 1400 representing a fine-tuning process of the dynamic model to arrive at an instance language model and updation of a knowledge graph to arrive at an instance knowledge graph, in accordance with an embodiment of the present disclosure.

Figure 15:
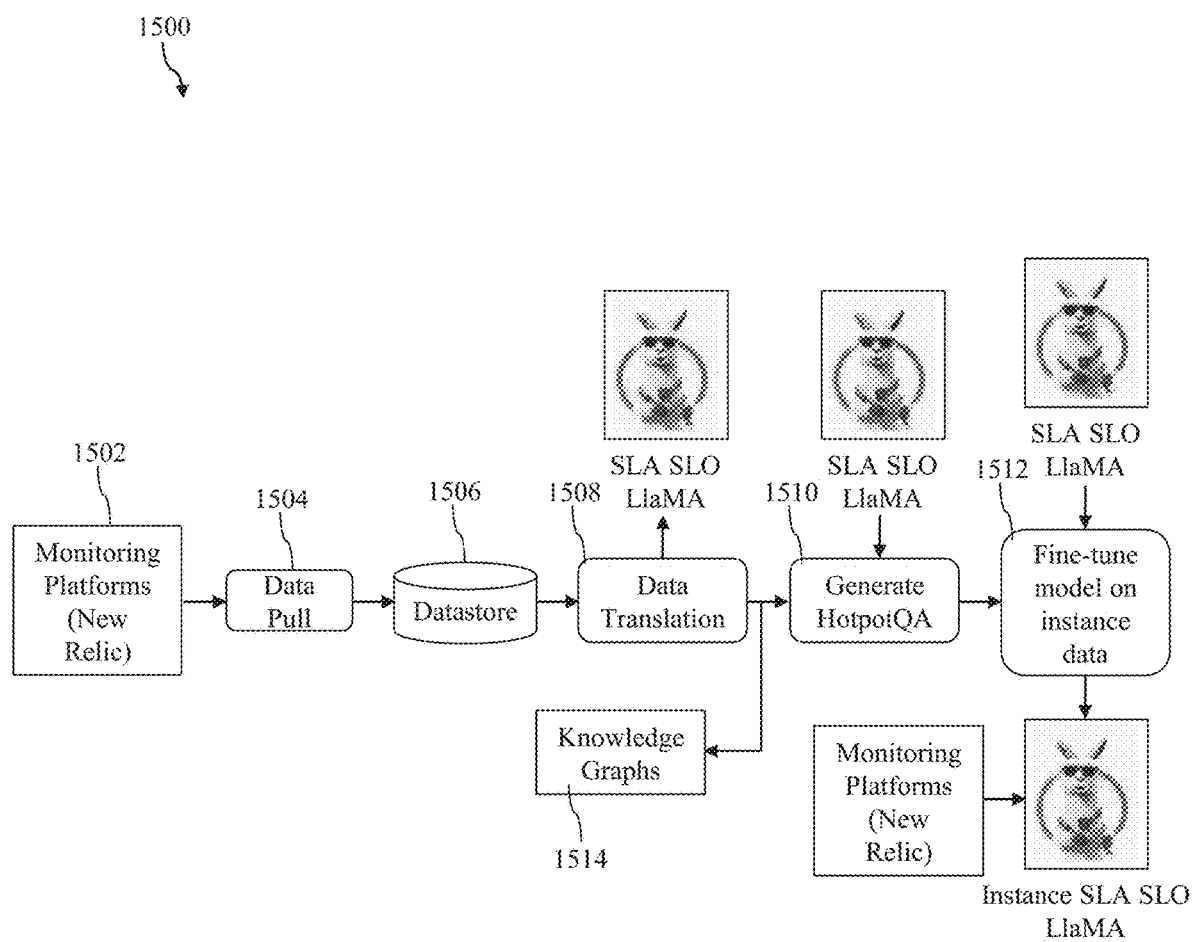
FIG. 15 illustrates a block diagram representing an integration process of the one or more real-time data, in accordance with an embodiment of the present disclosure.

FIG. 15 illustrates a block diagram 1500 representing an integration process of the one or more real-time data, in accordance with an embodiment of the present disclosure. The real-time data (i.e., instance data) for SLA, SLO, and metrics are captured by monitoring and observability platform. In an embodiment, there are one or more integration processes (e.g., New Relic Integration) which may need code to obtain the monitored specific data for current phase. The instance data pull component 1504 is configured to extract bulk and real-time data from the one or more monitoring platforms (e.g., New Relic Platform) 1502. The Observability Platform 1502 utilizes NERD API to extract the instance data. In an embodiment, the one or more instance data are stored in interim database 1506.

The one or more instance data stored in the interim database 1506 need to be translated, as shown in 1508, into one or more formats for fine-tuning the instance model. The one or more instance data need to be mapped to specific SLA, SLO and metric available in the static model fine-tuned. The mapped data need to be converted into HotpotQA, as shown in 1510, and used to fine tune the instance model. The instance model is fine-tuned, as shown in 1512, on the real-time data received on a continuous basis. In an embodiment, the one or more knowledge graphs are updated with the instance data to update one or more instance view graphs.

Even though the fine-tuned language model has reasoning capabilities, the language model (e.g., the large language model) may have fall short in the realm of effective action. In order to address the fall short, a concept of Augmented Deep Active learning for text and Planning Trajectories (ADAPT) is proposed. The ADAPT is configured to establish a comprehensive framework that enables LLMs not only to reason and act but also to undergo self-correction and self-reinforcement. The LLMs are perpetually fed and fine-tuned with the real-time data for recognizing the dynamic nature of data.

The fine-tuned language model is optimized to seamlessly orchestrate reasoning and action based the reinforcement learning using a robust framework. The framework is initially configured to generate one or more prompt templates for one or more reasonings that learn dynamically from one or more memory buffers. The framework is further configured to organize one or more future trajectories over an extended horizon using the fine-tuned first artificial intelligence (AI) model (i.e., the fine-tuned large language model). At each juncture, the fine-tuned large language model is configured to generate the one or more actions based on the organized one or more future trajectories. The fine-tuned large language model is configured to collect one or more feedback based on the generated one or more actions for the one or more services and to store the collected one or more feedback in the one or more memory buffers. Subsequently, the reasoning process is recurred to recalibrate the one or more future trajectories, leveraging the updated state from the collected one or more feedback. In an embodiment, the orchestrated interplay between reasoning and action not only enhances the model's adaptability but also ensures a continuous refinement of its decision-making process in response to real-world dynamics.

The learning and planning phases operate as a series of states, initially focusing on sequential complexity. The Markov Decision Process (MDP) becomes instrumental in aiding the development of the one or more future trajectories based on the one or more memory buffers. The process includes (a) generating the one or more future trajectories over a long horizon based on the one or more memory buffers and (b) Replanning the one or more future trajectories from the new state post the LLM's initial action.

Figure 16:
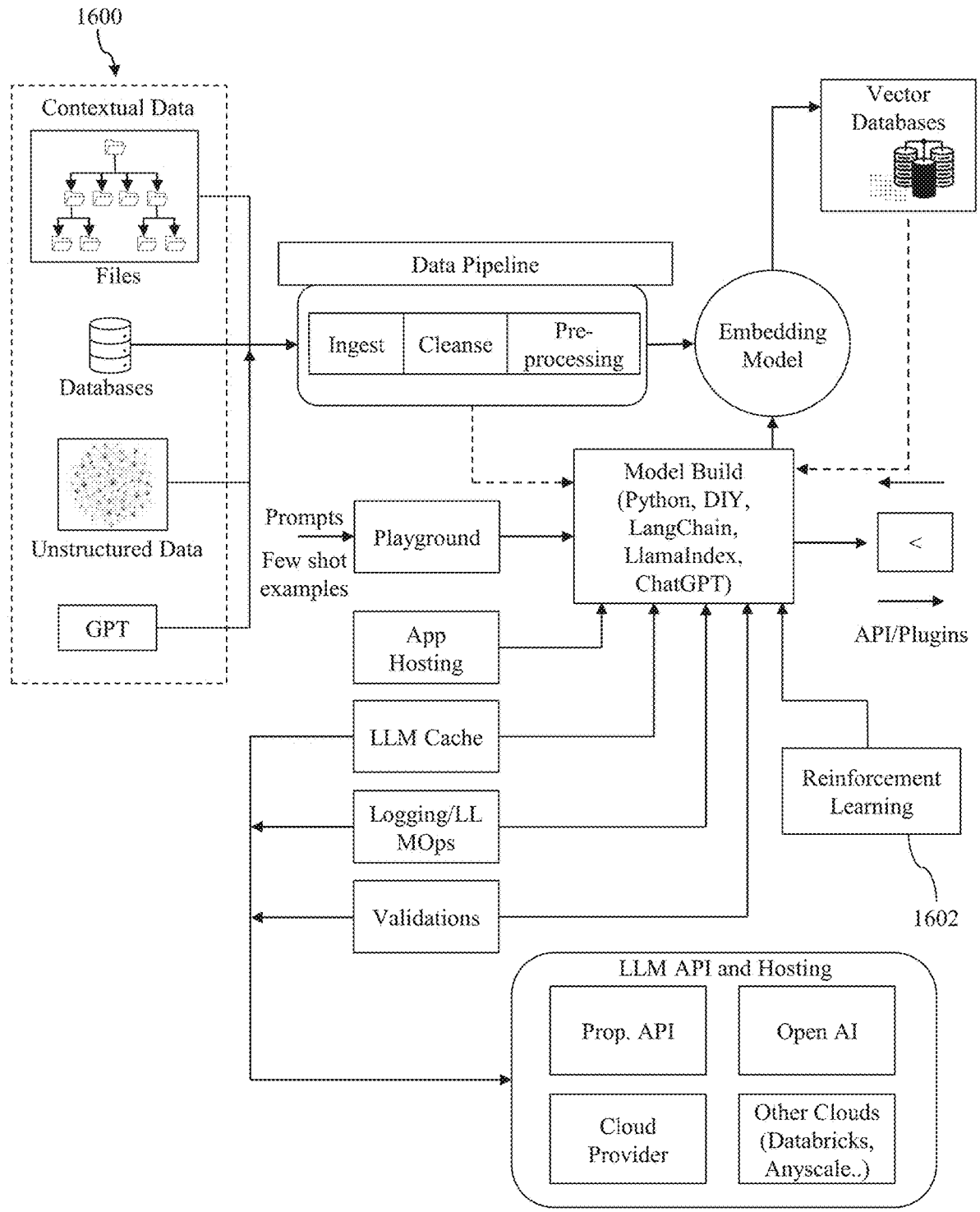
FIG. 16 illustrates a block diagram representing an integration process of a reinforcement learning (RL) into the dynamic model (i.e., large language model (LLM)), in accordance with an embodiment of the present disclosure.

FIG. 16 illustrates a block diagram 1600 representing an integration process of a reinforcement learning (RL) into the dynamic model (i.e., large language model (LLM)), in accordance with an embodiment of the present disclosure. Incorporating the reinforcement learning (RL) 1602 into the dynamic model (e.g., the large language model (LLM)) helps overcome challenges in language generation, especially when the LLM generates unclear or incorrect responses. By incorporating the RL 1602, the dynamic model may actively learn from human preferences and refine its responses over time. When the LLM generates uncertain or suboptimal outputs, the RL 1602 facilitates the collection of valuable human feedback, allowing the dynamic model to adapt and enhance its language generation capabilities. This iterative learning process contributes to the creation of more contextually accurate, relevant, and user-friendly responses.

Figure 17:
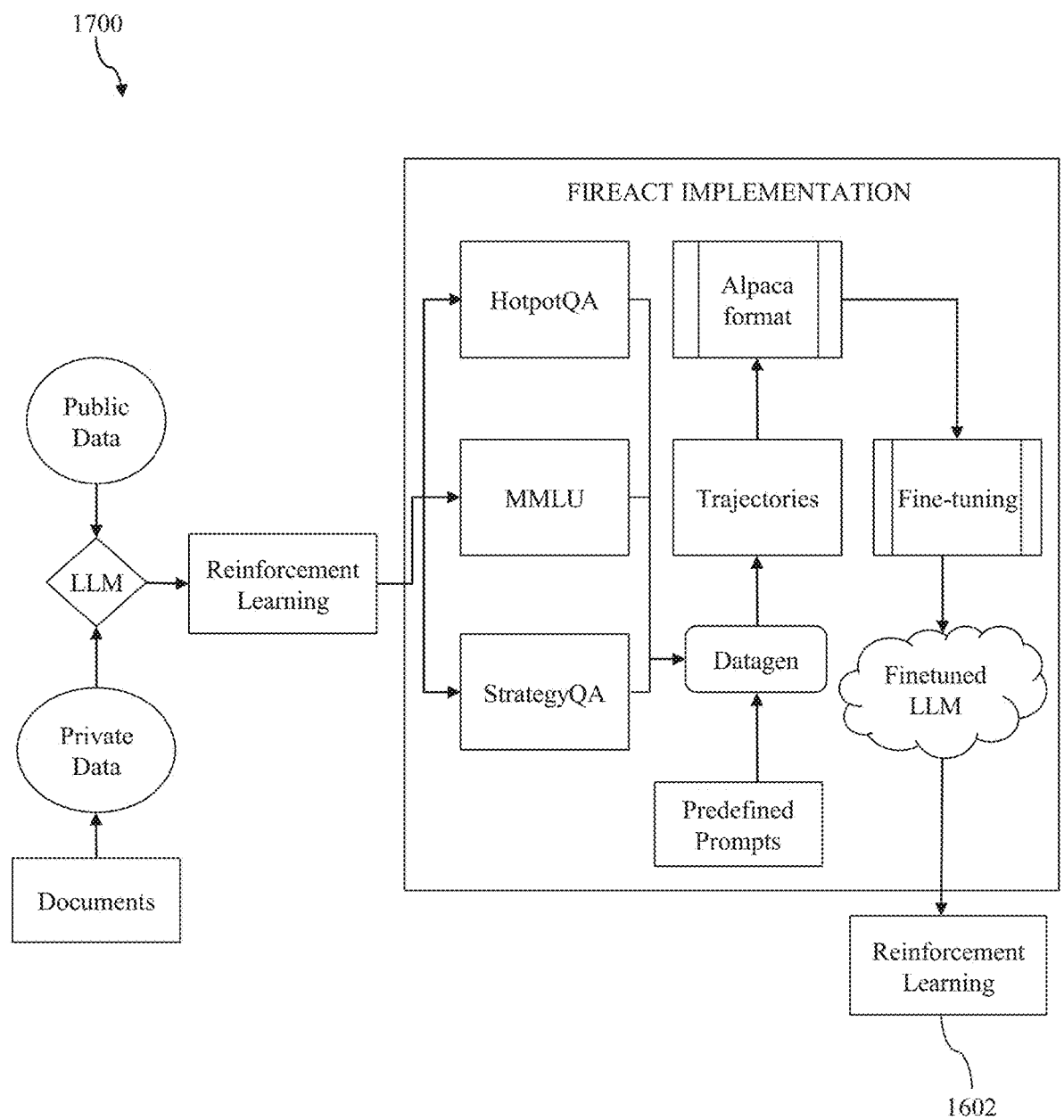
FIG. 17 illustrates a block diagram representing a process of the reinforcement learning (RL) into the dynamic model (i.e., large language model (LLM)), in accordance with an embodiment of the present disclosure.

FIG. 17 illustrates a block diagram 1700 representing a process of the reinforcement learning (RL) 1602 into the dynamic model (i.e., large language model (LLM)), in accordance with an embodiment of the present disclosure. The reinforcement learning (LR) 1602 may play a crucial role in the dynamic model. In automated method, if the dynamic model requires several iterations during a process of matching response quality, an impute logging mechanism is implemented. Specifically, if the iteration count exceeds threshold limits, the reinforcement learning (LR) 1602 may intervene to generate a response. The impute logging is diligently tracked in all instances to monitor the iteration count and maintain the quality of responses. Even when the response is achieved within a limited number of iterations, the reinforcement learning (LR) 1602 is implemented on demand to enhance the quality of the response. The impute Logging is crucial in this context as well, ensuring that the intervention and its impact on response quality is tracked appropriately.

Figure 18:
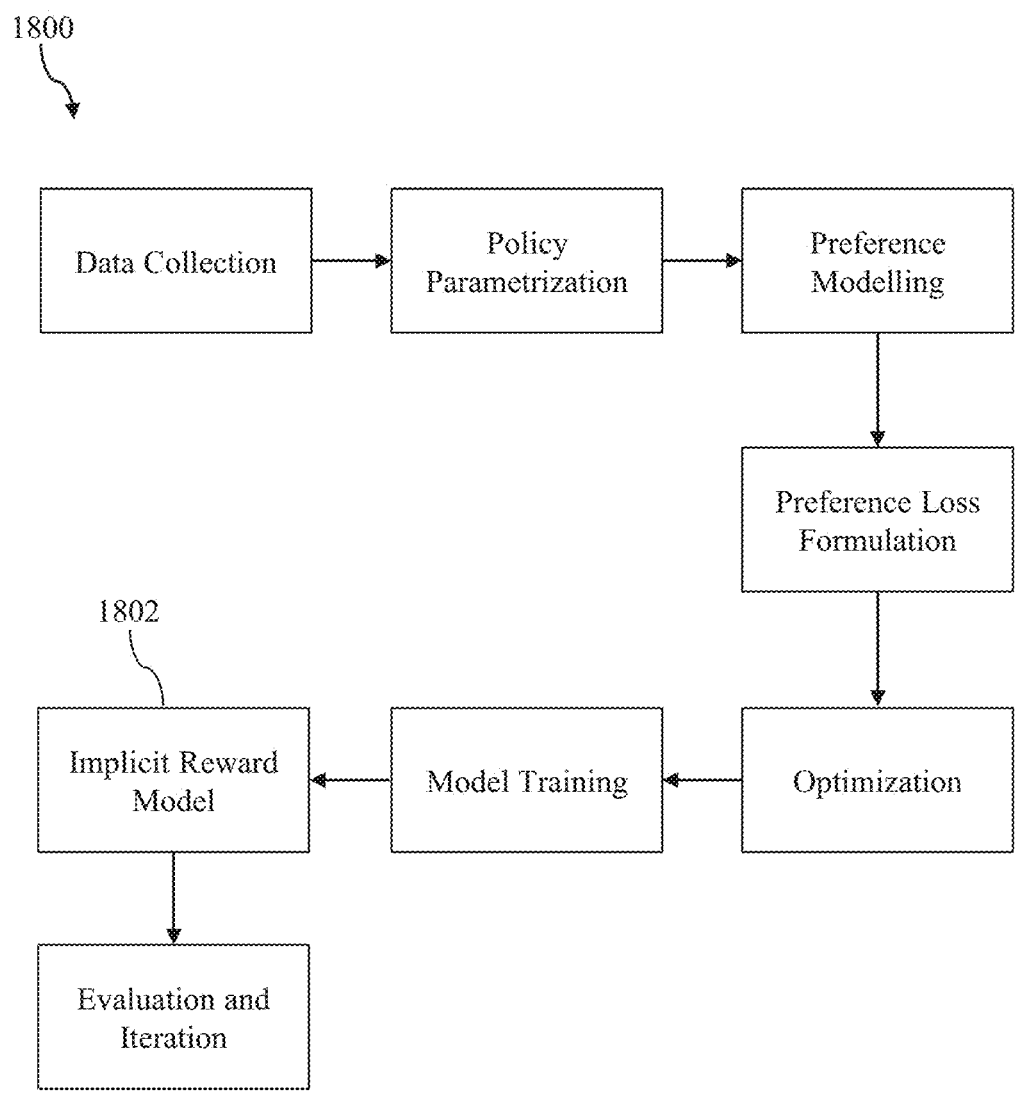
FIG. 18 illustrates a block diagram representing an integration process of direct proximal optimization (DPO) within the large language model (LLM), in accordance with an embodiment of the present disclosure.

FIG. 18 illustrates a block diagram 1800 representing an integration process of direct proximal optimization (DPO) within the large language model (LLM), in accordance with an embodiment of the present disclosure. In the incorporation of Reinforcement Learning (RL) 1602 within the Large Language Model (LLM), a pivotal aspect involves the integration of Direct Proximal Optimization (DPO). The DPO is employed to directly optimize one or more policies by satisfying preferences through a straightforward classification objective. This entails fitting an implicit reward model 1802, from which the optimal policy may be extracted in a closed form. The innovative approach presented herein leverages the DPO to enhance the performance of the LLM, marking a distinctive advancement in the field. The DPO is embedded within the LLM model to eliminate constraints of traditional RL separate loops, fostering a streamlined and cohesive framework. This integration enhances synergy between language understanding and RL-based decision making, enabling dynamic policy reinforcement during language generation.

The SLA, SLO automation needs a core decision making framework, which may engage with fine-tuned dynamic model in an intelligent conversation to derive recommendations action based on the current state of the system's SLO and associated metrics. While the dynamic model is getting the real time data from the small language model which in turn gets the one or more data from the one or more monitoring platforms, the act of reasoning and deciding actions needs agent which engages in the meaningful conversation. The framework which performs reasoning to take action is called (ADAPT). Below are the steps of execution for agent which executes reasoning and action for the system in question while interacting with fine-tuned dynamic model to get the intel. The agent mat start off by querying the fine-tuned dynamic model about the initial state of the application or system. The agent generally responds back with C1-S1, C2-S2, C3-S3 . . . CnSm, where C is a component. The system or application may include one or more components.

Figure 19:
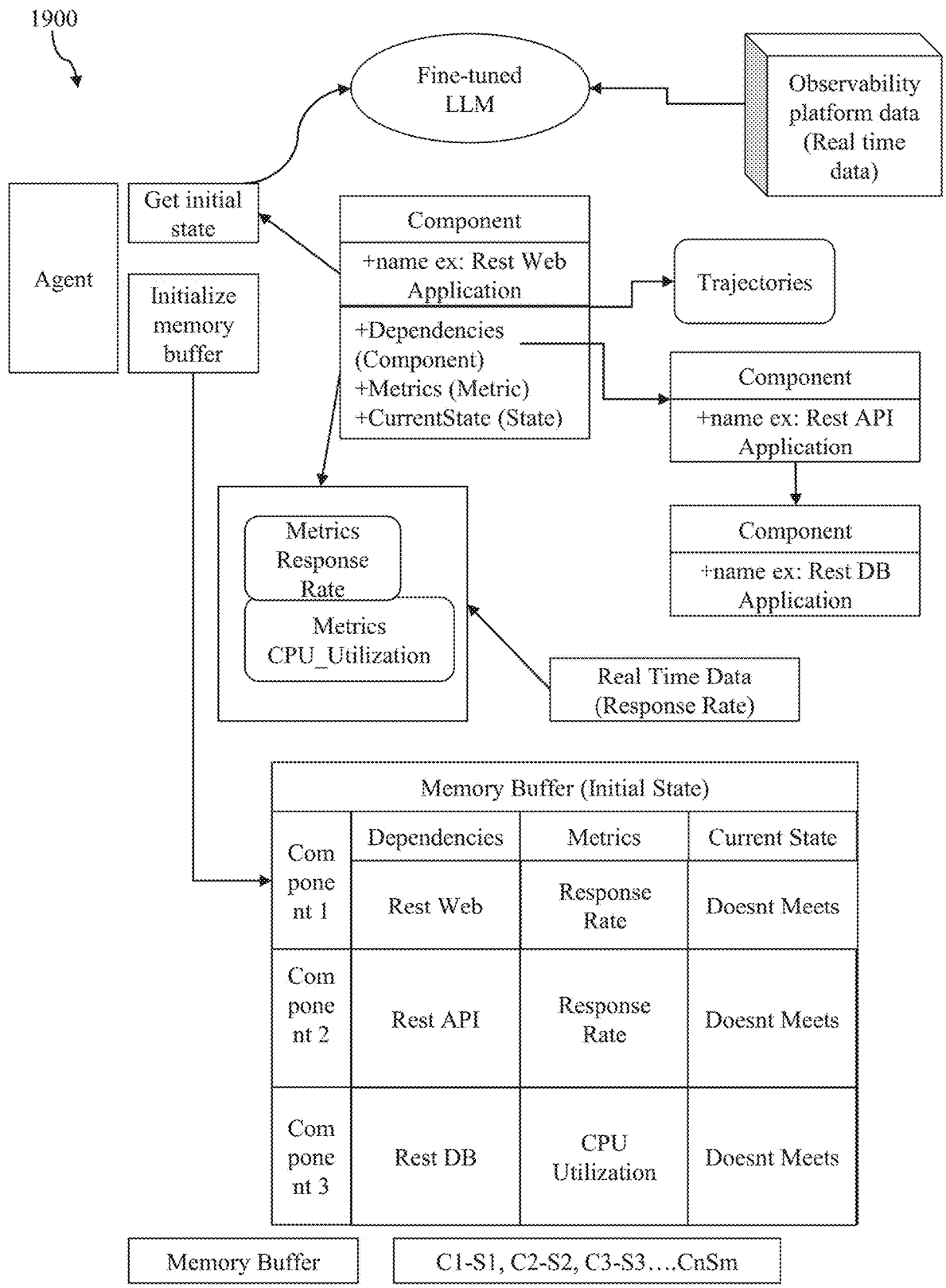
FIG. 19 illustrates a block diagram representing generation of one or more plan trajectories to accomplish in meeting the one or more service level objectives (SLOs) based on an initial state of the one or more service level objectives (SLOs) and associated metrics, using a fine-tuned large language model, in accordance with an embodiment of the present disclosure.

FIG. 19 illustrates a block diagram 1900 representing generation of one or more plan trajectories to accomplish in meeting the one or more service level objectives (SLOs) based on an initial state of the one or more service level objectives (SLOs) and associated metrics, using the fine-tuned large language model, in accordance with an embodiment of the present disclosure.

Figure 20:
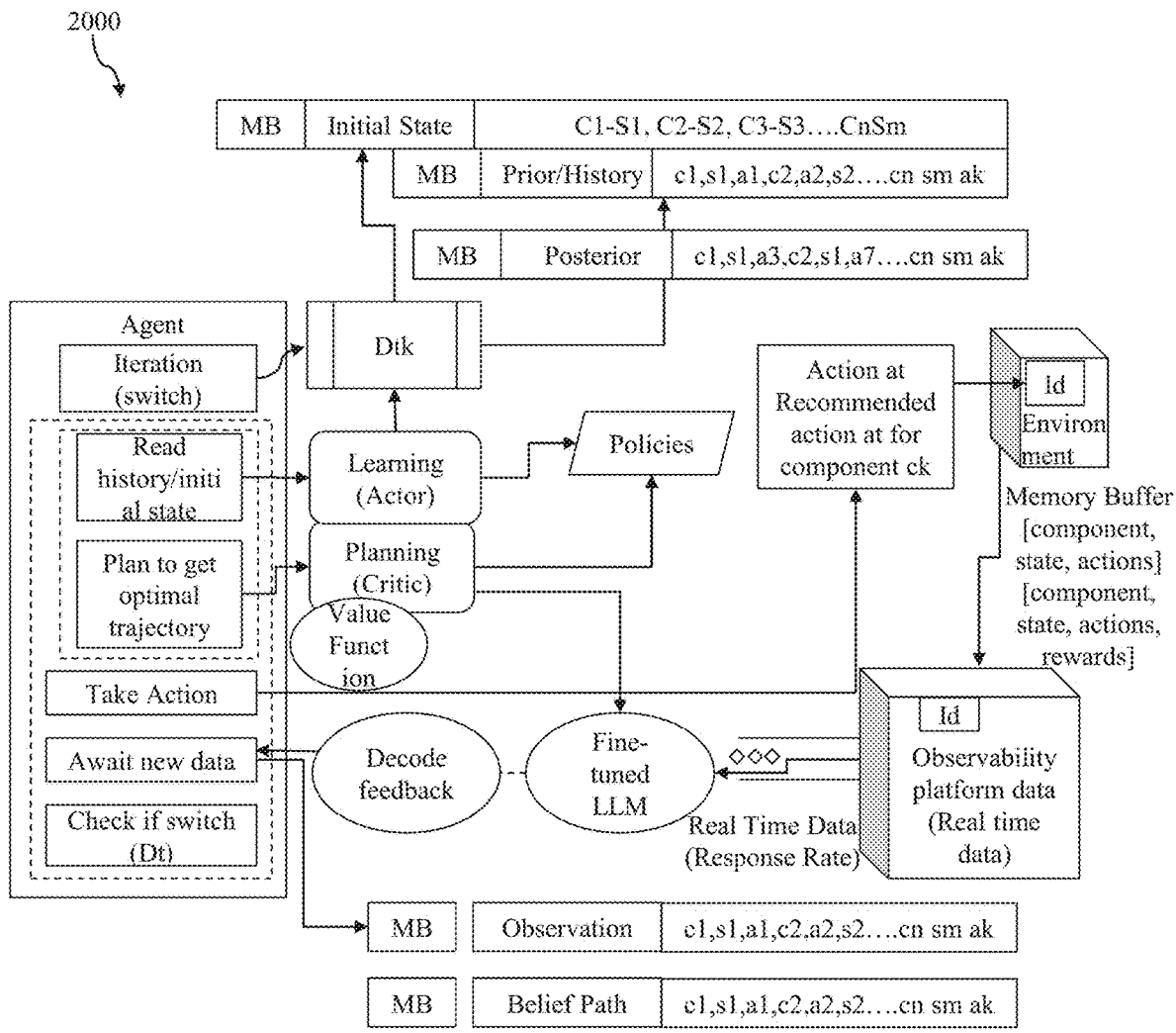
FIG. 20 illustrates a block diagram representing execution of an agent (Augmented Deep Active learning for text and Planning Trajectories (ADAPT) agent) to generate one or more actions to be applied to the one or more environments using the fine-tuned large language model, in accordance with an embodiment of the present disclosure.

FIG. 20 illustrates a block diagram 2000 representing execution of an agent (Augmented Deep Active learning for text and Planning Trajectories (ADAPT) agent) to generate the one or more actions to be applied to the one or more environments 116 using the fine-tuned large language model, in accordance with an embodiment of the present disclosure. The large language model (LLM) is initiated by forming an updated posterior of an unknown environment from the one or more memory buffers, emphasizing an optimal trajectory that maximizes the value function during planning. The learning and planning subroutines operate in an "in context" learning manner, emulating an actor-critic update for Markov Decision Processes (MDPs). While the reinforcement learning (RL) revolves around the collecting feedback, tailoring the reinforcement learning (RL) for the large language models (LLMs) poses challenges due to discrepancies between numerical systems in the reinforcement learning (RL) and token-based descriptions in the large language models (LLMs). The large language models (LLMs) are trained on a general corpus and remain fixed throughout the interactive process, making the large language models different from traditional reinforcement learning (RL) actors and critics.

In order to address these conceptual discrepancies, the proposal is to formalize reasoning and acting under an MDP framework, with a latent variable of interest being an unknown environment. The starting point is the full history of states, providing a structured approach to optimize performance, meet SLAs, and manage resources responsibly. The idea is to formalize reasoning and acting under the MDP where the latent variable of interest is unknown environment. A starting point is a full history of states. For example, the application's operational states for this specific project are denoted as S={S1, S2, S3}, where S1 represents an initial state, S2 represents does not meet, and S3 represents a final state.

The above said states may serve as representations of the application's performance, emphasizing the goal of optimizing its functionality to consistently meet the SLA. However, achieving this objective must be balanced with resource considerations, as resources come with associated costs. Striking an optimal balance involves ensuring the application meets the SLA within defined resource constraints, considering factors including at least one of: cost, compliance, governance, and other infrastructure limitations. In essence, the challenge lies in optimizing performance while responsibly managing and allocating resources to achieve the desired operational state. In an embodiment, the information state at the initial point includes at least one of: (a) full cast of history of states and (b) action, rewards, and their linguistic summaries. The information states are loaded into the one or more memory buffers, in the Bayesian MDP. In an embodiment, the information state at the initial point is a snapshot of a situation from the beginning and includes (a) a complete record of what has happened in the past (i.e., history of states) and (b) information associated with the actions taken, the rewards received, and a summary of these in everyday language.

Further, the comprehensive information state is loaded into the one or more memory buffers, which is the decision-making system. The one or more memory buffers store all this knowledge for future reference. In the context of the Bayesian MDP, using a probabilistic approach, the information may not be fixed, acknowledging that there's uncertainty, and the representation of the knowledge as probabilities. As the system interacts with the outside environment 116, the information state may collect feedback. This feedback is like the results of the actions (e.g., what worked well, what didn't, and the outcomes the system observes). with each step of our decision-making process, use the feedback gathered to determine what action would be best. The system learns from experience and performs the process based on historical data. In an embodiment, external reasoning suggests that the decision-making process is not happening in isolation. The information is considered from the external environment 116, learning from the environment 116 and updating the one or more actions accordingly.

Figure 21:
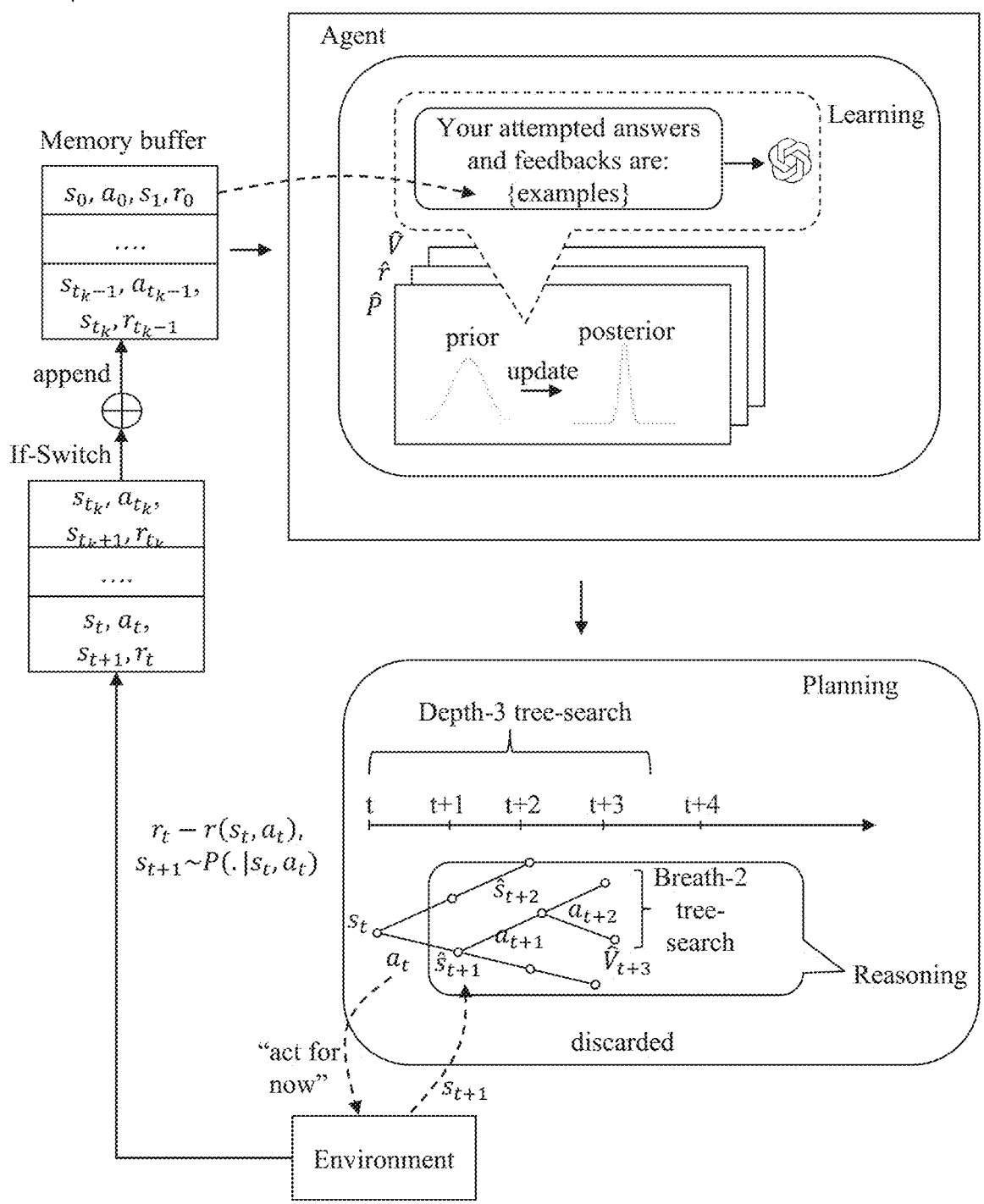
FIG. 21 illustrates a schematic diagram representing learning and planning procedures of the ADAPT agent, in accordance with an embodiment of the present disclosure.

FIG. 21 illustrates a schematic diagram 2100 representing learning and planning procedures of the ADAPT agent, in accordance with an embodiment of the present disclosure. In the beginning, the one or more memory buffers are initialized to store information associated with agent's interactions with the external environments 116. As the agent interacts with the external environment 116, the one or more memory buffers sequentially record the information at each time. The recorded information may be at least one of: (a) a current state of the external environment 116, the one or more actions taken by the agent based on the current belief state, (c) sensory information received from the environment 116, considering partial observability in Partial Observable Markov Decision Processes (POMDPs), and an immediate reward obtained by the agent.

In an embodiment, In the POMDPs, the belief state buffer is crucial. After each observation, the belief state buffer is updated based on the current observation and the previous belief state. This reflects the agent's evolving understanding of the environment 116. In another embodiment, a learning subroutine of the ADAPT agent is invoked at periodically or after each interaction. The learning subroutine is configured to access the historical data in the one or more memory buffers, including states, actions, observations, rewards, and belief states. The learning subroutine is further configured to update the internal model based on the collected feedback. In the POMDPs, the learning subroutine involves adjusting the transition and observation models considering the belief state updates.

Further, the planning subroutine is triggered to generate one or more optimal trajectories for future steps. The planning subroutine is configured to access the one or more memory buffers to retrieve one or more relevant historical data. For the POMDPs, the belief state is integrated into the planning process, allowing the agent to plan the one or more trajectories that account for uncertainty and partial observability. In each time step, the agent makes decisions based on the current belief state and planned one or more trajectories. The decision incorporates the uncertainty inherent in the POMDPs, providing a realistic representation of decision-making under partial observability.

As the agent continues to interact with the environment 116, the one or more memory buffers are updates in realtime. In an embodiment, new entries are added, and older entries may be compressed or cleared, ensuring the one or more memory buffers remain manageable. In an embodiment, the system's performance is validated empirically, considering scenarios that reflect partial observability. The memory buffer's effectiveness is assessed in capturing relevant information for learning, planning, and decision-making. Based on the empirical results, the system iteratively refines at least one of: the configuration of the one or more memory buffers, the learning subroutine, and the planning subroutine parameters. In an embodiment, the system is fine-tuned to achieve better performance in real-world scenarios. Finally, the integration process is documented, the adjustments are made, and an impact of POMDP principles on one or more memory buffer operations, which are communicated to the one or more electronic devices 106 associated with the one or more users. In summary, the one or more memory buffers seamlessly integrate with the ADAPT agent and the POMDP, providing a comprehensive mechanism for learning, planning, and decision-making in scenarios with partial observability and complex dynamics.

In an embodiment, the state may be characterized by partial observability due to shared and virtualized nature of an infrastructure supporting the application. Observations are limited to how the application performs under constraints, influenced by a load placed on a underlying physical resource. The application states, denoted as S={Sinit, Sdoes-not-meet, Sfinal}, serve as representations of the application's operational status. In an embodiment, Sinit represents an initial state, Sfinal represents optimal performance meeting or exceeding SLA standards, and Sdoes-not-meet represents varying degrees of SLA non-compliance.

In an embodiment, the state space is continuous, allowing nuanced adjustments, especially in the Sdoes-not-meet state, which quantifies the percentage of SLA achievement. The overarching objective is SLA fulfilment, but within the crucial constraint of resource costs. This constraint adds a layer of complexity, as optimizing performance that must align with financial considerations. In an embodiment, striking a balance between meeting SLA targets and navigating constraints like cost, compliance, governance, and infrastructure limitations adds a compelling dimension to the problem at hand.

In an embodiment, in the Markov Decision Processes (MDPs), the state space may pose challenges, especially when dealing with large or continuous state spaces. One primary issue is the computational complexity associated with exploring and representing the entire state space. As the number of states increases, algorithms may struggle to efficiently compute optimal policies, estimate value functions, or perform dynamic programming updates. However, the Partially Observable Markov Decision Processes (POMDPs) may address some of the challenges posed by the MDPs, particularly in situations where the true state is not fully observable. In many real-world scenarios, the agent may not have complete knowledge of the underlying state. The POMDPs explicitly model the partial observability by providing observations. The observations may provide indirect information about the true state, allowing the agent to update its belief or probability distribution over possible states. Instead of explicitly tracking the full state space, the POMDPs may utilize a belief state, which is a probability distribution over possible states given past observations and actions. The belief state may capture the uncertainty about the true state and is updated as the agent receives new observations.

In an embodiment, the POMDPs incorporate observation models that define the likelihood of observing certain data given the true state. These observation models allow the agent to make inferences about the state based on observations, even in cases of partial observability. The POMDPs may include the one or more actions configured to gather information and reduce uncertainty. The one or more actions, often referred to as sensing or exploration actions, enable the agent to strategically select observations that provide the most valuable information for decision-making. Instead of directly mapping from states to the one or more actions (as in MDPs), the POMDPs involve policies that operate over the belief states. A policy in the POMDP maps from belief states to the one or more actions, taking into account the uncertainty inherent in partial observability. In an embodiment, the POMDPs is solved to determine policies that maximize expected cumulative rewards over time. Various techniques, including at least one of: point-based methods, Monte Carlo methods, and approximate dynamic programming, have been developed to efficiently compute approximate solutions to POMDPs. While the POMDPs provide a framework for modelling decision-making under uncertainty, the POMDPs also introduce their own set of challenges, such as increased computational complexity due to the belief state representation. Nonetheless, the POMDPs offer a more realistic representation of decision problems in uncertain environments, making the POMDPs suitable for a wide range of applications, including robotics, autonomous systems, and human-machine interaction.

In an embodiment, the Partially Observable Markov Decision Processes (POMDPs) may address a state space problem focused in the Markov Decision Processes (MDPs) by introducing the concept of belief states and explicitly modeling the partial observability of the underlying system. In the POMDPs, instead of representing the state space directly, the agents may maintain a belief state, which is a probability distribution over possible states given the history of observations and actions. The belief state captures the agent's uncertainty about the true state, incorporating information from observations and actions. The POMDPs may incorporate observations, which are indirect and often noisy indicators of the true state. The observation models may define the probability of observing certain data given the true state. These observation models may help the agent to update its belief state based on the observed information. In an embodiment, the POMDPs may explicitly model situations where the agent cannot directly observe the true state. This is particularly relevant in real-world scenarios where complete information may be unavailable. By including observations and belief states, the POMDPs enable the agents to make decisions considering partial observability, taking into account the uncertainty about the true state.

The POMDPs allow for the inclusion of actions configured to gather information. These actions, often referred to as sensing or exploration actions, enable the agent to strategically select the observations that provide the most valuable information for decision-making. The Information-gathering actions may help in reducing uncertainty in the belief state, improving the agent's ability to make informed decisions. In the POMDPs, the policies map from belief states to the actions, acknowledging the inherent uncertainty in the observed data. Instead of selecting the actions based on the current state (as in MDPs), the POMDP policies consider the distribution of possible states captured in the belief state. In an embodiment, the POMDPs is solved to determine policies that maximize the expected cumulative rewards over time. Various techniques, including at least one of: the point-based methods, the Monte Carlo methods, and the approximate dynamic programming, have been developed to efficiently compute approximate solutions to POMDPs. The above said methods may exploit the structure of the belief space to navigate the decision-making process under partial observability. In an embodiment, by introducing the belief states and explicitly modelling partial observability, the POMDPs provide a more realistic and flexible framework for decision-making in uncertain environments, effectively addressing the challenges associated with the state space problem seen in traditional MDPs.

In an embodiment, in the context of Partially Observable Markov Decision Processes (POMDPs), an action space refers to a set of possible actions that an agent may take in each state. Unlike in fully observable environments, where the agent has complete information associated with the current state, the POMDPs involve uncertainty and partial observability. In the POMDPs, the agent may not directly observe the underlying state but may receive observations that are probabilistically related to the true state. The action space may encapsulate all the possible decisions or moves that the agent may make to influence the system. Each action in the action space is associated with a policy, defining the agent's strategy for selecting actions based on its current belief associated with the state.

In an embodiment, the complexity of the action space in the POMDPs arises from the need to make decisions under uncertainty. Since the agent may not have full knowledge of the state, the agent must consider the possible observations it might receive and select actions that are robust across different potential states. This involves reasoning about the uncertainty in the environment 116 and updating the belief state accordingly. The configuration of the action space is a critical aspect of POMDP formulation. The configuration requires at least one of: system dynamics, information provided by observations, and agent's objective. The agent aims to select actions that maximize expected cumulative rewards over time, taking into account the uncertainty in its knowledge.

In an embodiment, the action space may include four distinct actions, each associated with a corresponding function. The four distinct actions may include scale_up action, scale_down action, restart_service action, and rollback_updates action. The scale_up action may suggest increasing capacity or resources allocated to the system. The scale_up action is commonly employed to handle increased demand or workload. Scaling up may involve adding more servers, increasing computing power, or expanding resources to improve system performance. The scale_down action may involve reducing the allocated resources or capacity of the system. Scaling down is often used when the demand or workload decreases, allowing for cost savings using fewer resources. The restart_service action implies stopping and then restarting a particular service or component within the system. Restarting a service may help resolve issues, apply updates, or refresh the system to an initial state. The rollback_updates action may involve reverting to a previous state or version of the system, typically undoing recent updates or changes. The rolling back updates is a strategy used when new changes introduce unexpected issues, and returning to a known and stable state is necessary.

These actions are commonly associated with managing the scalability, reliability, and stability of the system. The selection of action depends on the specific requirements, challenges, and goals of the system and the environment 116 in which the action is performed. Incorporating these actions into an action space allows an agent or the system to dynamically respond to changing conditions, optimizing its performance and resource utilization.

In an embodiment, the ADAPT (i.e., the reason for acting and acting for the reason) architecture, configured in a context of the reinforcement learning, may provide a framework for combining reasoning and decision-making. While the POMDPs (Partially Observable Markov Decision Processes) and the ADAPT share a common goal of addressing decision problems under uncertainty, the POMDPs and ADAPT together operate at different levels and may be complementary. In an embodiment, the POMDPs are configured to handle decision problems where the underlying system is only partially observable. The POMDPs explicitly model uncertainties in the state space and observations, allowing agents to make decisions under incomplete information. In an embodiment, the Augmented Deep Active learning for text and Planning Trajectories (ADAPT) agent with the Partial Observable Markov Decision Processes (POMDPs) is configured to monitor the one or more services for adjusting one or more governance principles in the one or more environments (i.e., in one or more uncertain environments).

The POMDPs may utilize a belief state, which is a probability distribution over possible states given past observations and actions. The belief state may capture the agent's uncertainty about the true state of the system. The ADAPT's emphasis on reasoning aligns with the concept of belief states in the POMDPs. The reasoning may involve understanding the current state of the system, considering available information, and making the decisions based on a logical thought process. The ADAPT may introduce an idea of "Reason for Acting," emphasizing the importance of understanding the reasons behind an action. This aligns with the notion in the POMDPs that agents make the decisions based on their belief about the true state, derived from observations. The ADAPT may provide an architecture where reasoning and acting are integrated, allowing for a more coherent and explainable decision-making process. This integration may complement the POMDPs by providing a mechanism for agents to reason about their beliefs before taking actions.

The ADAPT may emphasize self-correction and learning from experience. In the context of the POMDPs, agents may use feedback from observations to update their belief states and improve their decision-making strategies over time. In an embodiment, both ADAPT and POMDPs may be adapted to manage the one or more real-time data. The POMDPs may incorporate observations into the belief state, and ADAPT's self-correction mechanism allows the agents to adapt to changing conditions. The ADAPT's approach to acting for a reason resonates with the flexibility of action selection in POMDPs. In an embodiment, the agents may select the actions based on their belief state and the information gained from observations.

In an embodiment, the ADAPT is a broader architecture that encompasses reasoning and acting more generally, whereas the POMDPs specifically address decision problems under partial observability. The integration of the ADAPT with the POMDPs would involve leveraging the principles of reasoning and self-correction in conjunction with the belief state representation and decision-making strategies inherent in the POMDPs. The specific implementation details may depend on the application and the requirements of the decision problem at hand.

Figure 22:
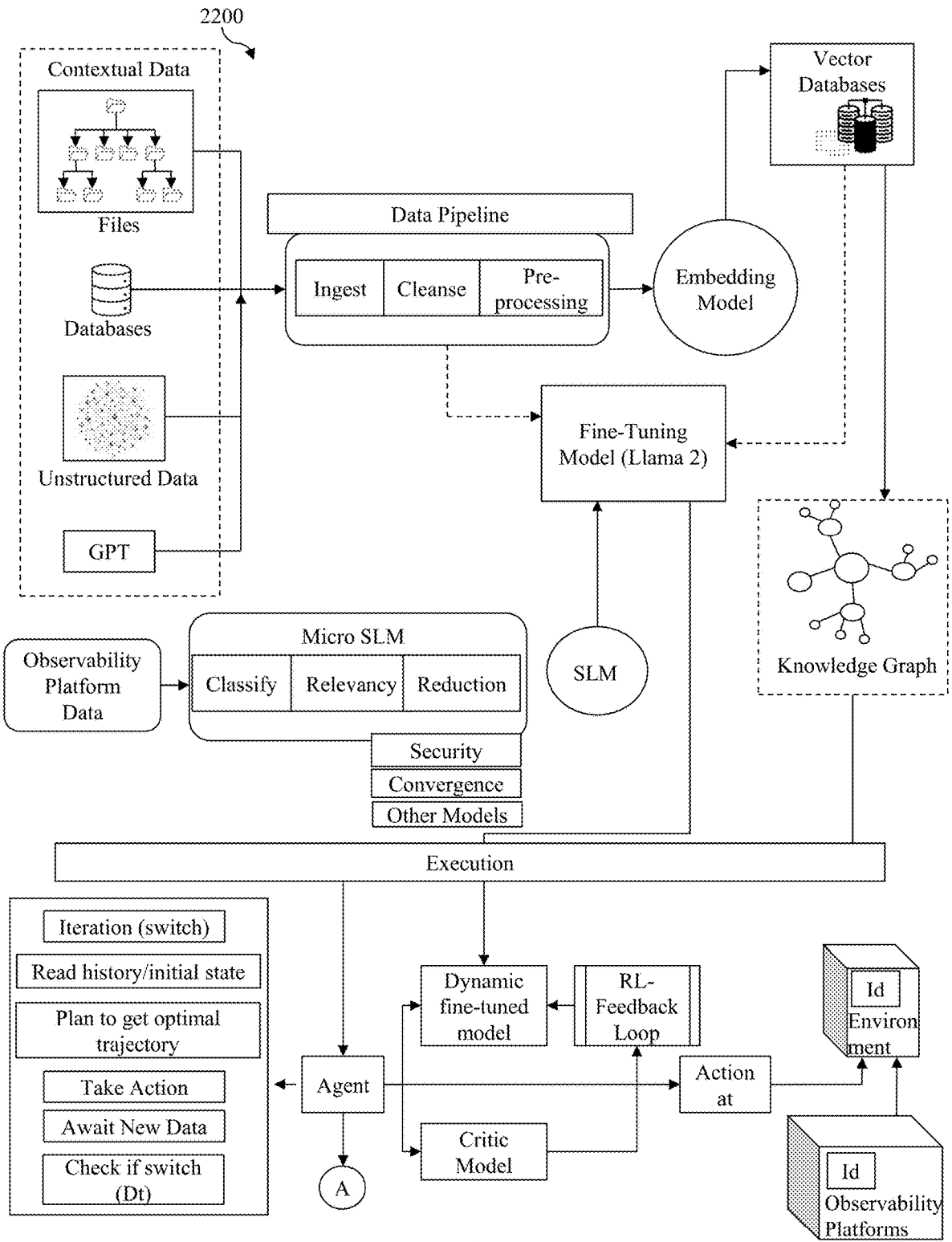
FIG. 22 illustrates a block diagram representing an end-to-end execution for generating the one or more actions to be applied to the one or more environments, in accordance with an embodiment of the present disclosure.
Figure 22:
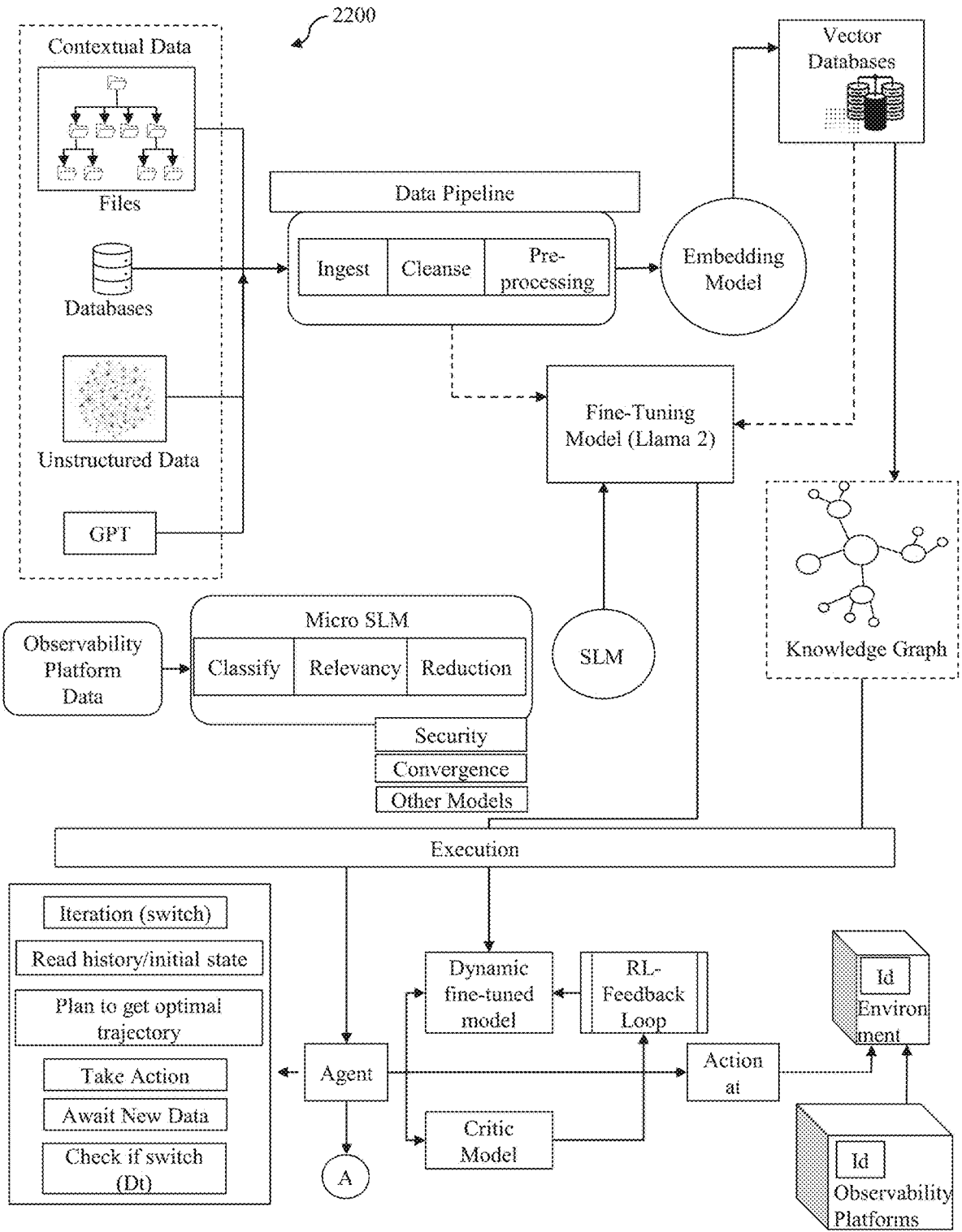
Figure 22:
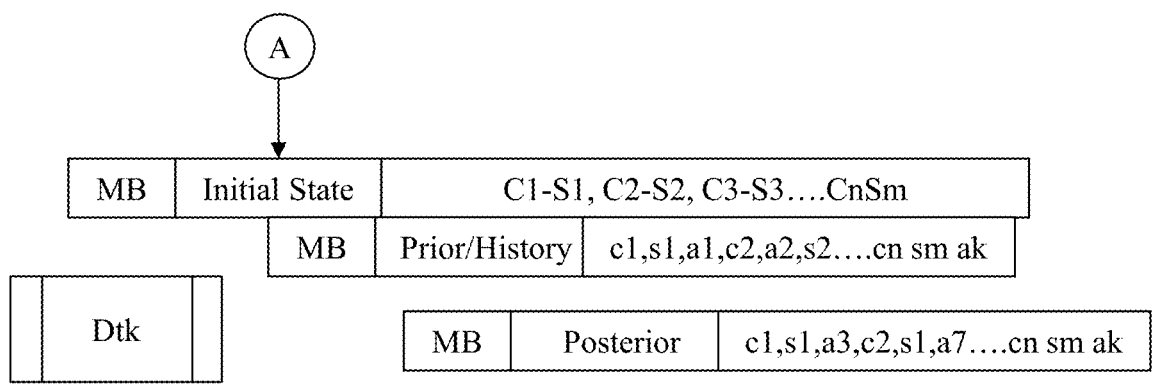

FIG. 22 illustrates a block diagram 2200 representing an end-to-end execution for generating the one or more actions to be applied to the one or more environments 116, in accordance with an embodiment of the present disclosure. The end-to-end execution for generating the one or more actions involves in generating the static model and the knowledge graph. The autonomic system is built with various processes starting from ingesting the Service Level Agreement (SLA) to taking corrective actions based on the insights to address any malfunctions within the system. The one or more SLAs, including the metric-level Service Level Objectives (SLOs), serve as the contractual agreement defining the structure and operational parameters for the overall contract. This primarily static information may provide a high-level blueprint for achieving the SLO objectives. The Artificial Intelligence (AI) model may parse and analyze this static agreement, learning its structure and semantics, as an initial step toward building the AI model aimed at achieving the SLOs. These foundational models extend existing language models to understand SLAs, SLOs, and metrics from various documents, including contractual agreements, software architecture, and infrastructure architecture. Concurrently, a knowledge graph is generated using the same information gathered for the static model.

Further, the dynamic data or the real-time data are obtained from the one or more monitoring platforms. The dynamic data gathering and filtering involves handling the real-time data captured from the one or more monitoring platforms, often received at a rapid rate. The real-time data captured from the one or more monitoring platforms may include considerable amount of irrelevant information. The small language model (SLM) component is utilized for categorizing, assessing data relevance, and employing the reinforcement learning techniques to filter out irrelevant real-time data. By leveraging specialized SLMs for specific data types and integrating the reinforcement learning, The relevant real-time data, along with generated prompts, are passed on to the large language model (LLM) for further analysis. This optimized process leads to improved decision-making, reduced response times, and enhanced security posture.

Further, the dynamic model is continuously updated with the real-time data specific to SLAs, SLOs, and metrics, enhancing its ability to provide timely and accurate decision-making support for the enterprise. This involves fine-tuning the initial static model with the real-time data, resulting in an instance-specific language model. Similarly, the knowledge graph evolves into a meta-model, providing a framework for creating specific models within the domain by defining entities, attributes, and relationships. The dynamic data that are produced by the services, are collected by the one or more monitoring platforms contribute to building an instance-view knowledge graph with fine-grained instances and relations.

Further, in decision making using the dynamic model, the ADAPT agent interacts with the dynamic model to retrieve the initial state of SLOs and metrics. Based on this initial state, the ADAPT agent queries the dynamic model to formulate an initial plan to achieve the goal of meeting the SLOs. The Dynamic Model employs learning and planning procedures, resembling actor-critic updates for the Partially Observable Markov Decision Processes (POMDPs), to generate the optimal actions, to be applied to the one or more environments 116, based on the current state and probabilities of meeting the SLOs. In an embodiment, the actor-critic RL loop may be used to generate the actions becoming more accurate and precise. The Critic model evaluates suggested actions, providing feedback to refine the decision-making process iteratively until all components are in a satisfactory state. This iterative process ensures continual improvement and adaptation of the policy of taking actions, by the actor, to adapt with the evolving conditions within the environment 116 and in turn improves the learning and planning procedure. The improved actions are taken on the one or more environments 116 with an objective to the meet the SLO thereby completing the closed loop.

Figure 23:
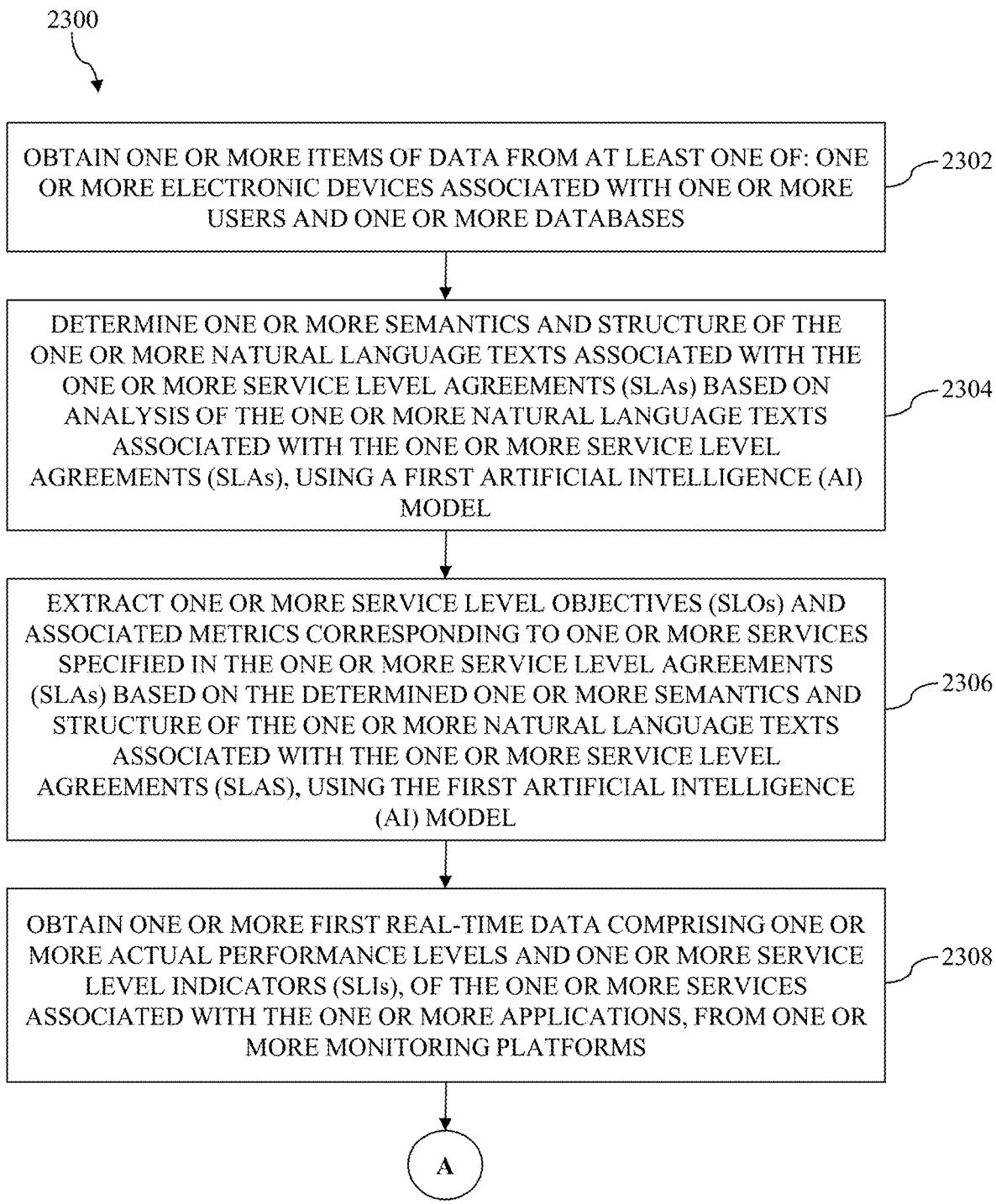
FIG. 23 illustrates a flow chart representing a computer-implemented method for automatically managing the one or more applications in the one or more environments using the artificial intelligence (AI) driven autonomic application management framework, in accordance with an embodiment of the present disclosure.
Figure 23:
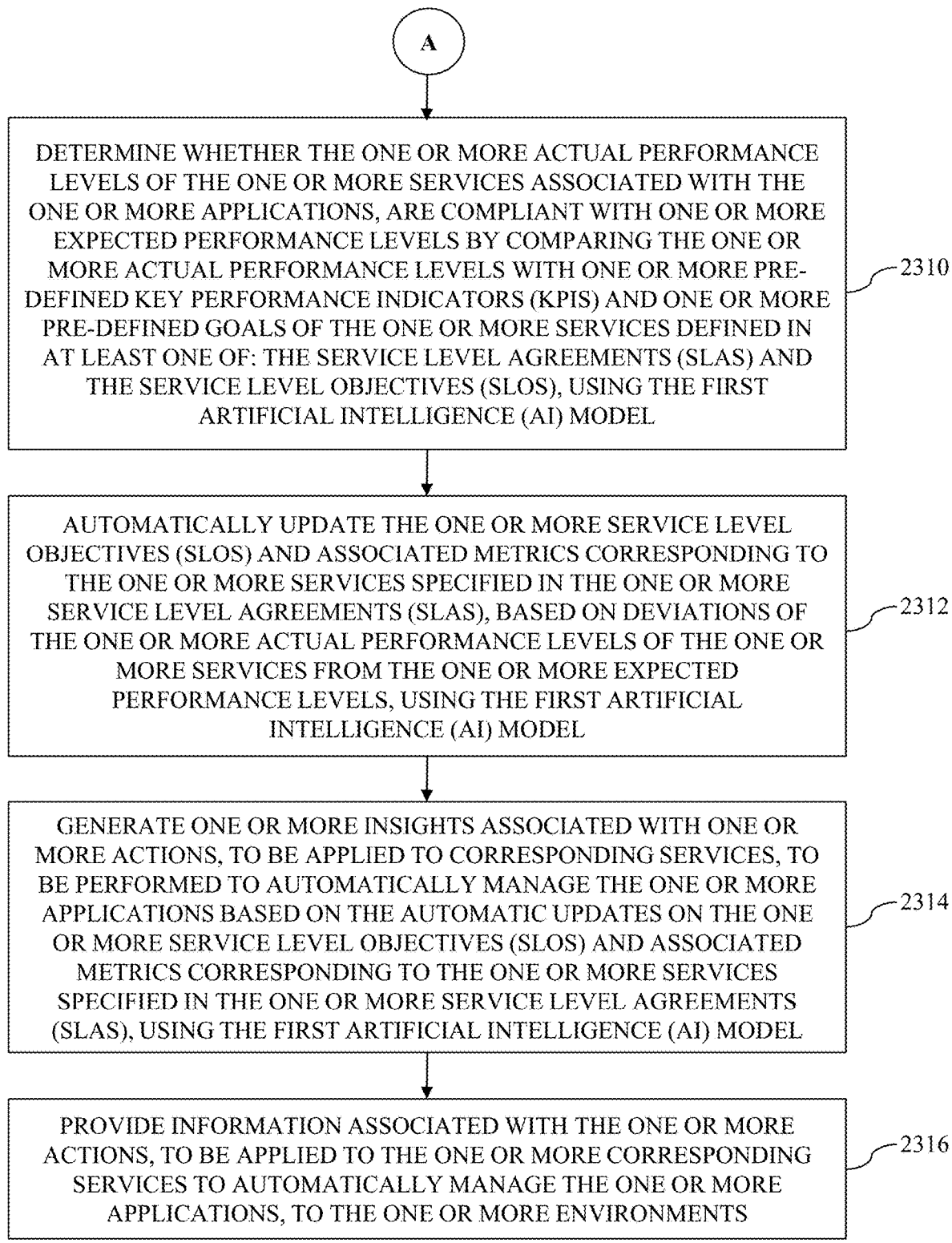

FIG. 23 illustrates a flow chart 2300 representing a computer-implemented method for automatically managing the one or more applications in the one or more environments 116 using the artificial intelligence (AI) driven autonomic application management framework, in accordance with an embodiment of the present disclosure.

At step 2302, the one or more items of data from at least one of: one or more electronic devices 106 associated with the one or more users and the one or more databases 104. In an embodiment, the one or more data may include information associated with the one or more service level agreements (SLAs) corresponding to the one or more applications in the one or more environments 116. The one or more service level agreements (SLAs) associated with the one or more applications may include the one or more natural language texts.

At step 2304, the one or more semantics and structure of the one or more natural language texts associated with the one or more service level agreements (SLAs) are determined based on analysis of the one or more natural language texts associated with the one or more service level agreements (SLAs), using the first artificial intelligence (AI) model (i.e., the large language model (LLM)).

At step 2306, the one or more service level objectives (SLOs) and associated metrics corresponding to one or more services specified in the one or more service level agreements (SLAs) are extracted based on the determined one or more semantics and structure of the one or more natural language texts associated with the one or more service level agreements (SLAs), using the first artificial intelligence (AI) model.

At step 2308, the one or more first real-time data including the one or more actual performance levels, and the one or more service level indictors (SLIs), of the one or more services associated with the one or more applications, are obtained from the one or more monitoring platforms.

At step 2310, the first artificial intelligence (AI) model (e.g., the large language model (LLM)) determines whether the one or more actual performance levels of the one or more services associated with the one or more applications, are compliant with the one or more expected performance levels by comparing the one or more actual performance levels with one or more pre-defined key performance indicators (KPIs) and the one or more pre-defined goals of the one or more services defined in at least one of: the service level agreements (SLAs) and the service level objectives (SLOs).

In an embodiment, the first artificial intelligence (AI) model is trained with the one or more pre-defined rules and criteria to assess the one or more pre-defined key performance indicators (KPIs) and the one or more pre-defined goals defined in at least one of: the service level agreements (SLAs) and the service level objectives (SLOs).

At step 2312, the one or more service level objectives (SLOs) and associated metrics corresponding to the one or more services specified in the one or more service level agreements (SLAs), are automatically updated based on the deviations of the one or more actual performance levels of the one or more services from the one or more expected performance levels, using the first artificial intelligence (AI) model.

At step 2314, the one or more insights associated with one or more actions, to be applied to one or more corresponding services, to be performed to automatically manage the one or more applications, are generated, based on the automatic updates on the one or more service level objectives (SLOs) and associated metrics corresponding to the one or more services specified in the one or more service level agreements (SLAs), using the first artificial intelligence (AI) model.

At step 2316, the information associated with the one or more actions, to be applied to the one or more corresponding services to automatically manage the one or more applications, are provided to the one or more environments 116.

The present invention has following advantages. The present disclosure provides the computer-implemented system 102 and the computer-implemented method 2300 for the artificial intelligence (AI) driven autonomic application management framework to automatically manage the one or more applications in the one or more environments 116. The present disclosure with the computer-implemented system 102 is configured to eliminate the need for specialized syntax expertise. Through dynamic resource management, the artificial intelligence (AI) driven autonomic application management framework ensures optimal resource utilization without manual intervention, enhancing both efficiency and cost-effectiveness.

Furthermore, the present disclosure seamlessly integrates critical monitoring and security tools into the application system, eliminating challenges of standalone packaging. Automated issue resolution and efficient error root-cause analysis streamline operations, reducing manual effort and improving reliability. The present invention is configured to perform user-friendly service level agreements (SLAs) to service level objectives (SLOs) conversion, continuous performance monitoring, and the ability to self-heal and self-correct due to closed-loop nature. The present disclosure enables generating a legal document, based on translating the document into metrics to be measured, without expertise or training required to write in a specific language.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limited, of the scope of the invention, which is outlined in the following claims.

We claim:

1. A computer-implemented method for automatically managing one or more applications in one or more environments using an artificial intelligence (AI) driven autonomic application management framework, the computer-implemented method comprising:

obtaining, by one or more hardware processors, one or more items of data from at least one of: one or more electronic devices associated with one or more users and one or more databases, wherein the one or more data comprise information associated with one or more service level agreements (SLAs) corresponding to the one or more applications in the one or more environments, and wherein the one or more service level agreements (SLAs) associated with the one or more applications comprise one or more natural language texts;

determining, by the one or more hardware processors, one or more semantics and structure of the one or more natural language texts associated with the one or more service level agreements (SLAs) based on analysis of the one or more natural language texts associated with the one or more service level agreements (SLAs), using a first artificial intelligence (AI) model;

extracting, by the one or more hardware processors, one or more service level objectives (SLOs) and associated metrics corresponding to one or more services specified in the one or more service level agreements (SLAs) based on the determined one or more semantics and structure of the one or more natural language texts associated with the one or more service level agreements (SLAs), using the first artificial intelligence (AI) model;

obtaining, by the one or more hardware processors, one or more first real-time data comprising one or more actual performance levels, and one or more service level indictors (SLIs), of the one or more services associated with the one or more applications, from one or more monitoring platforms;

determining, by the one or more hardware processors, whether the one or more actual performance levels of the one or more services associated with the one or more applications, are compliant with one or more expected performance levels by comparing the one or more actual performance levels with one or more pre-defined key performance indicators (KPIs) and one or more pre-defined goals of the one or more services defined in at least one of: the service level agreements (SLAs) and the service level objectives (SLOs), using the first artificial intelligence (AI) model, wherein the first artificial intelligence (AI) model is trained with one or more pre-defined rules and criteria to assess the one or more pre-defined key performance indicators (KPIs) and one or more pre-defined goals defined in at least one of: the service level agreements (SLAs) and the service level objectives (SLOs);

automatically updating, by the one or more hardware processors, the one or more service level objectives (SLOs) and associated metrics corresponding to the one or more services specified in the one or more service level agreements (SLAs), based on deviations of the one or more actual performance levels of the one or more services from the one or more expected performance levels, using the first artificial intelligence (AI) model;

fine-tuning, by the one or more hardware processors, the trained first artificial intelligence (AI) model with the determined one or more semantics and structure of the one or more natural language texts specific to the one or more service level objectives (SLOs) and associated metrics, using one or more techniques comprising at least one of: few shots learning, chain of thoughts, tree of thoughts, ReACT trajectories, symbolic reasoning, self-consistency, automatic reasoning, and tool use, wherein the fine-tuned first artificial intelligence (AI) model comprises a Linguistic Latent Attribute model (LLAMA 2), and wherein the LLAMA 2 is collection of pre-trained and fine-tuned generative test models;

generating by the one or more hardware processors, the one or more actions, to be applied to the one or more environments, based on at least one of: current state of the one or more service level objectives (SLOs) and probabilities of meeting the one or more service level objectives (SLOs), by at least one of: learning, planning procedures, and resembling actor-critic updates for Partial Observable Markov Decision Processes (POMDPs), wherein the Augmented Deep Active learning for text and Planning Trajectories (ADAPT) agent with the Partial Observable Markov Decision Processes (POMDPs) is configured to monitor the one or more services for adjusting one or more governance principles in the one or more environments, wherein the ADAPT agent is further configured to establish a framework to enable self-correction and self-reinforcement;

generating, by the one or more hardware processors, one or more insights associated with the one or more actions, to be applied to one or more corresponding services, to be performed to automatically manage the one or more applications based on the automatic updates on the one or more service level objectives (SLOs) and associated metrics corresponding to the one or more services specified in the one or more service level agreements (SLAs), using the first artificial intelligence (AI) model; and providing, by the one or more hardware processors, information associated with the one or more actions, to be applied to the one or more corresponding services to automatically manage the one or more applications, to the one or more environments.

2. The computer-implemented method of claim 1, wherein determining, by the first artificial intelligence (AI) model, the one or more semantics and structure of the one or more natural language texts associated with the one or more service level agreements (SLAs), comprises:

training, by the one or more hardware processors, the first artificial intelligence (AI) model on one or more training datasets encompassing one or more texts from one or more text sources, wherein the one or more training datasets comprise at least one of: one or more articles, one or more books, and one or more websites, and wherein the first artificial intelligence (AI) model comprises a fine-tuned large language model (LLM);

obtaining, by the one or more hardware processors, the one or more data from at least one of: one or more electronic devices associated with one or more users and one or more databases; and processing, by the one or more hardware processors, the one or more data to determine the one or more semantics and structure of the one or more natural language texts associated with the one or more service level agreements (SLAs) based on the training of the first artificial intelligence (AI) model on the one or more training datasets, wherein processing the one or more data comprises breaking the one or more natural language texts associated with the one or more service level agreements (SLAs) to be learned by the trained first artificial intelligence (AI) model to determine the one or more semantics and structure of the one or more natural language texts.

3. The computer-implemented method of claim 1, further comprising:

extracting, by the one or more hardware processors, the one or more service level objectives (SLOs) and associated metrics based on the fine-tuning process of the trained first artificial intelligence (AI) model with determined one or more semantics and structure within the one or more natural language texts.

4. The computer-implemented method of claim 1, further comprising extracting, by a second artificial intelligence (AI) model, one or more second real-time data from the one or more first real-time data for fine-tuning the large language model (LLM), wherein the second artificial intelligence (AI) model comprises a small language model (SLM), and wherein extracting the one or more second real-time data from the one or more first real-time data comprises:
  obtaining, by the one or more hardware processors, the one or more first real-time data from the one or more monitoring platforms using a data ingestion layer, wherein the data ingestion layer is configured to determine whether the one or more first real-time data are obtained efficiently and to preprocess the one or more first real-time data to determine whether the one or more first real-time data comprise consistency and compatibility across the one or more monitoring platforms;
  categorizing, by the one or more hardware processors, the one or more first real-time data based on at least one of: one or more types of the one or more first real-time data and the one or more monitoring platforms, using a categorization and routing layer,
  wherein the categorization and routing layer is configured to optimize a routing process of the one or more first real-time data to determine whether the one or more first real-time data are directed to a corresponding small language model (SLM) for analysis of the one or more first real-time data;
  processing, by the one or more hardware processors, the one or more types of the one or more first real-time data and adding, by the one or more hardware processors, one or more securities and governance criteria to the one or more first real-time data, wherein processing the one or more types of the one or more first real-time data comprises:
    assessing, by the one or more hardware processors, relevancy of the one or more first real-time data using one or more pre-defined criteria;
    mitigating, by the one or more hardware processors, noise by filtering one or more repetitive data points associated with the one or more first real-time data; and
    training, by the one or more hardware processors, each small language model (SLM) to recognize one or more patterns and anomalies within one or more domains associated with the one or more first real-time data, to identify one or more security-related events;
  mitigating, by the one or more hardware processors, one or more data volumes by eliminating the one or more repetitive data points associated with the one or more first real-time data to determine an importance of each data point associated with the one or more first real-time data, using a data relevance assessment and reduction layer; and
  extracting, by the one or more hardware processors, the one or more second real-time data from the one or more first real-time data based on an analysis of the relevancy of the one or more first real-time data.

5. The computer-implemented method of claim 4, further comprising optimizing, by the one or more hardware processors, the small language model (SLM) based on one or more feedback and results associated with the extraction of the one or more second real-time data using a reinforcement learning layer through a language model (LM) agent,
  wherein the language model (LM) agent is configured to serve as a dynamic interface between the second artificial intelligence (AI) model and the one or more monitoring platforms, and
  wherein optimizing the small language model (SLM) comprises learning, by the one or more hardware processors, the one or more second real-time data from one or more historical data to analyse security-related one or more second real-time data.

6. The computer-implemented method of claim 4, further comprising:
  fine-tuning, by the one or more hardware processors, the first artificial intelligence (AI) model with the one or more second real-time data in accordance with at least one of: the one or more service level agreements (SLAs), the one or more service level objectives (SLOs) and associated metrics corresponding to the one or more services, wherein the fine-tuned first artificial intelligence (AI) model is an instance language model; and
  generating, by the one or more hardware processors, one or more knowledge graphs defining one or more structure and relationships common to one or more language models within the one or more domains, wherein the one or more knowledge graphs are one or more ontology views with one or more optimized level concepts and one or more meta-relations comprising at least one of: one or more entities, one or more attributes of the one or more entities, and one or more relationships between the one or more entities.

7. The computer-implemented method of claim 6, wherein fine-tuning the first artificial intelligence (AI) model with the one or more second real-time data comprises:
  obtaining, by the one or more hardware processors, the one or more second real-time data from the one or more monitoring platforms, wherein the one or more second real-time data are stored in one or more interim databases;
  translating, by the one or more hardware processors, the one or more second real-time data into one or more formats for fine-tuning the first artificial intelligence (AI) model;
  mapping, by the one or more hardware processors, the one or more second real-time data to at least one of: the one or more service level agreements (SLAs), the one or more service level objectives (SLOs) and associated metrics corresponding to the one or more services, available in the first artificial intelligence (AI) model fine-tuned with the determined one or more semantics and structure of the one or more natural language texts;
  converting, by the one or more hardware processors, the mapped one or more second real-time data into one or more question answering based datasets for fine-tuning the first artificial intelligence (AI) model; and
  updating, by the one or more hardware processors, the one or more knowledge graphs based on the one or more second real-time data to update one or more instance view graphs.

8. The computer-implemented method of claim 7, further comprising:
  generating, by the one or more hardware processors, one or more prompt templates for one or more reasonings that learn dynamically from one or more memory buffers;
  organizing, by the one or more hardware processors, one or more future trajectories over an extended horizon using the first artificial intelligence (AI) model;

generating, by the one or more hardware processors, the one or more actions based on the organized one or more future trajectories, using a language model (LM) agent;
collecting, by the one or more hardware processors, one or more feedbacks based on the generated one or more actions for the one or more services;
storing, by the one or more hardware processors, the collected one or more feedbacks in the one or more memory buffers; and
recurring, by the one or more hardware processors, the one or more reasonings to reorganize the one or more future trajectories from an updated state.

9. The computer-implemented method of claim 1, wherein generating the one or more actions using the first artificial intelligence (AI) model, comprises:
retrieving, by the one or more hardware processors, an initial state of the one or more service level objectives (SLOs) and associated metrics based on an Augmented Deep Active learning for text and Planning Trajectories (ADAPT) agent configured with the first artificial intelligence (AI) model being fine-tuned;
generating, by the one or more hardware processors, one or more plan trajectories to accomplish in meeting the one or more service level objectives (SLOs) based on the initial state of the one or more service level objectives (SLOs) and associated metrics, by querying the first artificial intelligence (AI) model from the Augmented Deep Active learning for text and Planning Trajectories (ADAPT) agent;
generating, by the one or more hardware processors, the one or more actions, to be applied to the one or more environments;
receiving, by the one or more hardware processors, one or more feedbacks to refine a decision-making process on generation of the one or more actions upon analysing the generated one or more actions using a critic model;
recurring, by the one or more hardware processors, the refinement of the decision-making process on generation of the one or more actions until one or more optimal actions are generated;
optimizing, by the one or more hardware processors, the generated one or more actions to adapt with evolving conditions within the one or more environments by updating the learning, planning procedures; and
providing, by the one or more hardware processors, the optimized one or more actions to the one or more environments to accomplish in meeting the one or more service level objectives (SLOs).

10. The computer-implemented method of claim 9, further comprising constructing, by the one or more hardware processors, partial observabilities by providing one or more observations when the language model (LM) agent has partial knowledge of a state of the one or more environments, using the Partial Observable Markov Decision Process (POMDP), wherein the one or more observations are configured to provide implicit information about a true state, allowing the language model (LM) agent to update probability distribution over one or more possible states.

11. A computer-implemented system for automatically managing one or more applications in one or more environments using an artificial intelligence (AI) driven autonomic application management framework, the computer-implemented system comprising:
one or more hardware processors;
a memory coupled to the one or more hardware processors, wherein the memory comprises a plurality of subsystems in form of programmable instructions executable by the one or more hardware processors, and wherein the plurality of subsystems comprises:
a data obtaining subsystem configured to obtain one or more items of data from at least one of: one or more electronic devices associated with one or more users and one or more databases, wherein the one or more data comprise information associated with one or more service level agreements (SLAs) corresponding to the one or more applications in the one or more environments, and wherein the one or more service level agreements (SLAs) associated with the one or more applications comprise one or more natural language texts;
a natural language processing (NLP) subsystem configured to determine one or more semantics and structure of the one or more natural language texts associated with the one or more service level agreements (SLAs) based on analysis of the one or more natural language texts associated with the one or more service level agreements (SLAs), using a first artificial intelligence (AI) model;
a service level objectives extraction subsystem configured to extract one or more service level objectives (SLOs) and associated metrics corresponding to one or more services specified in the one or more service level agreements (SLAs) based on the determined one or more semantics and structure of the one or more natural language texts associated with the one or more service level agreements (SLAs), using the first artificial intelligence (AI) model;
the data obtaining subsystem further configured to obtain one or more first real-time data comprising one or more actual performance levels, and one or more service level indictors (SLIs), of the one or more services associated with the one or more applications, from one or more monitoring platforms;
a compliance determining subsystem configured to determine whether the one or more actual performance levels of the one or more services associated with the one or more applications, are compliant with one or more expected performance levels by comparing the one or more actual performance levels with one or more pre-defined key performance indicators (KPIs) and one or more pre-defined goals of the one or more services defined in at least one of: the service level agreements (SLAs) and the service level objectives (SLOs), using the first artificial intelligence (AI) model,
wherein the first artificial intelligence (AI) model is trained with one or more pre-defined rules and criteria to assess the one or more pre-defined key performance indicators (KPIs) and one or more pre-defined goals defined in at least one of: the service level agreements (SLAs) and the service level objectives (SLOs);
a service level objectives updating subsystem configured to automatically update the one or more service level objectives (SLOs) and associated metrics corresponding to the one or more services specified in the one or more service level agreements (SLAs), based on deviations of the one or more actual performance levels of the one or more services from the one or more expected performance levels, using the first artificial intelligence (AI) model;
a fine tuning subsystem configured to fine-tune the trained first artificial intelligence (AI) model with the determined one or more semantics and structure of the one or more natural language texts specific to the one or more service level objectives (SLOs) and associated metrics, using one or more techniques comprising at least one of: few shots learning, chain of thoughts, tree of thoughts, ReACT trajectories, symbolic reasoning, self-consistency, automatic reasoning, and tool use, wherein the fine-tuned first artificial intelligence (AI) model comprises a Linguistic Latent Attribute model (LLAMA 2), and wherein the LLAMA 2 is collection of pre-trained and fine-tuned generative test models;

a decision-making subsystem configured to:
  generate one or more actions, to be applied to the one or more environments, based on at least one of: current state of the one or more service level objectives (SLOs) and probabilities of meeting the one or more service level objectives (SLOs), by at least one of: learning, planning procedures, and resembling actor-critic updates for Partial Observable Markov Decision Processes (POMDPs), wherein an Augmented Deep Active learning for text and Planning Trajectories (ADAPT) agent with a Partial Observable Markov Decision Processes (POMDPs) is configured to monitor the one or more services for adjusting one or more governance principles in the one or more environments, wherein the ADAPT agent is further configured to establish a framework to enable self-correction and self-reinforcement; and
  generate one or more insights associated with the one or more actions, to be applied to one or more corresponding services, to be performed to automatically manage the one or more applications based on the automatic updates on the one or more service level objectives (SLOs) and associated metrics corresponding to the one or more services specified in the one or more service level agreements (SLAs), using the first artificial intelligence (AI) model; and an actions provisioning subsystem configured to provide information associated with the one or more actions, to be applied to the one or more corresponding services to automatically manage the one or more applications, to the one or more environments.

12. The computer-implemented system of claim 11, wherein in determining, by the first artificial intelligence (AI) model, the one or more semantics and structure of the one or more natural language texts associated with the one or more service level agreements (SLAs), the natural language processing subsystem is configured to:
  train the first artificial intelligence (AI) model on one or more training datasets encompassing one or more texts from one or more text sources, wherein the one or more training datasets comprise at least one of: one or more articles, one or more books, and one or more websites, and wherein the first artificial intelligence (AI) model comprises a fine-tuned large language model (LLM);
  obtain the one or more data from at least one of: one or more electronic devices associated with the one or more users and the one or more databases; and
  process the one or more data to determine the one or more semantics and structure of the one or more natural language texts associated with the one or more service level agreements (SLAs) based on the training of the first artificial intelligence (AI) model on the one or more training datasets,
  wherein processing the one or more data comprises breaking the one or more natural language texts associated with the one or more service level agreements (SLAs) to be learned by the trained first artificial intelligence (AI) model to determine the one or more semantics and structure of the one or more natural language texts.

13. The computer-implemented system of claim 11, further comprising
  the service level objectives extraction subsystem configured to extract the one or more service level objectives (SLOs) and associated metrics based on the fine-tuning process of the trained first artificial intelligence (AI) model with the determined one or more semantics and structure within the one or more natural language texts.

14. The computer-implemented system of claim 11, further comprising a data extraction subsystem configured to extract one or more second real-time data from the one or more first real-time data for fine-tuning the large language model (LLM) using a second artificial intelligence (AI) model, wherein the second artificial intelligence (AI) model comprises a small language model (SLM), and wherein in extracting the one or more second real-time data from the one or more first real-time data, the data extraction subsystem is configured to:
  obtain the one or more first real-time data from the one or more monitoring platforms using a data ingestion layer, wherein the data ingestion layer is configured to determine whether the one or more first real-time data are obtained efficiently and to preprocess the one or more first real-time data to determine whether the one or more first real-time data comprise consistency and compatibility across the one or more monitoring platforms;
  categorize the one or more first real-time data based on at least one of: one or more types of the one or more first real-time data and the one or more monitoring platforms, using a categorization and routing layer,
  wherein the categorization and routing layer is configured to optimize a routing process of the one or more first real-time data to determine whether the one or more first real-time data are directed to a corresponding small language model (SLM) for analysis of the one or more first real-time data;
  process the one or more types of the one or more first real-time data and add one or more securities and governance criteria to the one or more first real-time data, wherein processing the one or more types of the one or more first real-time data comprises:
  assessing relevancy of the one or more first real-time data using one or more pre-defined criteria;
  mitigating noise by filtering one or more repetitive data points associated with the one or more first real-time data; and
  training each small language model (SLM) to recognize one or more patterns and anomalies within one or more domains associated with the one or more first real-time data, to identify one or more security-related events;
  mitigate one or more data volumes by eliminating the one or more repetitive data points associated with the one or more first real-time data to determine an importance of each data point associated with the one or more first real-time data, using a data relevance assessment and reduction layer; and
  extract the one or more second real-time data from the one or more first real-time data based on an analysis of the relevancy of the one or more first real-time data.

15. The computer-implemented method of claim 14, further comprising a reinforcement learning subsystem is further configured to optimize the small language model (SLM) based on one or more feedback and results associated with the extraction of the one or more second real-time data using a reinforcement learning layer through a language model (LM) agent,
  wherein the language model (LM) agent is configured to serve as a dynamic interface between the second artificial intelligence (AI) model and the one or more monitoring platforms, and
  wherein the small language model (SLM) is optimized by learning the one or more second real-time data from one or more historical data to analyse security-related one or more second real-time data.

16. The computer-implemented method of claim 14, wherein:
  the fine-tuning subsystem is further configured to fine-tune the first artificial intelligence (AI) model with the one or more second real-time data in accordance with at least one of: the one or more service level agreements (SLAs), the one or more service level objectives (SLOs) and associated metrics corresponding to the one or more services, wherein the fine-tuned first artificial intelligence (AI) model is an instance language model; and
  a knowledge graph generation subsystem configured to generate one or more knowledge graphs defining one or more structure and relationships common to one or more language models within the one or more domains, wherein the one or more knowledge graphs are one or more ontology views with one or more optimized level concepts and one or more meta-relations comprising at least one of: one or more entities, one or more attributes of the one or more entities, and one or more relationships between the one or more entities.

17. The computer-implemented system of claim 16, wherein in fine-tuning the first artificial intelligence (AI) model with the one or more second real-time data, the fine-tuning subsystem is configured to:
  obtain the one or more second real-time data from the one or more monitoring platforms, wherein the one or more second real-time data are stored in one or more interim databases;
  translate the one or more second real-time data into one or more formats for fine-tuning the first artificial intelligence (AI) model;
  map the one or more second real-time data to at least one of: the one or more service level agreements (SLAs), the one or more service level objectives (SLOs) and associated metrics corresponding to the one or more services, available in the first artificial intelligence (AI) model fine-tuned with the determined one or more semantics and structure of the one or more natural language texts;
  convert the mapped one or more second real-time data into one or more question answering based datasets for fine-tuning the first artificial intelligence (AI) model; and
  update the one or more knowledge graphs based on the one or more second real-time data to update one or more instance view graphs.

18. The computer-implemented system of claim 17, wherein the reinforcement learning subsystem is further configured to:
  generate one or more prompt templates for one or more reasonings that learn dynamically from one or more memory buffers;
  organize one or more future trajectories over an extended horizon using the first artificial intelligence (AI) model;
  generate the one or more actions based on the organized one or more future trajectories, using a language model (LM) agent;
  collect one or more feedbacks based on the generated one or more actions for the one or more services;
  store the collected one or more feedbacks on the one or more memory buffers; and
  recur the one or more reasonings to reorganize the one or more future trajectories from an updated state.

19. The computer-implemented method of claim 11, wherein in generating the one or more actions, the decision making subsystem with the first artificial intelligence (AI) model is configured to:
  retrieve an initial state of the one or more service level objectives (SLOs) and associated metrics based on an Augmented Deep Active learning for text and Planning Trajectories (ADAPT) agent configured with the first artificial intelligence (AI) model being fine-tuned;
  generate one or more plan trajectories to accomplish in meeting the one or more service level objectives (SLOs) based on the initial state of the one or more service level objectives (SLOs) and associated metrics, by querying the first artificial intelligence (AI) model from the Augmented Deep Active learning for text and Planning Trajectories (ADAPT) agent;
  generate the one or more actions, to be applied to the one or more environments;
  receive one or more feedbacks to refine a decision-making process on generation of the one or more actions upon analysing the generated one or more actions using a critic model;
  recur the refinement of the decision-making process on generation of the one or more actions until one or more optimal actions are generated;
  optimize the generated one or more actions to adapt with evolving conditions within the one or more environments by updating the learning, planning procedures; and
  provide the optimized one or more actions to the one or more environments to accomplish in meeting the one or more service level objectives (SLOs).

20. A non-transitory computer-readable storage medium having instructions stored therein that when executed by a hardware processor, cause the processor to execute operations of:
  obtaining one or more items of data from at least one of: one or more electronic devices associated with one or more users and one or more databases, wherein the one or more data comprise information associated with one or more service level agreements (SLAs) corresponding to the one or more applications in the one or more environments, and wherein the one or more service level agreements (SLAs) associated with the one or more applications comprise one or more natural language texts;
  determining one or more semantics and structure of the one or more natural language texts associated with the one or more service level agreements (SLAs) based on analysis of the one or more natural language texts associated with the one or more service level agreements (SLAs), using a first artificial intelligence (AI) model;

extracting one or more service level objectives (SLOs) and associated metrics corresponding to one or more services specified in the one or more service level agreements (SLAs) based on the determined one or more semantics and structure of the one or more natural language texts associated with the one or more service level agreements (SLAs), using the first artificial intelligence (AI) model;

obtaining one or more first real-time data comprising one or more actual performance levels, and one or more service level indictors (SLIs), of the one or more services associated with the one or more applications, from one or more monitoring platforms;

determining whether the one or more actual performance levels of the one or more services associated with the one or more applications, are compliant with one or more expected performance levels by comparing the one or more actual performance levels with one or more pre-defined key performance indicators (KPIs) and one or more pre-defined goals of the one or more services defined in at least one of: the service level agreements (SLAs) and the service level objectives (SLOs), using the first artificial intelligence (AI) model, wherein the first artificial intelligence (AI) model is trained with one or more pre-defined rules and criteria to assess the one or more pre-defined key performance indicators (KPIs) and one or more pre-defined goals defined in at least one of: the service level agreements (SLAs) and the service level objectives (SLOs);

automatically updating the one or more service level objectives (SLOs) and associated metrics corresponding to the one or more services specified in the one or more service level agreements (SLAs), based on deviations of the one or more actual performance levels of the one or more services from the one or more expected performance levels;

fine-tuning, the trained first artificial intelligence (AI) model with the determined one or more semantics and structure of the one or more natural language texts specific to the one or more service level objectives (SLOs) and associated metrics, using one or more techniques comprising at least one of: few shots learning, chain of thoughts, tree of thoughts, ReACT trajectories, symbolic reasoning, self-consistency, automatic reasoning, and tool use, wherein the fine-tuned first artificial intelligence (AI) model comprises a Linguistic Latent Attribute model (LLAMA 2), and wherein the LLAMA 2 is collection of pre-trained and fine-tuned generative test models;

generating the one or more actions, to be applied to the one or more environments, based on at least one of: current state of the one or more service level objectives (SLOs) and probabilities of meeting the one or more service level objectives (SLOs), by at least one of: learning, planning procedures, and resembling actor-critic updates for Partial Observable Markov Decision Processes (POMDPs), wherein the Augmented Deep Active learning for text and Planning Trajectories (ADAPT) agent with the Partial Observable Markov Decision Processes (POMDPs) is configured to monitor the one or more services for adjusting one or more governance principles in the one or more environments, wherein the ADAPT agent is further configured to establish a framework to enable self-correction and self-reinforcement;

generating one or more insights associated with the one or more actions, to be applied to one or more corresponding services, to be performed to automatically manage the one or more applications based on the automatic updates on the one or more service level objectives (SLOs) and associated metrics corresponding to the one or more services specified in the one or more service level agreements (SLAs), using the first artificial intelligence (AI) model; and providing information associated with the one or more actions, to be applied to the one or more corresponding services to automatically manage the one or more applications, to the one or more environments.

* * * * *